(12) United States Patent
Tang et al.

(10) Patent No.: US 9,659,251 B2
(45) Date of Patent: May 23, 2017

(54) SYSTEMS AND METHODS OF AUTONOMIC VIRTUAL NETWORK MANAGEMENT

(71) Applicant: Transoft (Shanghai), Inc., Shanghai (CN)

(72) Inventors: Changbin Tang, Shanghai (CN); Qin Zhu, Shanghai (CN)

(73) Assignee: Transoft Shanghai Inc., Shanghai (CN)

( * ) Notice: Subject to any disclaimer, the term of this patent is extended or adjusted under 35 U.S.C. 154(b) by 0 days.

(21) Appl. No.: 14/123,813

(22) PCT Filed: May 3, 2013

(86) PCT No.: PCT/CN2013/075130
§ 371 (c)(1),
(2) Date: Dec. 4, 2013

(87) PCT Pub. No.: WO2014/015697
PCT Pub. Date: Jan. 30, 2014

(65) Prior Publication Data
US 2016/0078342 A1 Mar. 17, 2016

(30) Foreign Application Priority Data
May 4, 2012 (CN) .......................... 2012 1 0137771

(51) Int. Cl.
*G06N 5/00* (2006.01)
*G06F 1/00* (2006.01)
(Continued)

(52) U.S. Cl.
CPC .......... *G06N 5/025* (2013.01); *G06F 9/45558* (2013.01); *H04L 41/00* (2013.01); *G06F 2009/45575* (2013.01)

(58) Field of Classification Search
CPC G06N 5/025; G06N 5/02; G06N 5/04; G06N 5/027
See application file for complete search history.

(56) References Cited

U.S. PATENT DOCUMENTS

| | | | | |
|---|---|---|---|---|
| 2005/0015238 A1* | 1/2005 | Meliksetian | .......... | G06F 17/277 704/4 |
| 2010/0223216 A1* | 9/2010 | Eggert | .......... | G06K 9/469 706/12 |

FOREIGN PATENT DOCUMENTS

| | | |
|---|---|---|
| CN | 101334727 | 12/2008 |
| CN | 101398768 | 4/2009 |

(Continued)

*Primary Examiner* — Stanley K Hill
*Assistant Examiner* — Kalpana Bharadwaj
(74) *Attorney, Agent, or Firm* — Occhiuti & Rohlicek LLP

(57) ABSTRACT

The disclosed invention involves a method and systems of autonomic virtual network, which relates to three basic inventions in the area of autonomic computing: (1) systems and methods of multi-loop autonomic manager, preemptive contact point, i.e. sensors and effectors, and software-defined hardware resource, or abstraction and virtualization of the hardware functions; (2) service-delivery virtual network in the area of distributed network, and application assurance systems and methods; and (3) integration of these two fields of inventions, namely autonomic managed virtual network, such that the management of virtual networks which provide service delivery, is able to achieve n-tier architecture system and method ACRA.

27 Claims, 30 Drawing Sheets

(51) Int. Cl.
  *G06N 5/02* (2006.01)
  *H04L 12/24* (2006.01)
  *G06F 9/455* (2006.01)

(56) References Cited

FOREIGN PATENT DOCUMENTS

| | | |
|---|---|---|
| CN | 201904801 | 7/2011 |
| CN | 102164123 | 8/2011 |
| CN | 102314391 | 1/2012 |
| CN | 102857363 | 1/2013 |

* cited by examiner

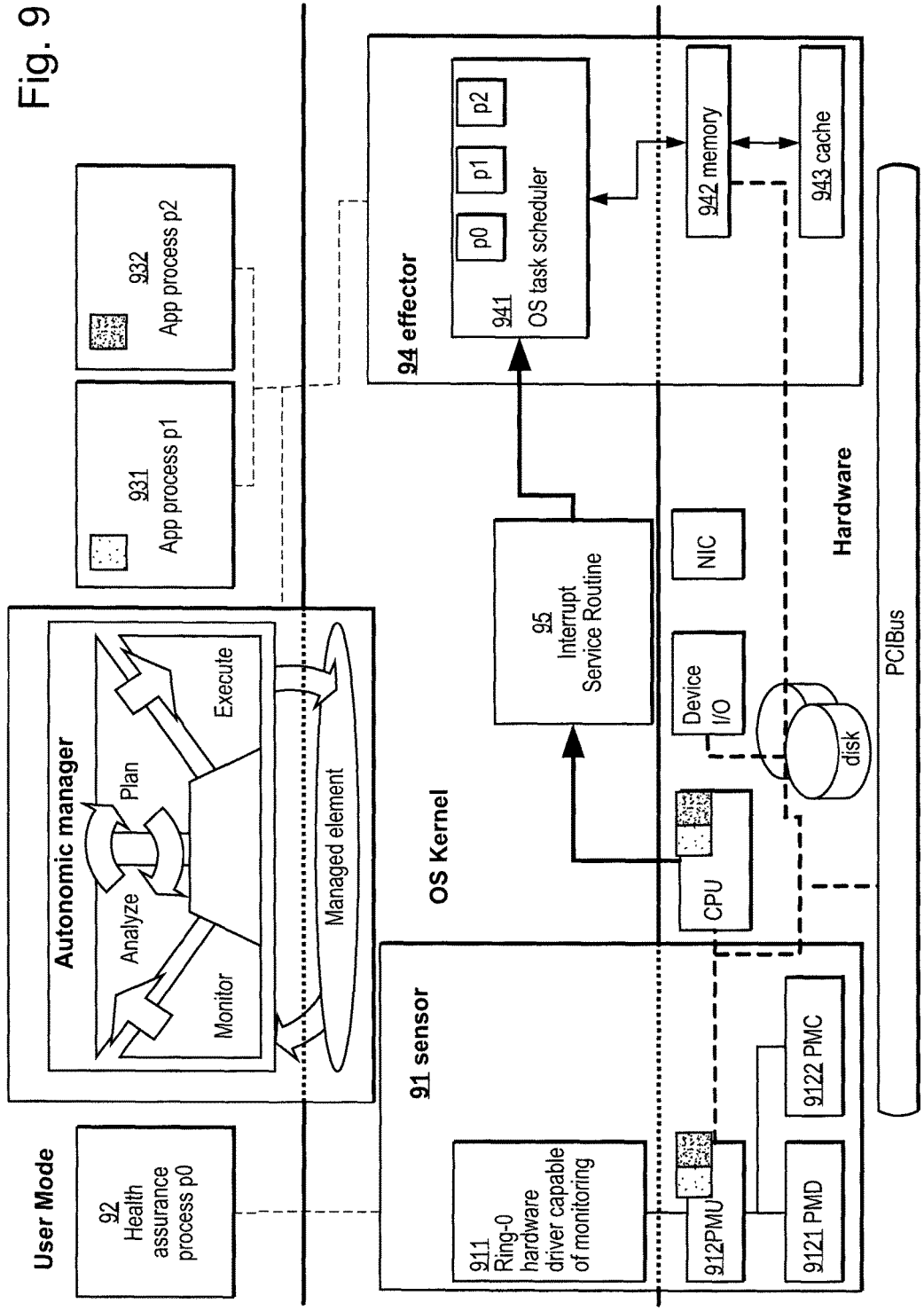

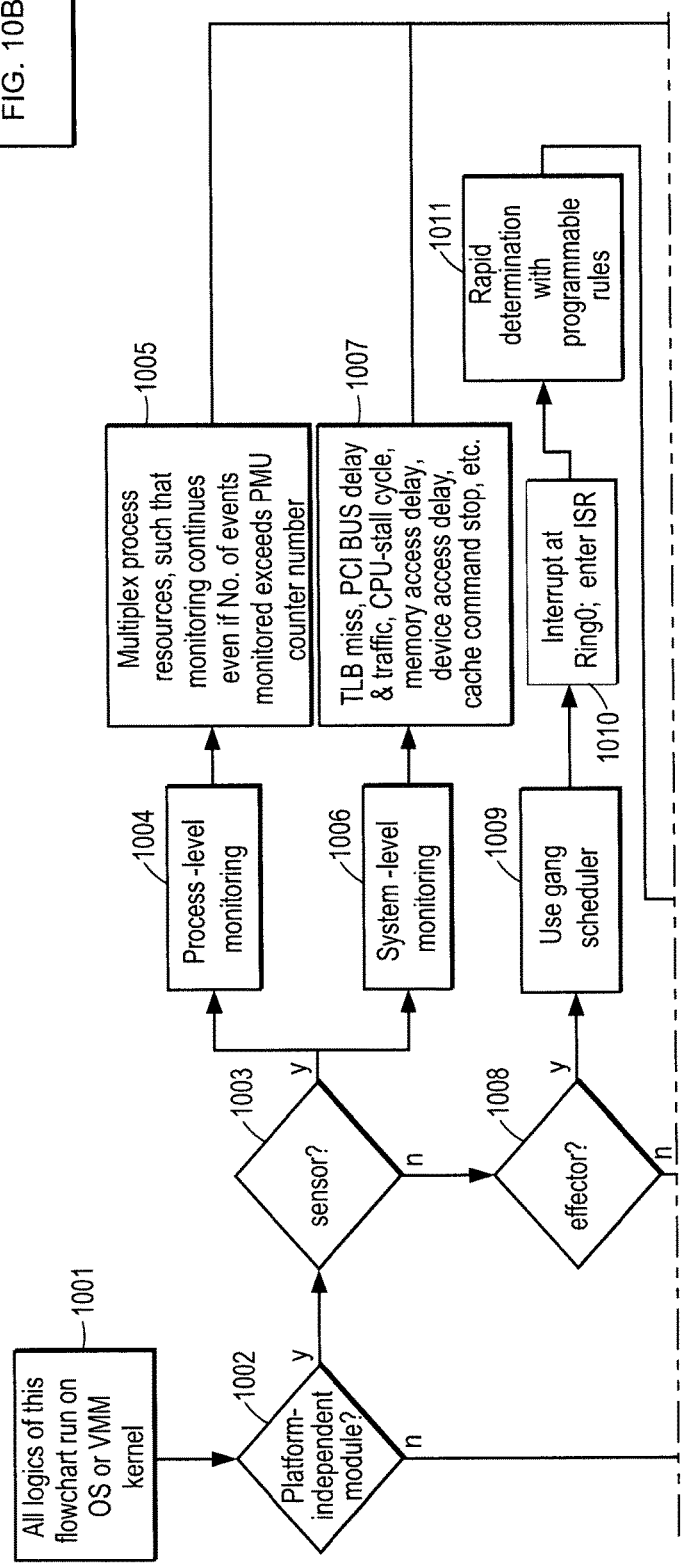

SYSTEMS AND METHODS OF AUTONOMIC VIRTUAL NETWORK MANAGEMENT

CROSS REFERENCE TO RELATED APPLICATION

This application is the national phase under 35 USC 371 of international application no. PCT/CN2013/075130, filed May 3, 2013, which claims the benefit of the priority date of Chinese application no. 201210137771.6, filed May 4, 2012. The contents of the aforementioned applications are incorporated herein in their entirety.

FIELD OF THE INVENTION

The disclosed invention relates to the field of autonomic computing and virtual network. More specifically, the present invention relates to three fundamental inventions in the field of autonomic computing: (1) systems and methods of Multi-loop autonomic management, preemptive contact point, and software-defined hardware resources; (2) service-delivering virtual network in the field of distributed network; and (3) the combination of said two fields of inventions, namely systems and methods of autonomic virtual network enabling the management of virtual networks which provide service delivery, to achieve n-tier ACRA (Autonomic Computing Reference Architecture).

BACKGROUND

Autonomic Management

Autonomic computing, also known as autonomous computing, is a new concept and reference standards, proposed by P. Horn of IBM of the United States in October 2001 in a paper titled "Autonomic Computing: IBM's Perspective on the State of Information Technology". Autonomic computing is widely considered to be a new generation of integrated computer technology. In the field of computer networks, the technology enables self management for network equipment and software on the network, with little or no human intervention.

The terminology "autonomic" is originated from neuroscience theory. Autonomic nervous system is widely distributed in organs' interconnected neural network. Coordinating through the sympathetic and parasympathetic nerves, autonomic nervous system can "autonomicly" regulates human body's various parameters (temperature, heart rate, blood pressure, blood sugar level, etc.), and keep them in certain ranges.

Currently there is no unified definition of autonomic computing. According to Kephart's "The Vision of Autonomic Computing", an autonomic computing system generally considered to have a set of four properties: self-configurating, self-healing, self-optimizing, and self-protecting. Among them, self-configurating refers to a system is capable of automatically configure itself based on high-level strategies to adapt to the changes in environment; self-healing refers to a system can automatically detect, diagnose and repair faults when some hardware/software failure or exception occurs; self-protecting refers to a system can protect itself as a whole when the system encounters a malicious attack, or a cascade failure occurs within the system due to self-healing was unsuccessful. At the same time, it can also predict a problem based on the reports from sensors, and take measures to prevent it; self-optimizing refers to a system can constantly look for effective ways to improve performance and reduce consumption. According Salehie's statistical data in his doctoral dissertation "A Quality-Driven Approach to Enable Decision-Making in Self-Adaptive Software", most of autonomic computing systems only focus on one or two of these four properties. Therefore, to be qualified as an autonomic computing system, is does not need all four properties existing altogether.

An autonomic computing system consists of several interconnected autonomic elements. Governed by some policy, while the autonomic elements achieve internal self-adaptive goals (i.e., local autonomic management), they also achieve a system-wise adaptive goal (i.e., global autonomic management) through interaction and collaboration. (The differences between "autonomic element" and "autonomic manager" are discussed in the description of FIG. 2B.)

In an autonomic computing system, a set of autonomic elements may cooperate to achieve some common goal. IBM's White Paper "An Architectural Blueprint for Autonomic Computing" describes a generic autonomic system architecture, called Autonomic Computing Reference Architecture (ACRA), see FIG. 1.

ACRA divides an autonomic computing system into three layers:

The lowest/bottom layer contains the system components or managed resources. These managed resources can be any type of resource, either hardware or software. Some of these resources can have some embedded, self-managing properties (see FIG. 1, a self-managed resource is depicted in the left side of bottom layer). Each managed resource may incorporate standard interfaces. Each standard interface corresponds to a sensor/effector set. On one hand, an autonomic element manages internal resources through autonomic manger; on the other hand, it provides standard interfaces (a sensor/effector set) outwards for being managed, including receiving policies from IT manager and collaborating information from other autonomic elements. Managed elements not only can be in-house resources, including databases, servers, routers, application components, web services, or virtual machines, but also can be other autonomic elements. For example, a parent-level autonomic element which is responsible for the global orchestration can manage multiple child-level autonomic elements.

The middle layer contains resource managers which are often classified into four categories: self-configuring, self-healing, self-optimizing and self-protecting. Each resource may have one or multiple resource managers; each manager controls its own feedback loop.

The highest/top layer of ACRA contains autonomic managers that orchestrate resource managers. These autonomic managers deliver a system-wide autonomic capability by incorporating control loops that realize broad goals of the overall IT infrastructure. The left side in FIG. 1 illustrates a manual manager that provides a common system management interface for the IT professional using an integrated solutions console. The various manual and autonomic manager layers can obtain and share knowledge via knowledge sources which are depicted on the right side in FIG. 1.

According to the current autonomic computing technology trends (i.e., examples in Salehie's doctoral dissertation), the vast majority of self-management systems are based on physical systems, and there is almost no example existing which is intergrated with virtualization technology. The present invention is focus on the virtualization method of autonomic management system.

Although Grell et al.'s patent (US2010/028736110) has used Complex Event Processing (CEP) engine to achieve Root Cause Analysis (RCA), it does not involve autonomic management method. In fact we may leverage the properties of CEP engine which can dynamically create and delete any instance of autonomic manager to achieve the virtualization of autonomic element in the middle layer of ACRA, and the applicable domain shall not be limited to RCA. As far as we know, the approach of using CEP technology to implement the autonomic managers of autonomic elements has not been disclosed in any previous patent, so the novelty and creativity of the present invention are reflected in the CEP design method of the autonomic computing system.

Virtual Network

The aforementioned virtualization should widely refer to virtual computing resources (such as virtual machines), network resources (such as virtual switches) and virtual storage resources, rather than only the virtualized operating systems (that is, the virtual machines) those skilled in the art are normally familiar with. Systems containing these virtual resources, in distributed situations, often include physical (non-virtual) computing, network, and storage resources. For example, a banking application development team may use some virtual and physical resources to develop and test simulations of these resources. However in the actual production environment, due to the possible performance degradation caused by virtualization, the virtual resources are not used. Therefore, we define "Virtual Networking" as: any distributed system using physical and/or virtual computing resources, network resources, and storage resources. A "Virtual Networking Management system" may be a system similar to the following standard-conformed systems: TMN, eTOM, NGOSS, TMForum or DMTF.

Although Virtual Network Management is multifaceted for the above standards, truly practical and innovative approach is rare. Those skilled in the art understand that operating system virtualization techniques such as VMWare, Xen or Linux KVM can improve server utilization and cost savings, but when facing large-scale data center resources, these techniques are not sufficient to "automate" complex user services. Moreover, even if they can use automation to improve virtual network efficiency of large-scale resources through integration, they cannot assure that there is no excessive use of resources to result in an "over-capacity" condition.

Virtual network management system includes multiple subsystems: application planning and design system, application delivery system, and a subsystem called the application assurance system which relieves the aforementioned over-capacity condition. As for the method of the application assurance under virtual networks, in Tang et al, U.S. patent Ser. No. 13/115,341 "kernel bus system to build Virtual Machine Monitor and the performance service framework & Method therefore", its performance services framework system itself does not mention the monitoring and collection of performance data. n Tang et al, Chinese patent 201110141642.X "A framework and method of monitoring performance of virtualized systems based on hardware base tool", the monitoring and collecting of performance data is presented separately. These two patents do not refer to each other, let alone the combination of autonomic management system, as well as the realization of such a combined approach.

Autonomic Management of Virtual Networks

For autonomic management of the virtual network applications, Barkai et al, U.S. Pat. No. 6,941,362B2 states a RCA (root cause analysis) approach for general network environment, but does not use the concept of autonomic management, nor does it mention its network environment includes any kind of virtual resources. Accordingly, the combination of the autonomic management system and method in the disclosed invention, and the automated virtual network management system (in particular the application assurance system), has never appeared in other patents.

SUMMARY

The invention relates to the field of autonomic computing and virtual network. More specifically, the disclosed invention relates to three basic inventions in the area of autonomic computing: (1) systems and methods of multi-loop autonomic manager, preemptive contact point, i.e. sensors and effectors, and software-defined hardware resource, or abstraction and virtualization of the hardware functions; (2) service-delivery virtual network in the area of distributed network, and application assurance systems and methods; and (3) integration of these two fields of inventions, namely autonomic managed virtual network, such that the management of virtual networks which provide service delivery, is able to achieve n-tier architecture system and method ACRA.

Three Basic Inventions in the Field of Autonomic Computing

These three basic inventions are: (1) multi-loop autonomic management system: the four MAPE loop processes: monitoring, analysis, planning, and execution, can be multi-looped in-between. Multi-loop autonomic management employs CEP to handle events, using software modules called Event Processing Agent (EPA). The EPA can use intelligent methods to achieve four multi-loop MAPE loop. (2) Preemptive points of contact for autonomic management system: the contact points are sensors and effectors that can take advantage of hardware performance monitoring tool running in the privileged ring 0 with preemption for pre-warning of possible failures and early prevention. (3) Software-defined physical resources: physical resources are reorganized in a physical point-of-delivery (POD). When the resources change, the event calculates their capacity via the virtual finite state machine (VFSM), becomes aware of the responding actions to resource rescheduling, hence optimizes the utilization of resources.

Autonomic manager itself can be virtualized. The significance is that frequent updates/deployment of autonomic managing software can be in real time, and can be centrally managed by the orchestrating managers. The method is: real-time decomposing and recomposing the autonomic management software components, and/or synchronizing the already-installed OS image of the autonomic management software (including policies and rules) to the resource manager of the managed host. Next, the said ring-0 preemptive contact point fundamentally overcomes the defect of "monitoring and monitored software are running at the same privilege, therefore impossible of pre-warning" in the past. This means a lot for autonomic management. What's more, the hardware can be virtualized (also known as software defined, but it is not operating system virtualization!), which is not easy to think of for those skilled in the art.

The Invention of Distributed Network Field

The disclosed invention uses an automated method for the service delivery of virtual network, which is different from the general eTOM (Enhanced Telecom Operation Map), NGOSS (New Generation Operations Software and Support), and TM Forum (Telecom Management Forum) approaches. As for the application assurance under virtual network, a network subsystem is used: Application Assurance System method. From the user perspective, network application assurance system is a tool to monitor and maintain the running of user application. It not only manages a variety of physical devices and user applications, but also manages various virtual devices. The utility of the present invention may be embodied in the system's virtual device management.

The Invention of Autonomic Management of Virtual Networks

The disclosed invention is the fusion of the above two areas of invention, while also stands on its own characteristics. Using session protocol, you can save/restore load condition; using cluster topology, you can control the huge number of hosts. In addition, the autonomic management system and method can be applied in the following five levels: physical POD, software-defined service, logical POD, service delivery platform, and user agent.

All of the above inventive concept can be divided into system inventions and method inventions. Details as follows:

| Invention main category | Invention subcategories | System | Method |
|---|---|---|---|
| Autonomic computing foundation | autonomic manager | Multi-loop autonomic management system (FIGS. 3, 7) | Multi-loop autonomic management method (FIGS. 4A, 4B, 5, 6, 7) |
| | | virtualized Autonomic manager (FIGS. 8, 9, 11) | |
| | Contact point | Preemptive contact point system (FIG. 9) | Preemptive contact point method (FIG. 10) |
| | Software-defined technology | Software-defined hardware resources system (FIG. 11) | Software-defined server method (FIG. 12) |
| Virtual network | | Virtual Network System (FIGS. 13, 14) | Virtual network automation method (FIGS. 15, 16) |
| | | Application assurance system (FIGS. 17, 18) | Application assurance method (FIGS. 19, 20, 21) |
| autonomic virtual network | | Autonomic virtual network system (all of the above system diagrams, and FIG. 22) | Autonomic virtual network approach (all of the above method diagrams and FIGS. 23, 24, 25, 26) |

The disclosed invention is a system of designing and constructing of multi-loop autonomic managers, including the design apparatus and construction apparatus, wherein, design apparatus, wherein said design apparatus adds at least one additional loop between the analysis part and planning part; multi-loop autonomic manager is an extension to the autonomic manager of the classical autonomic element model; and structure apparatus, wherein said multi-loop autonomic manager uses a diagnostic flowchart to express fault-diagnosing work steps; said fault-diagnosing work is a process of repetitive "hypothesis-generating→investigating→discovering→concluding", and eventually achieving the final fault-diagnosing conclusions, wherein said multi-loop autonomic managers under the autonomic computing reference architecture, forms a hybrid autonomic computing reference architecture combining classical and non-classical autonomic elements.

The disclosed invention is a method of multi-loop autonomic manager, comprising:

running each step of the diagnosis flowchart as an event, running each connections between the various steps of the diagnostic flowchart as an activity, and accordingly transferring the diagnostic flowchart into an event-driven process block diagram; and mapping each event in the said event-driven flowchart to an autonomic manager, such that the analysis part and planning part of said autonomic manager can be represented by a set of rules, wherein said rules is realized by complex event processing (CEP) technology; said autonomic managers under autonomic computing reference architecture forms a hybrid autonomic computing reference architecture; each part of the autonomic managers includes a plurality of instances of CEP engine; and each instance contains a plurality of rules.

One of the embodiments of the method, further comprising:

realizing said multi-loop autonomic manager through event-driven method;

defining an event processing agent (EPA) as a said instance of CEP engine;

building said autonomic manager by connecting four EPAs; and adding, by said autonomic manager built by said EPA, at least one extra loop between the analysis part and the planning part, wherein said autonomic manager is an extension to the autonomic manager of a classic autonomic element model.

One of the embodiments of the method, further comprising:

saving and searching, by said multi-loop autonomic managers, the rules of rulebase of said EPA, wherein past experience is preserved, and new rules are automatically learned;

forming, by monitor EPA, an event sequence containing at least one rule, and saving said event sequence in the rulebase of EPA;

searching, by analyzer EPA, an event sequence matching current stimulus; if successful, matching to the most similar hypothesis by similarity score; otherwise returning to said monitor;

recognizing, by planner EPA, an object and object parameters, and searching a hypothesis matching object and metastate; if successful, saving failed experience into the rulebase and matching the most similar recovery plan by similarity score; otherwise returning to said analyzer; and searching, by executor EPA, a recovery plan matching strategies; if successful, matching the best execution plan using fraction method; otherwise returning to the planner.

One of the embodiments of the system, wherein said hybrid autonomic computing reference architecture includes bottom, middle and top layers, comprising:

a bottom layer of said hybrid autonomic computing reference architecture includes virtual and physical network devices; said virtual and physical network devices as managed resources exist in said hybrid autonomic computing reference architecture; some of said managed resources themselves contain the properties of autonomic management;

a middle layer of said hybrid autonomic computing reference architecture includes a large number of autonomic elements of autonomic managers built by EPAs; each said autonomic element represents a management task originally performed by IT personnel manually; said autonomic elements as a resource manager exist in said hybrid autonomic computing reference architecture; a said autonomic element implements one of the tasks of self-configuring, self-optimizing and self-healing; and a top layer of said hybrid autonomic computing reference architecture includes an orchestrator orchestrating various middle-layers resource managers; said orchestrator controls the autonomic management of the global system.

The disclosed invention is a virtual autonomic management system, comprising:

image deployment module, wherein autonomic managers themselves are decomposed and recomposed by application virtualization component, and then directly deployed on physical or virtual operating system image, with the transmission using streaming technology during direct deployment; autonomic management system components in the virtual image is synchronized at any time, via differential technique, among the three tiers: the bottom, the middle, and the top layers of the autonomic computing reference architecture;

contact point module, including sensors and effectors of the autonomic managers, running inside of the virtualized host virtual machine monitor (VMM) and the hardware layer, possessing the host VMM secure ring-0 preemptive privilege, being able to provide prewarning alert for the non-preemptive processes approaching failure and take preventive measures; and hardware virtualization module, wherein the autonomic managers use hardware virtualization to manage physical and virtual resources; hardware virtualization use the VFSM of the software-defined server to store and search current states of the physical and logical resources; the resource manager at the middle-layer of said autonomic computing reference architecture is composed of various types of autonomic managers; said the resource manager manages virtual and physical resources where said virtual resources include virtual servers, virtual switches, and virtual net cards, and said physical resources include physical switches;

wherein said image deployment module, said contact point module, and said hardware virtualization module can be implemented for any autonomic management system, including multi-loop autonomic management system.

The disclosed invention is a preemptive-privileged contact-point system, including sensors and effectors, running on the operating system or virtual machine kernel space, and having kernel ring-0 security, comprising:

said sensor, when receiving stimulus coming from the hardware, determines possible faults; and said effector, when entering the kernel interrupt service routine, possesses the kernel ring-0 security and preemptive privilege, and controls memory manager, peripherals manager and task scheduler of kernel-level rings 1-3 security, in order to terminate, restart, change time slice of, or live-migrate non-preemptive processes running on an operating system or virtual machine.

The disclosed invention is an intelligent ring-0 contact-point method, comprising:

monitoring at the process-level by sensors, using multiplexing method so that the monitoring is able to continue even if the number of autonomic manager; the said resource manager manages virtual and monitored events exceeds the number of counters of performance monitoring unit;

monitoring at the system-level by sensors, comprising monitoring translation lookaside buffer miss, PCI bus latency and traffic, CPU stall cycles, memory access latency, device access latency, and cache instruction stall;

controlling the following activities if effectors are running on an operating system: setting the gang algorithm as the method of scheduler so that after rapid determination with process-based rule, the effector activates interrupt of interrupt service routine, controls scheduler to stop, restart, and stop the allocation of time slices of the process until the peak time is passed; and live-migrating virtual machines if effectors are running on a virtual machine.

One of the embodiments of the method, wherein the operating system platform-independent approach is implemented by porting the driver software of hardware performance monitor from Linux to other platforms.

The disclosed invention is a service method to define hardware resources as software, wherein the autonomic manager intercepting a plurality of independent concurrent requests;

mapping the requests to a virtual finite state machine (VFSM);

calculating the physical resource capacity with the VFSM;

mapping the ability to a physical machine; and satisfying the requests by the physical machine eventually.

One of the embodiments of the service method, further comprising:

monitoring and detecting the events of hardware requirement changes at the physical POD;

forwarding the event to software-defined server;

receiving the event by software-defined server and triggering VFSM executor;

looking up rules from rulebase of VFSM by VFSM executor;

determining whether the system is capable of achieving the event of requests based on the current state of the resources;

changing current state of the resource according to the result determined by VFSM executor, and then performing the actions;

obtaining the current status by the software-defined server and knowing the capability;

providing new data and service parameters by the software-defined server in order to provision the resources at the physical POD;

getting current capability and setting the new state by the software-define server; the status update triggering VFSM executor;

inputting, by VFSM executor, current resource status, service data and service parameters; looking up new services and parameters from the rulebase of VFSM;

determining, by VFSM executor, that there is a new entry service at physical point-of-delivery (POD), thus delivering, by service module, the service data and service parameters to the physical POD; and completing, by the service module of physical POD, the new provisioning in response to the initial request intercepted.

The disclosed invention is a method to implement a software-defined server, comprising:

forming, by physical POD and software-defined server, a client/server architecture according to the autonomic computing reference architecture of autonomic management, wherein the global components of software-defined server have a one-to-one correspondence to the local components of client-side physical POD, to realize a management information base (MIB) of finite state machine, an VFSM executor, a rulebase of VFSM and/or a monitor of VFSM with attributes and states regarding resources;

calculating, by the software-defined server, the capacity of resources in local net and external network, based on VFSM, wherein the VFSM can be used for system design time or run time;

calculating capacity and executing events, by VFSM executor, according to the VFSM model method built by satisfied resource state, service quality, and VFSM rules;

storing, adjusting, and searching rules of VFSM rulebase, by VFSM rule engine, in accordance with the intelligent multi-loop complex event processing method; and monitoring, by VFSM monitor, the capacity of VFSM with intelligent ring-0 sensors and effectors to prevent overload or over-capacity situations.

The disclosed invention is a service delivery virtual network system, wherein said virtual network system comprises six parts:

apparatus of enterprise environmental design and planning, wherein the business design services, interacted with the service process management office, and the business subscription service applications, interacted with the business users, under the business environment, wherein the said apparatus modifies and enhances the service-related strategy/commitment and infrastructure lifecycle management in Telecom Operations Map;

apparatus of enterprise environmental delivery management operated under the service offline logical environment, wherein the said apparatus modifies and enhances the product lifecycle management and service operations preparation and support (SOP&S) in Telecom Operations Map;

apparatus of enterprise environment online delivery and operation assurance, operated under the service online-delivery environment and business management part of the application assurance systems, wherein the said apparatus modifies and enhances the service contract fulfillment and service assurance in Telecom Operations Map;

apparatus of design and planning of IT resources, operated under the resources design services by system administrator, wherein the said apparatus modifies and enhances resource-related policy/commitment and infrastructure life cycle management in Telecom Operations Map;

apparatus of IT resource delivery management, operated under unallocated virtual and physical resources, wherein the said apparatus modifies and enhances the product life cycle management and resources operations preparation and support (ROP&S) in Telecom Operations Map; and apparatus of online delivery of IT resources and operations assurance, operated under online delivery environment with already-allocated virtual and physical resources and the resource management part of the application assurance system, wherein said apparatus modifies and enhances the resources contract fulfillment and resource assurance in Telecom Operations Map; virtual resources which have been allocated have the preemptive and sharing support of virtual resources; said virtual resources aggregate physical resources of different locations and configurations to achieve resource convergence, independent of physical resource types and deployment; said physical resources is realized in the data center of enterprise service partition and physical resources network, supporting subscription delivery, and supporting physical resources with space-sharing and time-sharing, including many unassigned and assigned network, storage, and computing physical resources.

One of the embodiments of the system, wherein said virtual resources aggregate physical resources of different locations and configurations to achieve resource convergence, independent of physical resource types and deployment; implementation of the physical resources and business business segments and physical resources data center network to support subscription delivery, and support by sharing space and by time sharing physical resources, including many unassigned and assigned network, storage, compute physical resources; said physical resources is realized in the data center of enterprise service partition and physical resources network, supporting subscription delivery, and supporting physical resources with space-sharing and time-sharing, including many unassigned and assigned network, storage, and computing physical resources.

The disclosed invention is an automation method for service delivery virtual network system, comprising:

scheduling and provisioning user services: including requirements design services, system resource analysis services, virtual resource reservation and deployment services for computing, storage, and network resource; scheduling and provisioning virtual resource; if the resource capacity is insufficient, processing quality-of-service and error service; and entering service-delivery service eventually;

scheduling and provisioning virtual resources: including virtual resource allocation, configuration, provisioning services, and software-defined services; scheduling and provisioning physical resource; if the resource capacity is insufficient, processing quality-of-service and error service; entering service-delivery service eventually;

scheduling and provisioning physical resource: accepting commands to configure resources from software-defined service of a resource model via resource model channel; realizing resource multiplexing, resource space sharing, and conveying resource notification to software-defined service; and processing total automation services: including application planning and application deployment, automatic resource planning and operations, dynamic provisioning of resources by business, and automatically mapping resources to the physical network and executing immediately.

One of the embodiments of the automated method, wherein the service-delivery service includes the following activities:

handling access procedure: If the user is an application provider, then meshing up service components, or opening application interface; implementing, by 7-layer switching, the automation of virtual service delivery and real-time service domain in accordance with the specifications provided by service factory to build logical services; if the user is an individual, using self-service and implementing, by 7-layer switching, the automation of virtual service delivery and real-time service domain;

processing service delivery: performing fast deployment and uninstallation on the logical core network, without touching the enterprise physical network and physical resources; running services under the monitoring of assurance systems; and building the POD processes: building physical POD for computing, storage, network physical resources; building the software-defined servers; converging physical resources of the data center; forming the POD drivers; and build logical POD for each service environment.

The disclosed invention is a virtual network application assurance system of autonomic management, comprising:

the central acquisition and control system, equivalent to the resource manager at the middle layer of hybrid autonomic computing reference architecture;

the agent running on managed-resource hosts and hosts, equivalent to the four performance MAPE service components: monitor, analyzer, planner, and executor, as well as two contact points: sensors and effectors at the bottom layer of managed resources; and the backend subsystem, equivalent to an integrated console with functions of top-layer orchestrating manager.

One of the embodiments of the system, further comprising:

said performance MAPE service components running from a slave host of a cluster, ie, the leaf nodes of the network, or the master host of the cluster, ie, non-leaf nodes, wherein the preemptive/mission-critical policies and policies of general applications are transmitted through the network to any node;

rules of said analyzer include hardware rules and application rules, and the master host of the cluster may also include network flow control rules;

said workload mediator in the planner mediates the cluster-level and transaction-level workload, orchestrates the analysis of global system, analysis of local application, and handles the process life cycle management by taking the advantage of preemptive interrupts; and policy execution points of executor exist in one or more virtual machines, virtual machine monitor, and kernel virtual machines, using radix-tree traverser to execute commands issued by planner.

One of the embodiments of the system, further comprising if the host operating system is virtualized, the monitor running in the virtual machine and/or user space; the executor running in a virtual machine and/or user space; and the virtual machine serial-port channels and Upcall/Hypercall forming two channels to facilitate the rapid transmission of short messages, wherein the two channels collecting performance information from the agent running on virtual machines, and performing decisions.

The disclosed invention is a method to implement network application assurance system with the part of autonomic management for virtual network devices, comprising:

implementing, by frontend subsystem, functions equivalent to management console plus orchestrator of said hybrid autonomic computing reference architecture; the alert management, configuration management, and performance management of said function realize the global management of three autonomic elements for middle-layer self-healing, self-configuring and self-optimization; the said hybrid autonomic computing reference architecture in the global top-level management subsystem is designed in the frontend subsystem; and implementing, by central acquisition and control subsystem, functions equivalent to the middle-layer of said hybrid autonomic computing reference architecture; During system initialization, the discovery function of network topology automatically finds all the topology information of managed resources in the network, including host, network devices, applications, servers, and databases; said topology information is stored in the expert database; said expert database features data aggregation, analysis, calculations and fault correlation analysis for three kinds of autonomic elements: self-healing, self-configuring and self-optimizing; said functions use artificial intelligence methods to implement the functions of orchestrator at the top layer of hybrid autonomic computing reference architecture, wherein the hosts of managed resources have full set of local autonomy elements, so that said local autonomic elements enable the hosts to self-manage according to local policies in case of disconnection with the central collection and control system;

wherein some hosts of managed resources have incomplete autonomic elements which may miss analyzer part, planner part, or knowledge base part such that the host corresponding to said incomplete autonomic elements can not self-manage, but can provide sub-level monitoring for the monitoring part of central acquisition and control system, and can provide sub-level execution for the execution part of the central acquisition and control system.

The disclosed invention is an autonomic virtual network system, comprising:

apparatus of autonomic hardware POD;

apparatus of autonomic software-defined service;

apparatus of autonomic logical POD, multiplexing resources of software-defined server, and utilizing autonomic management to achieve resource scheduling of push and pull between the logical POD and software-defined server;

apparatus of service delivery platform (SDP) for autonomic management, including deployment automation, application lifecycle management, business services, and subscription services; SDP apparatus utilizes autonomic management to achieve operation-related competition for resources between said SDP server and the server with multiple logical POD; SDP apparatus utilizes autonomic management to achieve operation-request-related competition for resources among multiple user agents; and apparatus of autonomic management user agent, including system administrators, operations personnel, and enterprise service users, and enterprise project management office; said user agent possesses intelligent autonomic management capabilities and a graphical interface;

Wherein the above apparatuses have layers of autonomic management, similar to the layers of classic autonomic computing reference architecture level, but expanded to n-tier from three layers.

The disclosed invention is a method to implement autonomic management virtual network system, comprising:

implementing multi-loop autonomic management method;

implementing virtual network method; and implementing autonomic virtual network-specific method, comprising session protocol, logical POD service, SDP and cluster topology.

One of the embodiments of the method, wherein said session protocol includes the following activities:

completing, by virtual network, business planning/design environment to ensure the integrity and quality of service, due to session protocol wherein said session protocol is stateful, can handle failure recovery in point-to-point communications, can use Proxy/Gateway acrossing virtual network clusters, and can package/deliver workloads of other virtual network protocols, representing an enterprise application with a session, and representing multiple services in an application with a sub-session, wherein the session packet header containing the user's identity, the history log conveyed amongst various agents, and the synchronization checkpoint of the session commands, if there is a change of state resources, resending, by session protocol, the protocol commands to convey the fact that state of resources changes in said workloads of other virtual network protocols;

if the session protocol is Session Initiation Protocol, resending the invitation instructions;

the content of said workloads of other virtual network protocols comprises:

if the protocol is between the user agent and delivery platforms, generating first, by user requests, access session, wherein the main workloads are the user's requests and the final responses;

if the protocol is between the delivery platform the logical POD server, generating the service session after access request is verified, wherein the main workloads are the competed, selected, and isolated logic resources;

if the protocol is between the logical POD server and the software-defined server, binding, in the service session, the logical POD and services requested by the user, wherein the binding continues until the service is completed, when the service session is also ended, and the main workloads are physical resources that have been converged by of software-defined server, to become logical resources; processing push and pull scheduling; and if the protocol is between the physical POD and the software-defined server, the main workloads are physical resources to be converged, predefined state changes and predefined state notifications.

One of the embodiments of the method, wherein the logical POD server contains one or more logical PODs, each said logical POD has 3 provisioning activities comprising:

supporting, by space-sharing and time-sharing logical POD, virtual server wherein said virtual server oversubscribes physical host servers; each virtual server, relative to other virtual servers, has different hardware specifications amongst them; and physical host is transparent to the provisioned instances;

provisioning on-demand the virtual server's hardware specifications and the virtual server's operating system on top of each virtual server; and provisioning on-demand the application server on top of each oversubscribed operating system, In addition to provisioning on-demand virtual server's operating system.

One of the embodiments of the method, wherein the implementation of the logical POD comprising:

facing SDP, by logical POD, wherein the said logical POD in dealing with competition, multiplexing virtual resources to converge network resources, and resolving resource competition among multiple service logical PODs based on VFSM executor methods and VFSM rulebase; if competition among operation requests, comparing different service operational requests and obtaining competition result under quality of service; if competition among operations, comparing the available resources of software-defined server, and the logic POD requirements of various services in the physical POD server to obtain competition result under quality of service; and facing server-defined software, by logical POD, wherein the said logical POD processing push or pull scheduling between the software-defined server and the logical POD servers; if push scheduling, committing demand for resource changes regardless of physical POD capability, and supporting concurrent resources provisioning; If the pull scheduling, committing demand of resource change only after the physical POD has its capacity ready, and supporting concurrent resources provisioning.

One of the embodiments of the method, wherein the SDP platform receives requests from different users, comprising:

if system administrators, obtaining competition result in accordance with the simple rules of quality of service;

if enterprise service personnel, entering the service life-cycle management;

if service operations personnel, entering deployment automation; and if project manager, entering the subscription service, performing multi-department/multi-service aggregation via MAPE engines of the business server, and providing service environment to enable said project manager to perform service design; if interacting with logical POD server, issuing commands to said logical POD server in accordance with the results of MAPE engine calculation, receiving notification from the logical POD server regarding insufficient logic resources and forwarding said notification to MAPE engine, wherein said MAPE components of service server are global, while the MAPE components of logical POD server are local to said logical POD server; rulesbase of MAPE engine of service server considers not only the competition for resources among logical POD servers, but also the service requests from the users;

wherein service server, when facing project operations user, performs service life-cycle management, wherein business project server handles configuration, activation, deployment, uninstallation, service assurance, service scheduling and FCAPS management; and wherein service server, when facing logical POD, makes one-to-one correspondence between logic PODs and service projects, so as to use software program to manage office users for subscribing to virtual resources, and further subscribing to a distributed physical resources; service server provisions service environment and provides service design to the project manager.

One of the embodiments of the method, wherein said virtual network forms a cluster topology and said cluster topology forms multiple physical PODs and logical PODs, comprising the following activities:

partitioning, by said cluster topology, multiple hosts into a plurality of clusters, wherein the cluster slave nodes allow limited failure; master and slave nodes in the same cluster are homogeneous; clusters need to support load balancing; physical resources can be first divided into a number of physical PODs, each POD owning multiple clusters; logical PODs can be multiple due to the design of different users; logical POD provides on-demand-OS (operating system) service, to rapidly deploy virtual machines on the host;

partitioning, by said cluster topology, multiple physical cluster into a single physical POD or a plurality of physical PODs;

limiting logical POD to the same single cluster if based on original single physical cluster; ignoring said limitation if based on multiple physical cluster; wherein said two selections can be configured by the user;

virtualizing physical servers, by on-demand-OS logic POD, in order to provide more diversified development/testing equipments; not virtualizing physical servers, by space-sharing-only logical POD, in order to ensure high-quality computing and system performance; wherein said two selections can be configured by the user;

facing applications, by logical PODs, wherein each said logical POD connecting to SDP carries a version number, and uses the storage system of SDP to achieve storing and restoring; and facing software-defined server, by the logical PODs, wherein pull scheduling is used to achieve the backend resource commitment, in order to avoid network traffic bursts.

Comparing with the prior art, the disclosed invention focuses on (1) the field of multi-loop autonomic management, preemptive point of contact, and software-defined hardware resources, (2) the field of service delivery in distributed network and systems/methods of application assurance, and (3) the integration of the above fields of inventions to provide an autonomic virtual network service delivery management.

BRIEF DESCRIPTION OF THE DRAWINGS

FIG. 9 is the block diagram of a smart Ring-0 sensor and effector system;

DETAILED DESCRIPTION

Combining the embodiments with the accompanying drawings, the disclosed invention is further described.

Classical and Non-Classical Models of Autonomic Element

Figure 2A:
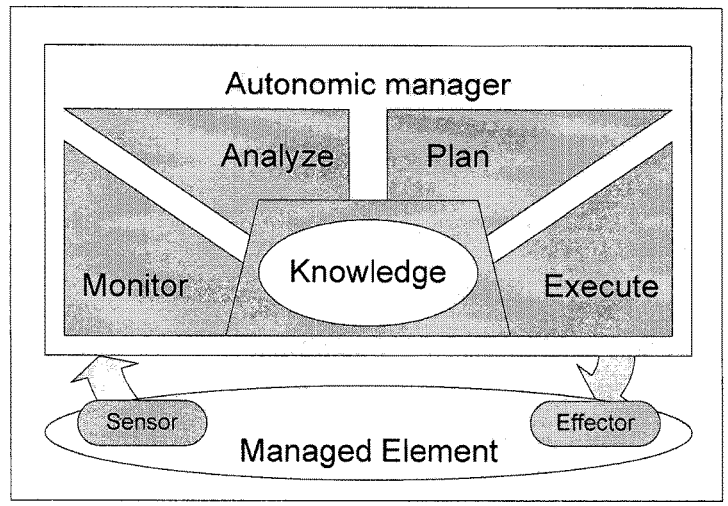
FIG. 2A is a classical model of autonomic element.

FIG. 2A depicts a classical model of autonomic element. According to Kephart's description, autonomic element is the basic building block in autonomic computing system. It consists of an autonomic manager and one or multiple managed elements. Autonomic manager replaces those IT professionals who had manually carried out some routing tasks, including status awareness and system configuration, healing, optimization and protection etc. Autonomic manager achieve the management tasks through a "monitor—analyze—plan—execute" control loop. The software components of these four phases are known as MAPE components. For more details, please see Kephart's "The Vision of Autonomic Computing".

Figure 2B:
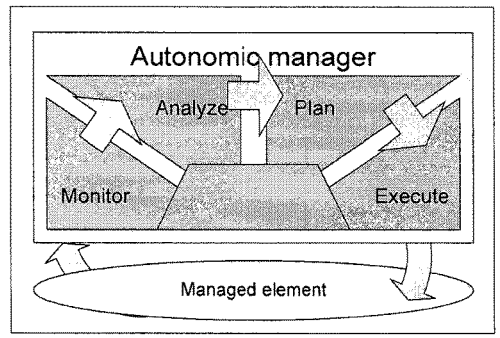
FIGS. 2B and 2C compare classic and non-classic loops within autonomic element.
Figure 2C:
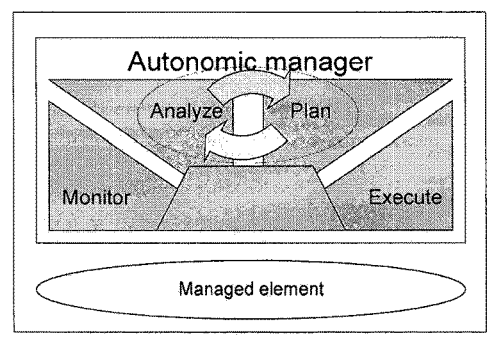

FIGS. 2B and 2C compare classic and non-classic loops within autonomic element. Operating in four phases, an autonomic manager is just a part of an autonomic element. It does not include the knowledge base and the touchpoints (sensor+effector) of managed elements. A classic autonomic element has so-called "external loop", as shown at the left side of FIG. 2B. The external loop includes sensor□monitor□planer□analyzer□executer□effector, and the loop may iterate multiple times. These concepts are IBM's autonomic computing technology already have. The present invention introduces "internal loop" which may iterate multiple times within an autonomic manager. Unlike "external loop", "internal loop" may happen between two MAPE components (i.e. monitor analyzer, analyzer planer, planer executor), and the loops may iterate multiple times. The right side autonomic element in FIG. 2B only depicts the loop between analyzer↔planer within an autonomic manager. However, "internal loop" may also exist between analyzer planer, or planer executor. The necessity of "internal loop" will be explained through FIG. 3, FIG. 4A, FIG. 4B, and FIG. 5.

Event-Driven Diagnostic Process

Today, root cause diagnosis in network system is still largely carried out by IT professionals step by step according to some standard troubleshooting manual.

Figure 3:
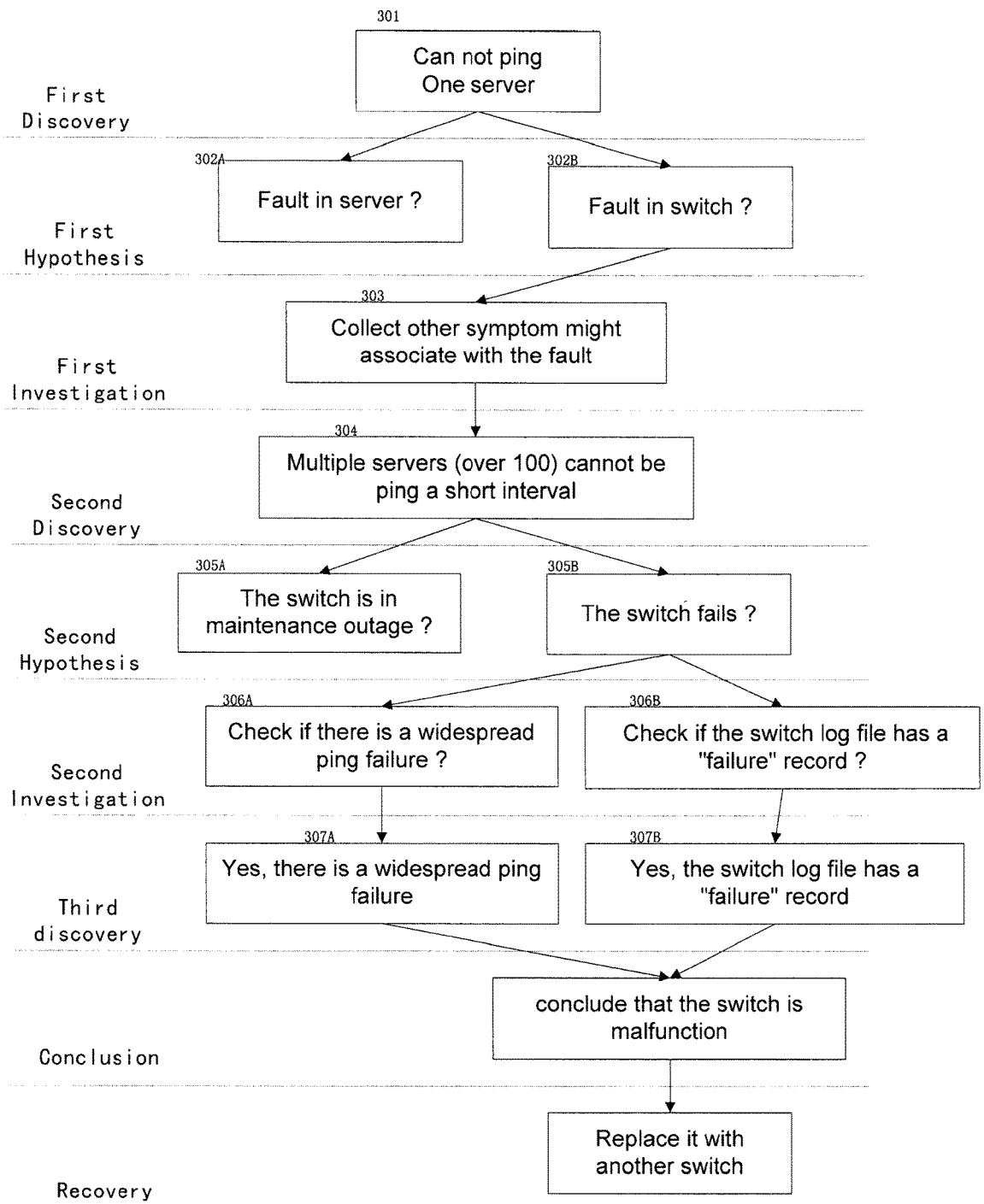
FIG. 3 is a diagnostic flow chart of "switch failure"

FIG. 3 is a diagnostic flow chart of "switch failure".

Step 301: detected a symptom—can not ping (connect to) one particular server.

Steps 302A and 302B: record the fault-related information, such as server number, time of occurrence; Start an initial diagnostic process.

Step 303: collect other symptoms might associate with the fault.

If only one server cannot be ping, then the server might be in maintenance outage, or there might be a fault in the server.

If there are multiple servers (over 100) cannot be ping a short interval, then the switch might be in maintenance outage, or there might be a switch failure.

Step 304: start the follow-up diagnostic process. There are four hypotheses:

If the server is in maintenance outage, you need to check whether the ping failure is an isolated symptom; need to check whether there is a "shutdown" record in system-log file; need to ask network administrator if he/she is conducting some maintenance work.

If the server fails, you need to check whether the ping failure is an isolated symptom; need to check whether there is a "failure" record in system-log file.

If the switch is in maintenance outage, you need to check whether there is a widespread ping failure; need to check whether there is a "shutdown" record in system-log file; need to ask network administrator if he/she is conducting some maintenance work.

If the switch fails, you need to check whether there is a widespread ping failure; need to check whether there is a "failure" record in system-log file.

Step 305A and 305B: If the switch log file has a "failure" record, and there is a widespread ping failure, then we can conclude the switch is malfunction and no further diagnosis is needed.

Step 306 A and 306B: the solution for switch malfunction is replacing it with a new switch.

Step 307 A and 307B: Reping the server which could not be ping. If repinging the servers is successful, it means the diagnosis of "switch fails" is correct.

By observating a considerable mount of troubleshooting processes, we found that they all comply with certain rules. In most cases, they follow a process of "hypothesis generation→conducting experiments→observing effects", which has long been known as the "scientific method". In many cases, the investigation result from a single iteration of above process may not sufficient to draw final conclusion, so the process of "hypothesis generation→conducting experiments→observing effects" needs to iterate many time, until final conclusion is reached. Since the troubleshooting process complies with above rule, we may replace IT professionals with computers to perform some routine tasks in root cause analysis.

It is noteworthy that the objective of network fault diagnosis may not only exist in the physical network environment, but also present in the virtual network environment. In a virtual network environment, servers and switches can be virtual, that means, the objective of diagnostic process are software running on hypervisor. They can be manipulated by underneath hypervisor, such as: virtual machine start-up or shutdown. Therefore, in principle, we can not only replace IT professionals with computers in step 301 to step 305 of troubleshooting, but also use computers to perform step 306 to step 307 in failure recovery.

We can leverage ACRA to design an autonomic management system for virtual network management, using computer to perform troubleshooting and recovery tasks. The autonomic management system of virtual network should have the following features:

(i) Self-configurating: it can adapt to the changes in network system. Such changes may include adding new network devices or removing existing devices; deployment of new software or undeployment of existing software. Dynamic adaptation feature helps virtual network to ensure the continuous operation of computing equipment software.

(ii) Self-optimizing: it is able to automatically monitor and orchestrate resources to meet the end-user or enterprise's requirements, and provide high performance services;

Self-healing: it is able to detect system failures and start treatment processes without disrupting the rest parts of the system. With these features, the virtual network becomes more resilience.

Switch Failure Diagnosis Process

Autonomic managers can be realized by two approaches, one is polling, and the other is event-driven. Since event-driven approach has realtime property with short system latency, and it is able to handle large amount of events, the virtual autonomic manager we designed is mainly based on this approach.

We still use forementioned switch fault diagnosis and recovery process as an example to illustrate how to systematically design a virtual autonomic manager, especially its policy part.

We use a flowchart to represent the troubleshooting steps in forementioned switch fault diagnosis process, please see FIG. 3. When the first symptom "can not ping one server" is detected, the first hypothesis made is "the failure might be associated with the switch." After the first investigation carried out "to collect the symptoms may be associated the failure" is completed, the second symptom "can not ping multiple (more than 100) servers in short interval" should be enough to confirm the first hypothesis, but not enough to draw final conclusion, which indicates whether the failure was caused by "switch maintenance outage" or by "switch failure." Therefore, the system proposes the second hypothesis "switch failure." After the second investigation, (if) the third symptom includes "a widespread ping failure" and "a 'failure' record in system log file", and then the system can draw the final conclusion which indicates "switch failure".

We may notice that the above switch failure diagnosis process "hypothesis generation→conducting experiments→observing effects" has been carried out three times before reaching to a final conclusion. In fact, when the system discovered the first symptom "can not ping one server", there are four hypotheses existing: server in maintenance outage, server failure, switch in maintenance, switch failure. Out of simplicity considerations, FIG. 3 only depicts the "switch failure" diagnostic process, and the processes leading to the other three conclusions are omitted in the flow chart.

Of course, when the first symptom "can not ping one server" is detected, if the system can investigate and then find all the symptoms needed in one iteration, namely "can not ping multiple (over 100) servers in short interval", "a widespread ping failure" and "a 'failure' record in system-log file", it can draw the final conclusions "switch failure" immediately without multiple iterations of the process. In reality, these needed symptoms often exist in different locations, different levels, and even different time intervals within the network system. Often, collecting all needed symptoms at once is not affordable, and sometime (especially when multiple causal relations exist among the symptoms) not attainable. Of course, when the causal relation is relatively simple, that is, the symptom and the cause of failure is a one-to-one mapping relationship, the system can immediately reach to a final conclusion, without going through the process "hypothesis generation→conducting experiments→observing effects". More details see below.

One important method of the present invention is that: we consider each step (the content in each rectangle box in FIG. 3) as an event. Each arrowline connecting to rectangle box can be seen as an activity. In FIG. 3, thirteen rectangle boxes represent thirteen events. These events can be classified into five categories: discovery event, hypothesis event, investigation event, conclusion event, and recovery event. The arrowlines in FIG. 3 represent the five types of activities in a process, namely: generating hypothesis, conducting investigation, observing result, drawing conclusion, making treatment.

Figure 4A:
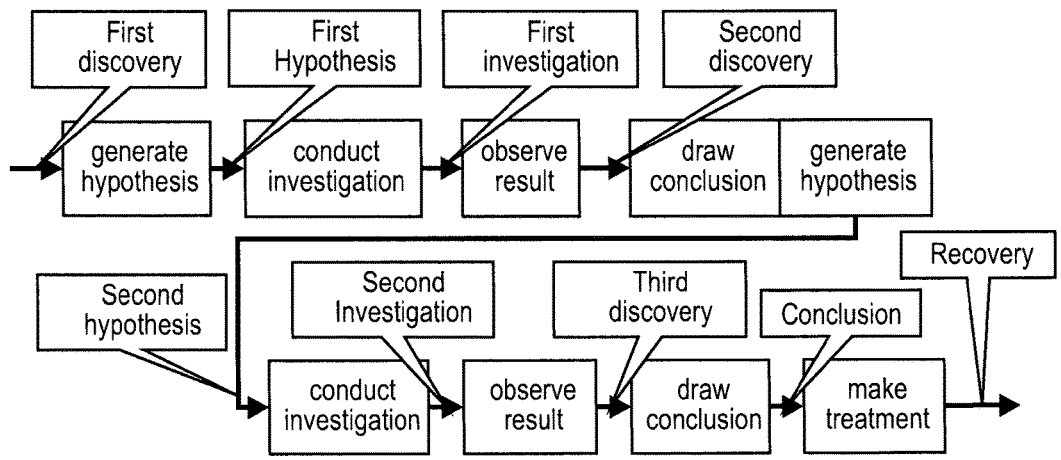
FIG. 4A is the block diagram of an event-driven diagnostic process.

If we replace all boxes in FIG. 3 with arrowlines, and replace all arrowlines in FIG. 3 with boxes, thus, we convert FIG. 3 into a flowing diagram of event driven process, please see FIG. 4A.

Event Mapping and External Loop

Please see FIG. 4A, currently activity in each box is carried out step by step by IT professionals according to standard operation manual, and our goal is to use computer to execute these judgement tasks. Therefore, we map the events into an autonomic manager in FIG. 4B. Thus, Analyze and Plan parts of an autonomic manager can be represented by two set of Finite State Machine rules.

The rules of Analyze part are:

```
State 0: if discovery_event ("can not ping one server")
    then {
        output hypothesis_event ("the failure might be associated
            with server");
        output hypothesis_event ("the failure might be associated
            with switch");
        State increased by 1
    }
State 1: if discovery_event ("can not ping server count>100") ;
    then {
        output hypothesis_event ("switch maintenance outage");
        output hypothesis_event ("switch failure");
        State increased by 1
    }
    State 2: if discovery_event ("can not ping server IDs are
different", i.e. "a widespread ping failure") and discovery_event
(a "failure" record in system log file)
        then {
        output conclusion_event ("switch failure");
        State set to 0
        }
```

The rules of Plan part are:

```
State 0: if hypothesis_event ("the failure may be associated
    with switch")
        then {
        output investigation_event ("collect other symptoms might
be associated with the failure");
        State increased by 1
        }
    State 1: if hypothesis_event ("switch failure")
        then {
        output investigation_event ("a widespread ping failure");
        output investigation_event ("a 'failure' record in system log
            file");
        State increased by 1}
    State 2: if conclusion_event ("switch failure")
        then {
        output recovery_event ("replacing switch");
        State set to 0
        }
```

Figure 4B:
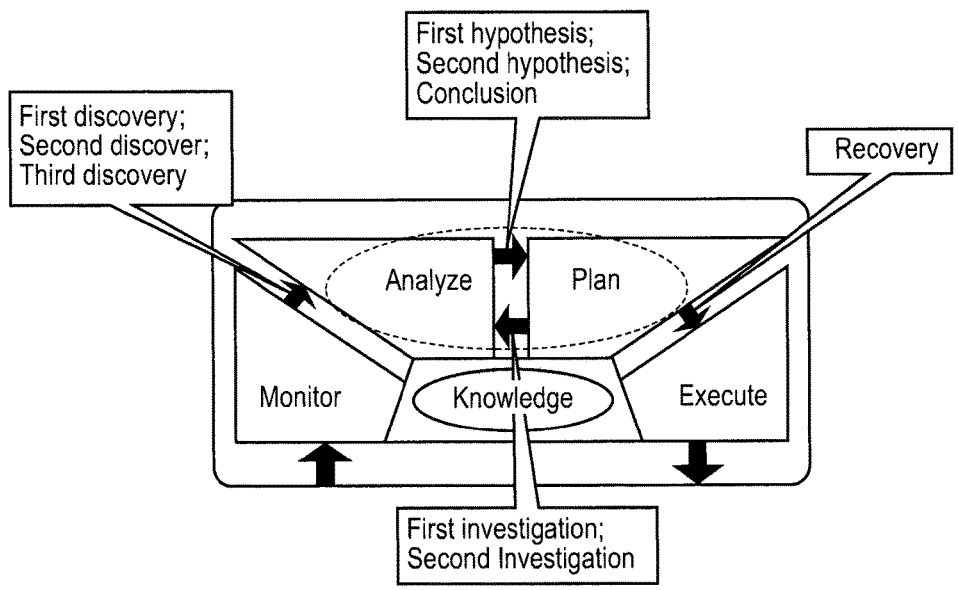
FIG. 4B describes the situation where various events are mapped to an autonomic manager, as well as an additional loop exists between the analysis process and planning process.

Please see FIG. 4B. The rules of Monitor and Execute parts in autonomic manager are relatively simple. They do not contain states. But the inputs or outputs may vary according to specific circumstance.

The rules of Monitor part are:

```
if exist Warning ("pinging a server fails")
    then {
        output discovery_events ("can not ping one server")
    }
if count Warning ("pinging a server fails")> 100, the interval is 30
seconds)
    then {
        output discovery_events ("can not ping server count> 100")
```

```
}
The rules of Execution part are:
if exist recovery_event ("replacing switch")
    then {
    create alternate switch;
    Migration;
    Remove the failed switch
    }
```

Complex Event Processing Steps

Figure 5:
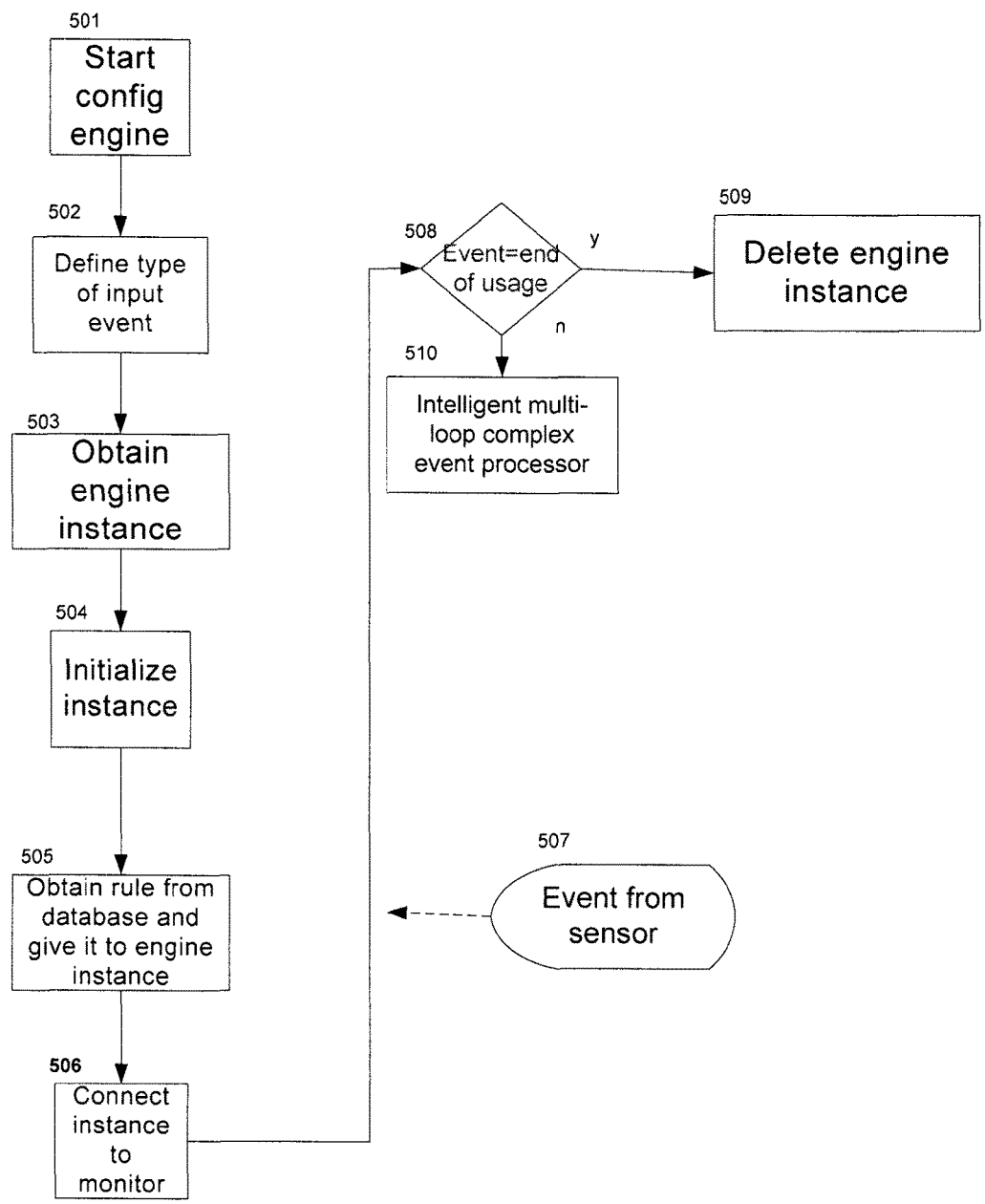
FIG. 5 is a flowchart of creating a CEP engine instance.

The rules introduced above can be implemented by Complex Event Processing (CEP) technology, please see FIG. 5. Specifically, they can be implemented by Esper engine instance, or other CEP engine instance. Since CEP technology has not been unified and become a standard description language yet and the difference between different CEP language engines vary significantly, we just use ESP language as an example, and the present invention shall not be limited to a specific CEP language such as ESP.

Suppose we use Esper as our CEP engine, for the forementioned diagnosis and recovery process case, we may use four Esper engine instances to achieve the four-part rules of an autonomic manager. For a fault diagnosis and recovery process, we can use a autonomic manager to make the process autonomic (i.e., each process maps to one sets of autonomic manager rules). Each of four parts of an autonomic manager includes an Esper engine instance. And each instance contains multiple rules.

According to David Luckham's book "The Power of Events", each forementioned instance can be considered as an Event Processing Agent (EPA). An autonomic manger is consists of four interconnected EPAs. Luckham calls such a type of interconnected EPA network as Event Processing Network (EPN). Although the concept of EPN has been introduced for several years (The "Power of Events" book is published in 2005), but application examples of EPN are rare, most CEP applications use one single CEP engine as rule engine rather than EPN to process large amount of events from multiple event streams. Using the property of CEP engine instance can be created and put into use in realtime speed, CEP technology can be applied to dynamically manage virtual network, which is one of the novelties of the present invention.

Each CEP engine instance can be dynamically created and deleted. We can convert a series of fault diagnosis and recovery operations into a set of rules, and put it into database. When the rules are needed, they can be fetched from library, and added into four new-created CEP engine instances. Then these four CEP engine instances will be added into four parts of autonomic manager: Monitor, Analyze, Plan, and Execute, respectively. The steps of creating a CEP engine instance is displayed in FIG. 5:

Step 501: Start engine configuration,
    Configuration config=new Configuration( );
Step 502: Define input event type, such as Monitor,
    config.addEventType ("Monitor", Monitor. class);
Step 503: Get the engine instance,
    epService=EPServiceProviderManager. getDefaultProvider (config);
Step 504: If the engine has been instance used, it need to be initialized,
    epService.initialize ( );
Step 505: Fetch rule(string type) from database rule and assign it to the engine instance,
    EPStatement statement=null;

statement=epService.getEPAdministrator( ).createEPL (rule);

Step 506: Connect the engine instance to MonitorListener ( ), statement.addListener (new MonitorListener( ));

Input 507: Event collected by sensor arrived;

Step 508: Whether it is the "end of use" event,

If yes, go to step 509; if not, go to step 510;

Step 509: the engine instance can be deleted to free its resource after using, epService.destroy ( );

Step 510: intelligent multi-loop complex event processing.

Because the input and output of EPA are all event streams, and the steps described above do not associate with any specific hardware equipment, these EPAs (i.e., autonomic manager) can be dynamically replaced without affecting managed elements underneath. Therefore, autonomic managers can be created or deleted online while virtual network is operating. Autonomic managers themselves could be virtual too, which is one the unique features of the present invention.

While using EPA rules to represent fault diagnosis and recovery operations, the structure of autonomic manager is different from the examples in classical autonomic system. The main difference is there is an extra loop between Analyze and Plan part of autonomic manager. Please see the oval part in the right side autonomic element of FIG. 2B. This extra loop does not exist in the example of classical autonomic element. Therefore, this non-classical autonomic manager is considered as an extension of classic autonomic manager in autonomic element.

Because of such an extra loop (may iterate many times), autonomic manager constructed with EPA has stronger root cause analysis capabilities than the ones in classical autonomic system. Autonomic manager can automatically simulate the process "hypothesis generation→conducting experiments→observing effects", which is originally performed manually by IT professionals in a root cause diagnosis process. Accordingly, the rules of Analyze and Plan parts use "state" mechanism (equivalent to finite state machine). Different "states" reflect the current status of autonomic manager in an iteration loop. They are driven by various events.

Of course, among the failures of managed system, a lot (sometimes majority) of causes are relatively simple. Symptoms and causes of those failures are often just one-to-one mapping relations. Thus, the root causes of the failures can be determined immediately according to rules, without going through the extra loop. In these cases, autonomic managers constructed by EPAs do not include an extra loop, so they shall still comply with the classical autonomic element model.

Intelligent Multi-Loop Complex Event Processing Method

Figure 6:
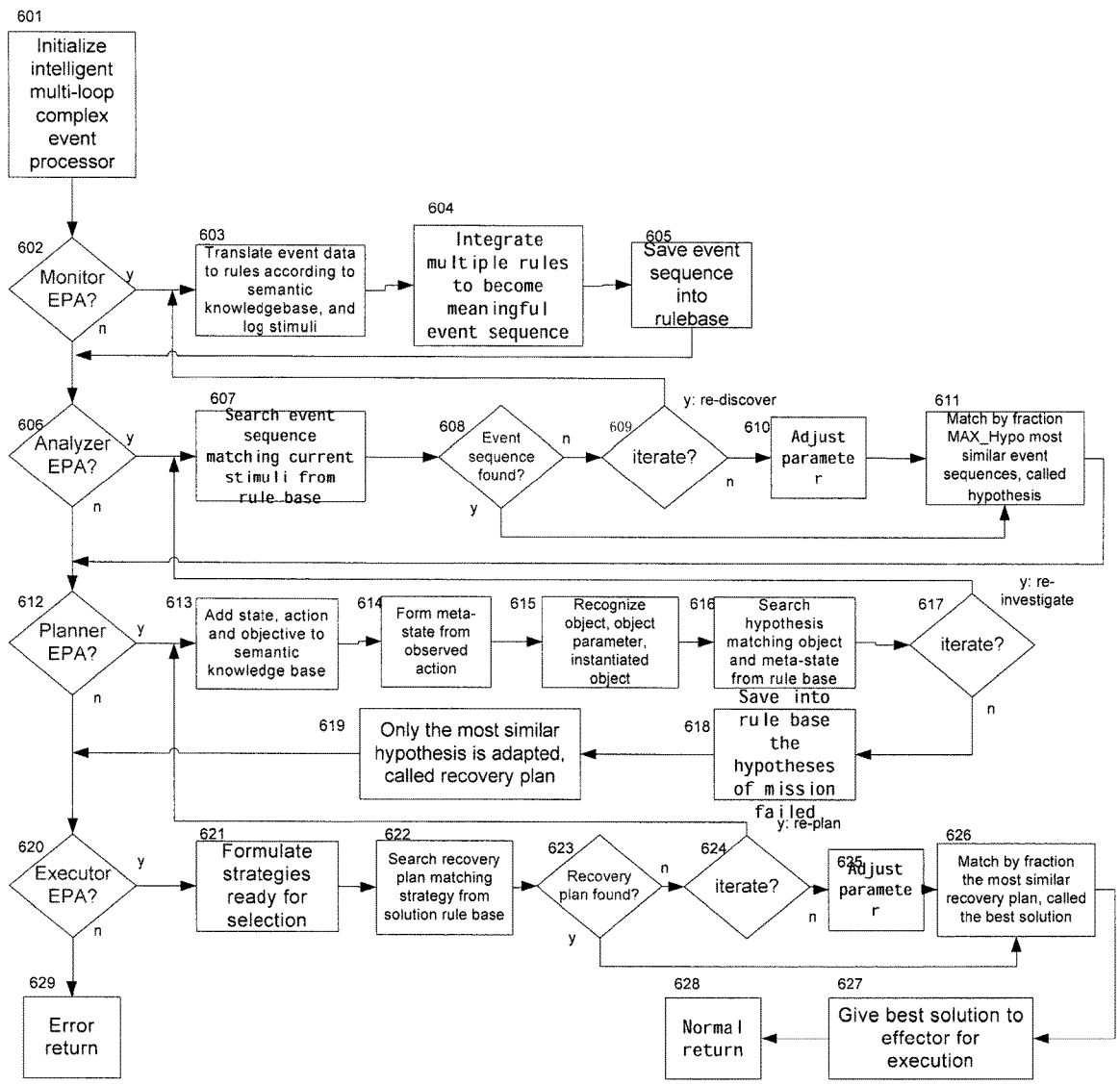
FIG. 6 is the flowchart of a method for an intelligent complex event processing.

FIG. 6 shows the intelligent multi-loop complex event processing method. CEP itself is not necessarily intelligent, but the design of EPA can insert intelligence, and learn from past experience. As mentioned earlier, the origin of autonomic computing is to imitate the human brain's executive function, and during brain execution the neurons responsible for memory play an important role. This memory is divided into three types: episodic memory, semantic memory, and procedural memory. Episode is a set of events meaningfully combined, hereinafter referred to as "event sequence". Event sequence may contain only a single event, such as "CPU utilization reached 95%." The best example of event sequence containing multiple events is the product problem reports, consisting of several user inquiries and replies from customer service staff. Each inquiry/reply pair is an event, and all the pairs relating to the same problem compose a multi-event "event sequence". Event sequence is similar to short-term memory, constantly changing, but the cumulative experience becomes long-term memory, which can usually be imitated by a "rule base". Semantic memory is some relatively unchanged fact, e.g., "the previous version of Windows7 released by Microsoft publicly is Windows Vista". Such fact is usually stored in the "knowledge base". Refer to Dan Gabriel Tecuci 2009 papers "An Episodic Based Approach to Complex Event Processing" for intelligent CEP method to learn from experience. The paper provides methods to store and search event sequence (i.e. episode) rules for the Analyzer of the autonomic management. However, the method cannot be directly used in multi-loop autonomic management of the present invention. The following steps decompose the "Synchronizing" concept of that method and apply it in the situation of multi-loop autonomic management:

Step 601, intelligent multi-loop complex event processing initialization;

Step 602, determine whether it is a monitor EPA. If yes, perform step 603. Otherwise, perform step 606;

Step 603, the event data is translated into rules according to the semantic knowledge base. Log the stimuli. Perform step 604;

Step 604, combine multiple rules into a meaningful event sequence. Perform step 605;

Step 605, store the event sequence into the rule base. Perform step 606;

Step 606, determine whether it is the analyzer EPA. If yes, perform step 607, otherwise go to step 612;

Step 607, event sequence matching the current stimulus from the rule base search. Go to step 608;

Step 608, determine whether the event sequence is successfully found. If yes, perform step 611, otherwise go to step 609;

Step 609, determine whether reciprocating cycle. If so, rediscover and go to step 603, otherwise proceed to step 610;

Step 610, adjust parameters. Go to step 611;

Step 611, using fraction obtain MAX_Hypo most similar event sequences, called hypotheses. Go to step 612;

Step 612, determine whether it is planner EPA. If yes, perform step 613, otherwise go to step 620;

Step 613, add the state, action, and target into semantic knowledge base. Go to step 614;

Step 614, from the observed actions, form the meta-state. Go to step 615;

Step 615, recognize target, target parameters, and instance of the target. Go to step 616;

Step 616, search hypothesis to match target and meta-state from the rule base. Go to step 617;

Step 617, determine whether reciprocating cycle. If so, investigate again and perform step 607, otherwise go to step 618;

Step 618, store the hypothesis not being able to complete the task into the rule base. Thus, it can accumulate experience and learn from failure. Go to step 619;

Step 619, only the most similar hypothesis is adapted, called the recovery plan. Go to step 620;

Step 620, determine whether it is the executor EPA. If yes, perform step 621, otherwise, step 629;

Step 621, form strategies for selection. Go to step 622;

Step 622, search recovery plan matching the strategy from the solution rule base. Go to step 623;

Step 623, determine whether a recovery plan is successful found. If yes, perform step 626, otherwise go to step 624;

Step 624, determine whether reciprocating cycle. If yes, re-plan and perform step 613, otherwise go to step 625;

Step 625, adjust parameters. Go to step 626;

Step 626, use fraction to obtain the most similar recovery plan, known as the best solution. Go to step 627;

Step 627, give the best solution for the effector to execute. Go to step 628;

Step 628, normal return;

Step 629, error return.

Hybrid ACRA

Figure 7:
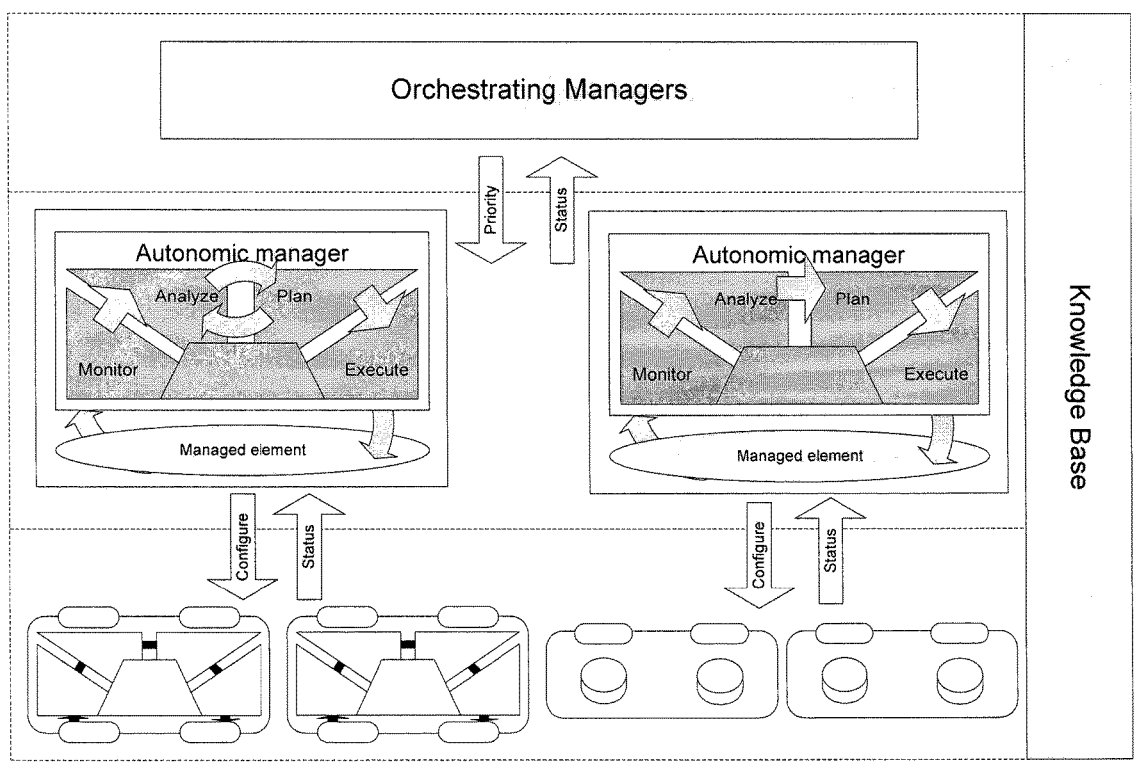
FIG. 7 is the block diagram of hybrid ACRA autonomic system architecture.

See FIG. 7. The classical and non-classical autonomic elements can co-exist in ACRA, mainly in the middle layer of the architecture. The hybrid ACRA may include virtual and non-virtual (physical) network devices, which exist as managed resources in autonomic system. Some of them contain the property of self-management themselves. The middle layer includes autonomic elements, the autonomic managers of which composed by large amount of EPAs. Each element represents a management task originally performed by IT professional, such as one type of fault diagnosis. These autonomic elements exist as resource managers in ACRA; they achieve one of self-configuring, self-healing, self-optimizing and self-protecting tasks.

We shall emphasize that, compared to classic ACRA, our middle-layer design has three unique properties: 1) the autonomic managers in autonomic elements are realizes by EPA (Event Processing Agent); 2) there is an extra loop between Analyze and Plan parts of autonomic manager; 3) there are a large amount of autonomic managers and they can be constructed dynamically by EPA. These properties can make the autonomic elements themselves also be virtual.

The top-layer of hybrid ACRA contains orchestration managers, which orchestrate a variety of middle-layer resource managers. Orchestration Managers carry out system-wide autonomic management, for example, removing those middle layer autonomic elements which are no longer in use. In case of an autonomic element can not accomplish the administrative task it supposes to do, it shall send a request to IT professional for human intervention.

One object of the present invention is to construct autonomic management system based on ACRA, which enable virtual network devices to have self-configuring, self-healing, self-optimizing and self-protecting features.

Autonomic Management of Virtual Environments

Although the above multi-loop CEP autonomic management system and method may be applied to any case of autonomic computing, another focusing point of the disclosed invention is how to design and construct autonomic managers to run in a virtual environment, and to manage all resources in the virtual networks, including virtual servers (VM) and virtual switches (VSwitch). See FIG. 8 wherein NIC is the physical NIC, and VNIC is a virtual card. Prior to managing resources, autonomic managers must dynamically deploy its own code, using ACRA three-tier architecture and application virtualization.

Orchestrating Manager first virtualizes application software, i.e. various intelligent EPAs needed by Resources Managers during offline. This virtualization process generates a virtualized file which can be transferred to resource manager via FTP (file transfer protocol). Second, the resource manager deploys the virtualized application and proceeds to generate an OS (operating system) images during offline. These images can be synchronized with the images of managed elements on top of installed Hypervisor (also known as Virtual Machine Monitor, or briefly VMM), such that all EPAs can be updated constantly. In some cases, an EPA is written in AI language LISP or Prolog where data and program are integrated together. In such circumstances, EPA updates/deployments occur more frequently (rather than just updating data in the database), hence the application virtualization technology is even more important. If the managed elements do not have Hypervisor installed (that is, the OS is not virtualized), the virtualized application files can be directly deployed to the managed elements on the host OS via streaming technology. As to the details of decomposing and recomposing processes for virtualized applications, as well as synchronizing process for the OS image using differential, see Tang et al U.S. patent application Ser. No. 13/879,058 "A method of differential synchronization and closed computing for client-side virtualization and its industry applications" In short, application virtualization involves software applications are decomposed into several modules during offline, and saved together with their installation information as compressed files. During deployment, these files use internet streaming, or intranet file-copying to online machine's OS (if the OS is not virtualized), or virtualized OS. After decompressed, the virtualized applications are recomposed with their installation information in the package. If the OS is virtualized, you can also periodically compare the image differentials of ACRA resource manager (Server side) image, with those of managed objects (Client side) in the both sides of the image synchronization. This is so-called "differential synchronization". The above-mentioned patented technology of application software decomposing/recomposing and OS image differential synchronization is now applied to the autonomic management ACRA three-tier architecture of the disclosed invention, which is not obvious for those skilled in the art.

Figure 8:
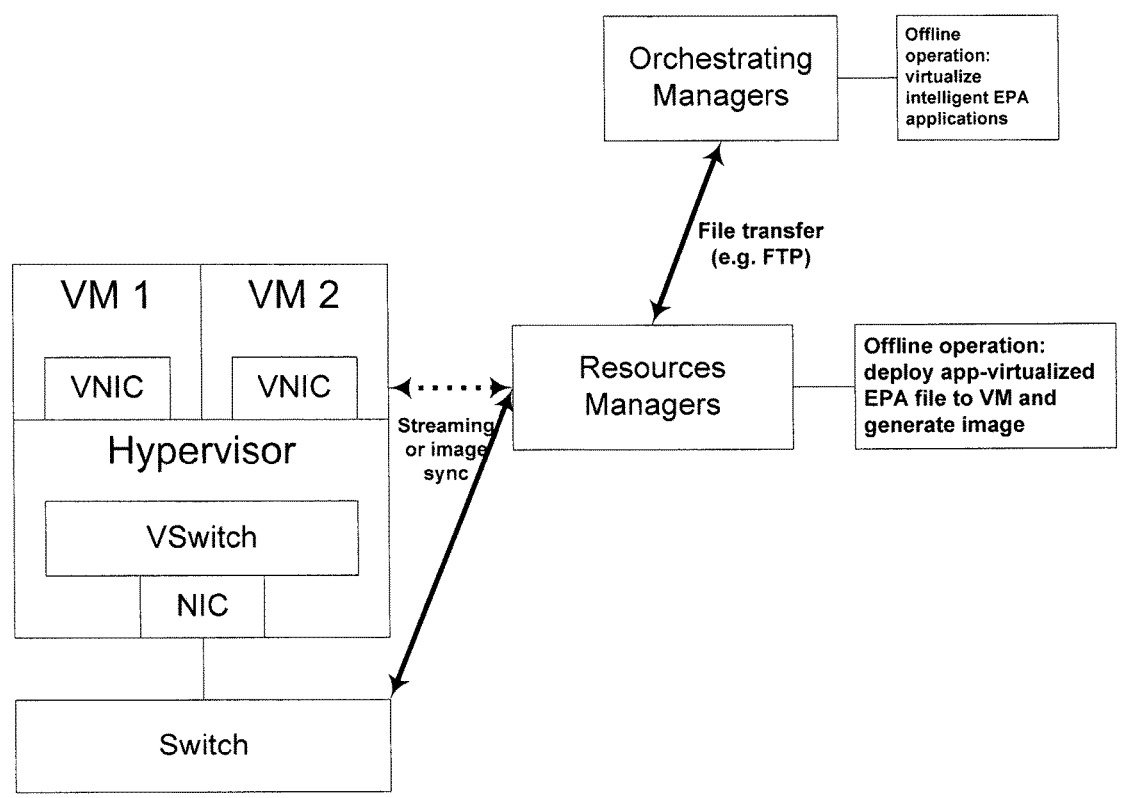
FIG. 8 is the block diagram of autonomic management for virtual resources and physical resources.

In fact, autonomic management has three virtual environments, and FIG. 8 shows only the first one:

(1) Application virtualization. Autonomic management borrows the technology of application virtualization to reach dynamic deployment of the code of itself. As stated above, autonomic management itself is application software. The dynamic deployment and dynamic de-installation can be realized through application virtualization and OS image synchronization.

(2) OS virtualization. Autonomic management helps performance optimization and assurance for host OS virtualization. Managed autonomic elements include sensors and effectors. Sensors collect performance data which are then used by autonomic manager's analyzing and planning processes to enhance the performance of the host where sensor is running. Effectors can use preemptive privilege of Hypervisor Ring-0 for problem prevention. For more details, please refer to FIG. 9.

(3) Hardware virtualization. Autonomic management helps hardware virtualization. Hardware resources, during planning or running, can achieve orchestration and convergence of resource provisioning, through autonomic manager's analyzing and planning processes, coupled with the computing capability of the state machine. Resource Manager manages not only virtual resources (shown as double arrow dash lines in FIG. 8), including virtual servers, virtual switches, and virtual NIC; but also the physical resources (shown as double arrow solid lines in FIG. 8), such as a physical switch. For more details, please refer to FIG. 11.

Intelligent Ring-0 Sensors and Effectors Systems

FIG. 9 shows an intelligent Ring-0 sensor and effector systems. In a computer, there are application-level software and kernel-level software (which includes the operating system OS and the virtual machine monitor VMM). All applications and kernel system/subsystems need to eventually be fan-in to the CPU. However, commercially-available monitor products in general is nothing more than software in these two levels, which competes CPU cycle against software being monitored. That is, monitoring and monitored software has the same privilege ring, hence is unable to predicted events beforehand. These products can only use so-called "check-points" to provide aftermath alerts (for example, they report some of the monitored process already fails), greatly defeating the original purpose to provide real-time early warning monitor, hence being incapable of true QoS (Quality of Service) quality assurance.

In the disclosed invention of preemptive contact point, the most important concept is that sensors and effectors run in the operating system kernel, with Ring 0 privilege, and possess a privilege higher than managed software. Therefore, when the managed software is detects to have endangered events, real-time, prior action can be taken, such as changing process time slice for the managed software, stopping its operation, or, in the case of VMM available, migrating the virtual machine to run on the host that is not busy.

The box 91 of FIG. 9 is the sensor. It contains the PMU hardware drivers 911 with monitoring function running in the Ring-0. The key to detect the application software in danger hinges on the sensor, which is a hardware-level performance detection unit (Performance Monitoring Unit, or PMU, box 912), rather than something using the OS performance commands for detection. PMU relies on a control register 913 PMC (performance monitor control register) and a data register 914 PMD (performance monitor data register) to realize performance detection.

Box 92 is a health assurance processes, running processes p0. Boxes 931 and 932, respectively, are managed application software running processes p1 and p2. Note here that if the health assurance process relies on the OS performance commands, its operating privilege is no different from that of p1 or p2. Therefore, it cannot interfere the operation of p1 or p2. The easiest to explain this view is the OS scheduler 941 inside of effector, box 94, since the scheduler treats the three processes p0, p1, p2 equally.

Box 95 explains that when endangered applications p1 or p2 is detected by box 912 PMU, and CPU launches interrupts, box 95 Interrupt Service Routine (ISR) can interrupt the OS scheduler, and then make adjustments according to some rules. These rules may be as simple as "if the CPU utilization exceeds 99%, then terminate process p2".

FIG. 9 shows the case where host has no OS virtualization. For host with OS virtualized, see the description of FIG. 18.

Intelligent Ring-0 Sensors and Effectors Implementation Method

Figure 10B:
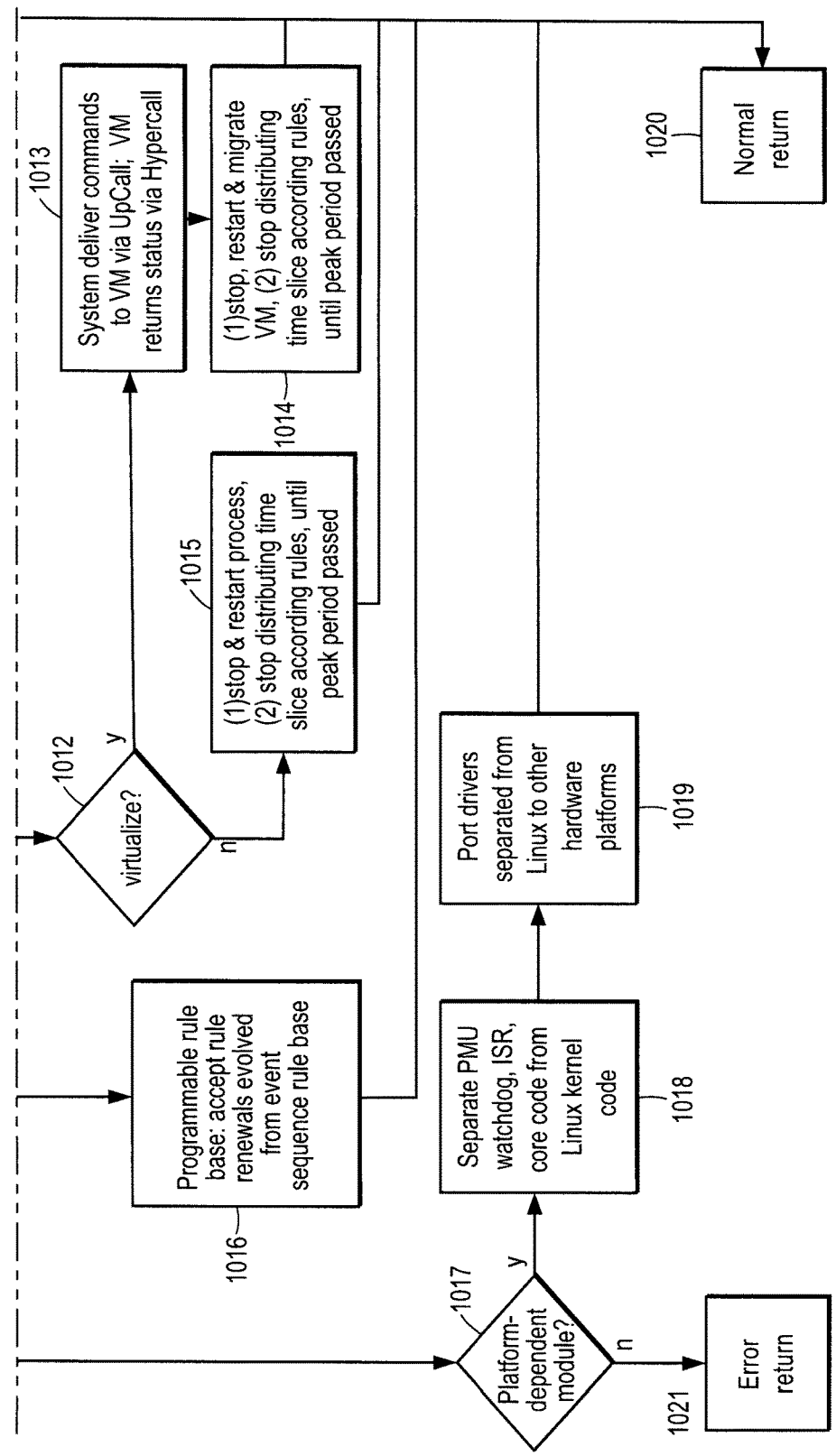
FIG. 10 is the flowchart of an implementation method for intelligent Ring-0 sensor and effector.

Although the concepts of these intelligent Ring-0 sensors and effectors system is fairly simple (i.e. preemptive privilege for system assurance), to implement them needs solutions of the following issues: (1) what if the number of events monitored exceeds the capacity of PMU counter; (2) how to select the best OS scheduler algorithm; (3) how to handle when there is a Hypervisor (VMM); (4) how the rule base can respond quickly and easily; and (5) how to implement at different OS or hardware platform. FIG. 10 described below the method steps of Ring-0 intelligent sensors and effectors:

Step 1001: Initialization—The logic of the flowchart are running on the OS or VMM kernel;

Step 1002: to determine whether it is a platform-independent module. If yes, go to step 1003. Otherwise, step 1017;

Step 1003: determine whether it is a sensor. If yes, proceed to the process-level monitoring of step 1004 or system-level monitoring of step 1006. Otherwise, step 1008;

Step 1004: the process-level monitoring. Go to step 1005;

Step 1005: multiplexing process resources, so that the monitoring can still be performed even if number of events being monitored exceeds the number in PMU counter. Go to step 1020;

Step 1006: System-level monitoring. Go to step 1007;

Step 1007: monitor TLB misses, PCI BUS delays and traffic, CPU stall cycles, memory access latency, device access latency, caching instruction pauses, and so on. Go to step 1020;

Step 1008: determine whether it is an effector. If yes, go to step 1009. Otherwise, step 1016;

Step 1009: Use a gang scheduler, unlike industry commonly-used CS (Credit Scheduler), CFS (Complete Fair Scheduler), RSDL (Rotating Staircase Deadline Scheduler), BVT (Borrowed Virtual Time Scheduler), and EDF (Earliest Deadline First) method. Go to step 1010;

Step 1010: Interrupt Ring-0 and enter into the ISR. Proceed to step 1011;

Step 1011: perform procedural rules for quick judgment. Go to step 1012;

Step 1012: determine whether there is virtualization (meaning using Hypervisor). If yes, go to step 1013. Otherwise, step 1015;

Step 1013: The system delivers commands to virtual machine via UpCall, the virtual machine returns status via Hypercall. Go to step 1014;

Step 1014: (1) Stop, restart, and migrate virtual machines; (2) stop allocation of time slices until peak time is passed according to the rules. Go to step 1020;

Step 1015: (1) stop and restart the process; (2) stop allocation of time slices until peak time is passed according to the rules. Go to step 1020;

Step 1016: procedural rule base: accept rule updates caused by the evolvement of events out of the event-sequence rule base. These rules mimic the procedural memory of autonomic unconscious act in the human brain. They are stored in OS/VMM core for quick response. The content of the rule is made by the accumulation of experience, thanks the smart multi-loop complex event processing method in FIG. 6. The next is step 1020;

Step 1017: determine whether the platform-dependent modules. If yes, go to step 1018. Otherwise, step 1021;

Step 1018: separate the OS kernel code and the software drivers of performance monitoring hardware (including PMU watchdog, ISR portion of the PMU, and the PMU core code). Go to step 1019;

Step 1019: port the driver separated from OS to other hardware platforms. Go to step 1020;

Step 1020: normal return;

Step 1021: error returned.

Software-Defined Service System

FIG. 11 shows a software-defined service system. The software-defined physical resources is also known as "hardware virtualization", or "physical resources convergence". The system uses a VFSM (VFSM) model to describe and control infrastructure resource capability, and form software-defined resource object. It also uses software-defined resource object to implement point of delivery POD (Point of Delivery) resources provisioning. This figure uses the capability of physical point of delivery (Physical POD) to create virtual machines as an example. The so-called physical POD is a resource-provisioning physical unit, formed through defining and partitioning device sets in the data-center networks. The physical unit may work independently without other devices and eventually form a POD resource services unit. This is an innovative way of thinking, that is, the basic unit of resource provisioning is not a physical machine, a virtual machine or a virtual switch. Rather, it is a (meaningful) "collection" amongst them.

Figure 11A:
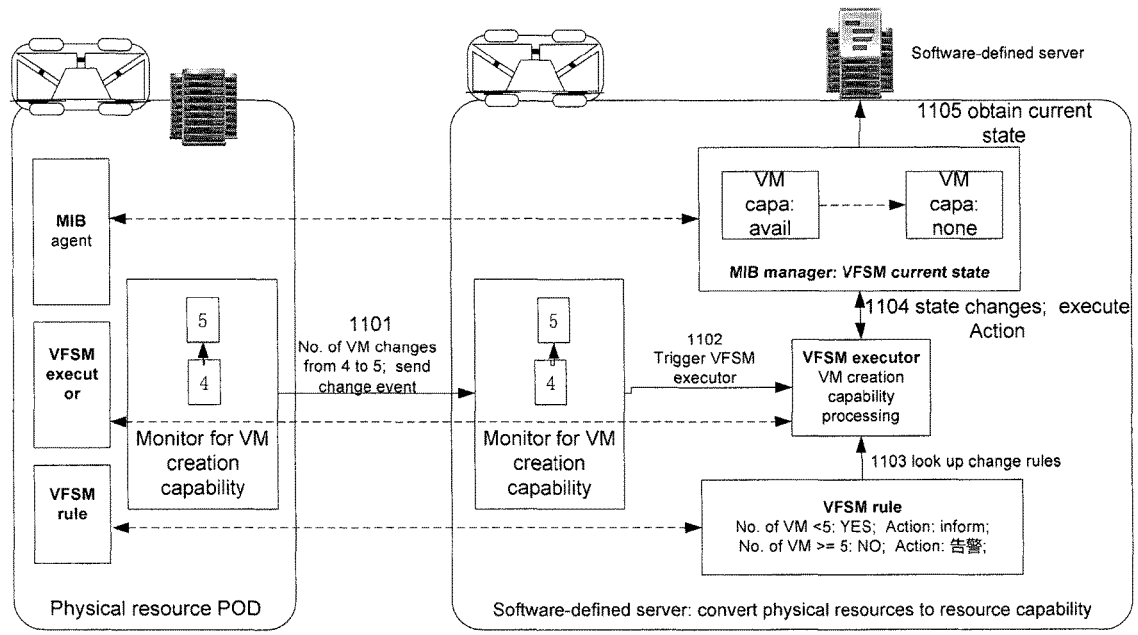
FIGS. 11A and 11B are the block diagram of a software-defined service system.
Figure 11B:
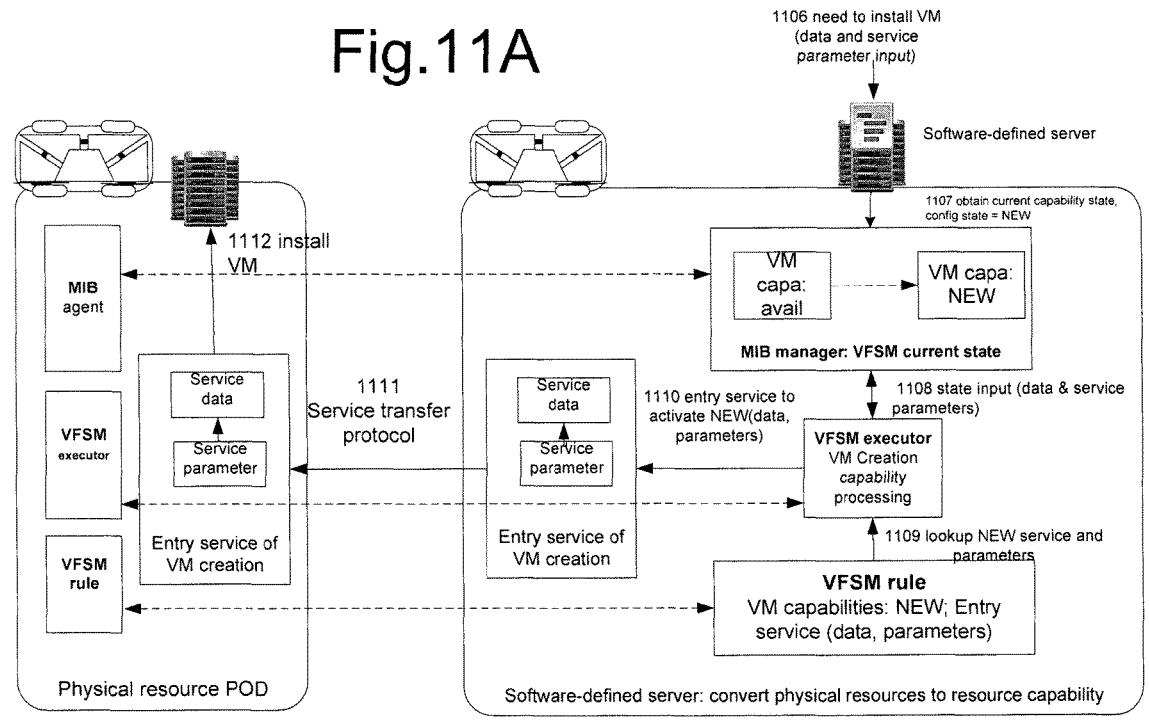

FIG. 11A illustrates the processes of how the event of a request to create a virtual machine is intercepted, how the current status is read and the rule base looked up through VFSM executor, and how the current resource incapable of creating virtual machine is determined, so as to deliver the current status and alert actions to the software-defined server. FIG. 11B shows that the software-defined server has a need to create virtual machines for the provisioning function of physical POD. The needed new resources data and parameters cause updating the current state, triggering VFSM executor to determine if this new state can lead physical POD's to new entry service, thus returning this new entry service parameters and service data to the physical POD, the ultimate realization of the virtual machine installation.

The symbol of autonomic management in the figure signals that the process proceeds in accordance with ACRA autonomic computing architecture. It proceeds as follows:

Step 1101: the request "number of virtual machines change from four to five" is not directly implemented in the physical POD. Rather, it is the physical POD Monitor that sends an event change message to the software-defined server;

Step 1102: Upon the reception of the message by software-defined server, the VFSM executor is started;

Step 1103: VFSM executor looks up the change rule in the rule database. It obtains such resulting VFSM rule: "If the VM number is less than 5, then it is determined to be YES and the action is notification; if VM number is greater than or equal to 5, then the determination is NO, and the action is alert.";

Step 1104: VFSM executor determines the capability to create a virtual machine VM is "no", thus change the current state and perform the alert action;

Step 1105: The software-defined server obtains current status;

Step 1106: in order to achieve physical POD provisioning, the software-defined server decides to install a new VM (input the VM service data and service parameters);

Step 1107: the current state of the VFSM obtains new capability state from the software-defined server. Set the state to NEW;

Step 1108: The NEW state triggers VFSM executor and input the state (data and service parameters) to VFSM executor;

Step 1109: VFSM executor looks up new services and parameters in the rulebase. The resulting rule is "VM capability is NEW; and entry service (with data, parameters) starts";

Step 1110: VFSM executor tells the service module to start NEW entry service (with service data and service parameters);

Step 1111: Software-defined Server uses the service transport protocol to tell the service modules of physical POD (with service data and service parameters);

Step 1112: Physical POD installs VM.

Implementation Method of the Software-Defined Service

Figure 12:
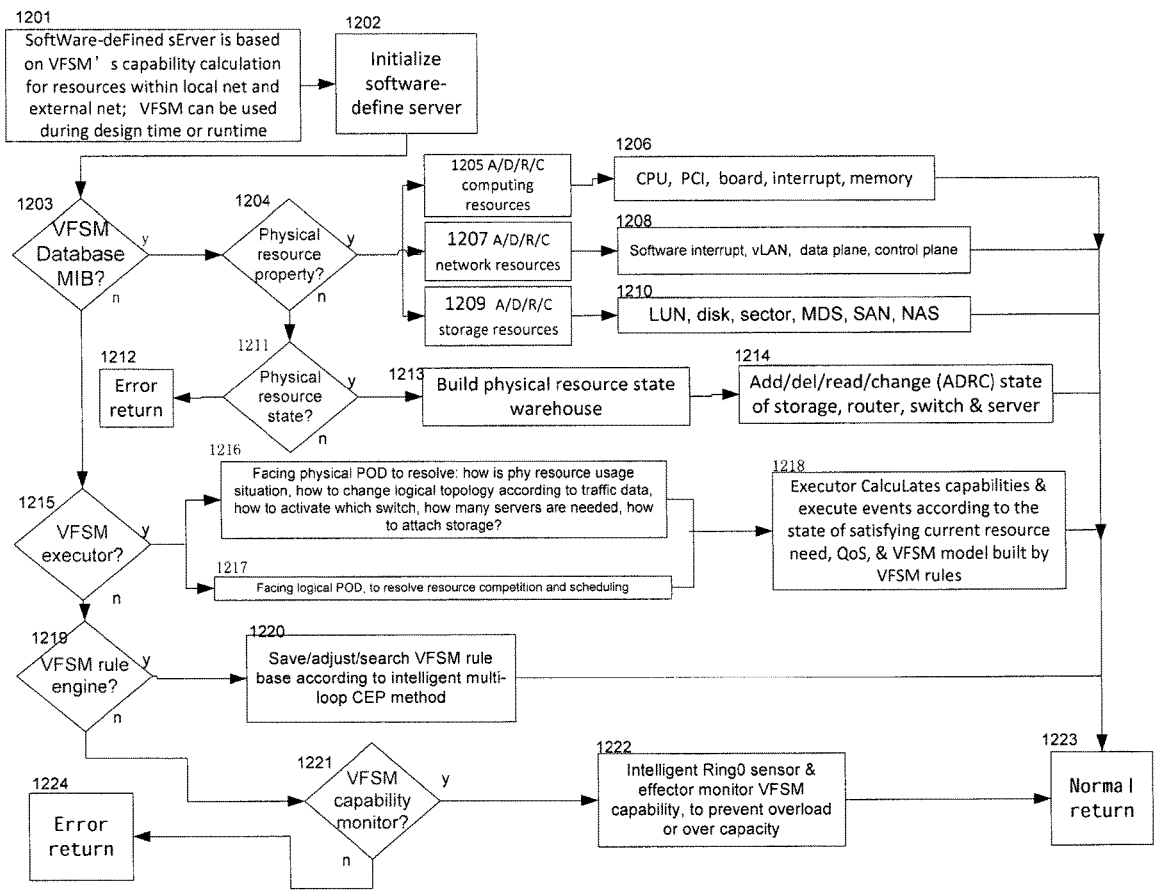
FIG. 12 is the flowchart of the software-defined server.

FIG. 12 describes the logic of software-defined server. Software-defined server has the property of hardware resources and contains a status MIB (management information base), VFSM executor, VFSM rule base, and VFSM monitor. Physical POD and software-defined server form a Client/Server architecture. Here only global components of the software-defined server are described. However, according to the autonomic management framework ACRA, physical POD (ie client) can also have 1-1 corresponding local components, e.g. there are physical POD MIB and/or VFSM executors, rule base, monitors, entry status/exit state services and other components. This 1-1 correspondence is shown by the ends of the dotted line in FIG. 10. On the other hand, the software-defined server also has to face the logical POD. A logical POD is a composition of computing, networking, and storage logical resources, required by the user service project and in accordance with the user's specifications, where the resource has the feature of shared space-sharing and time-sharing.

Proceed as follows:

Step 1201: The software-defined server is based on the VFSM (VFSM) to calculate the capacity of internal network and external network resources; VFSM can be used for system design time or run time. Go to step 1202;

Step 1202: initialization of the software-defined server. Go to step 1203;

Step 1203: to determine whether it is the VFSM database MIB. If yes, go to step 1204; otherwise, step 1214;

Step 1204: determine whether it is the hardware resource property. If yes, proceed to step 1205 or 1207 or 1209; otherwise, proceed to step 1211;

Step 1205: adding, deleting, reading, and modifying computing resources. Go to step 1206;

Step 1206: adding, deleting, reading, and modifying CPU, PCI, boards, interrupts, and memory. Go to step 1223;

Step 1207: adding, deleting, reading, and modifying the network resource. Go to step 1208;

Step 1208: adding, deleting, reading, and modifying software disconnection, vLAN, data plane, and control plane. Go to step 1223;

Step 1209: adding, deleting, reading, and modifying storage resource. Go to step 1210;

Step 1210: adding, deleting, reading, and modifying LUN, disk, sector, MDS, SAN, and NAS. Go to step 1223;

Step 1211: determine whether it is the hardware resource status. If yes, go to step 1213; otherwise, step 1212;

Step 1212: error return;

Step 1213: establish the warehouse of hardware resources state. Go to step 1214;

Step 1214: adding, deleting, reading, and modifying states of routers, switches, and servers. Go to step 1223;

Step 1215: determine whether it is the state machine of the VFSM executors. If yes, proceed to step 1216 or 1217; otherwise, proceed to step 1219;

Step 1216: facing physical resources POD, resolve the following problems: how the physical resource usage? How to change the logical topology according to traffic data? When to activate which switch? How many servers is needed? How to attach storage? Go to step 1218;

Step 1217: facing logic POD, resolve resource contention issues and resource scheduling issues. Go to step 1218;

Step 1218: The executor calculates capability and executes the event according to the "VFSM model" established to satisfy the resource status, QoS, and VFSM rules. Go to step 1223;

Step 1219: determine whether it is the VFSM rule base. If yes, proceed to step 1220; otherwise, proceed to step 1221;

Step 1220: In accordance with intelligent multi-loop complex event processing method, perform storage, adjustment, and search for VFSM rule base. Go to step 1223;

Step 1221: determine whether it is the VFSM capability monitor. If yes, proceed to step 1222; otherwise, proceed to step 1224;

Step 1222: intelligent Ring-0 sensor and effector monitor VFSM ability to prevent overload or over-capacity. Go to step 1223;

Step 1223: normal return;

Step 1224: Error returned.

Virtual Network Enterprise Architecture with Services Delivery

Figure 13A:
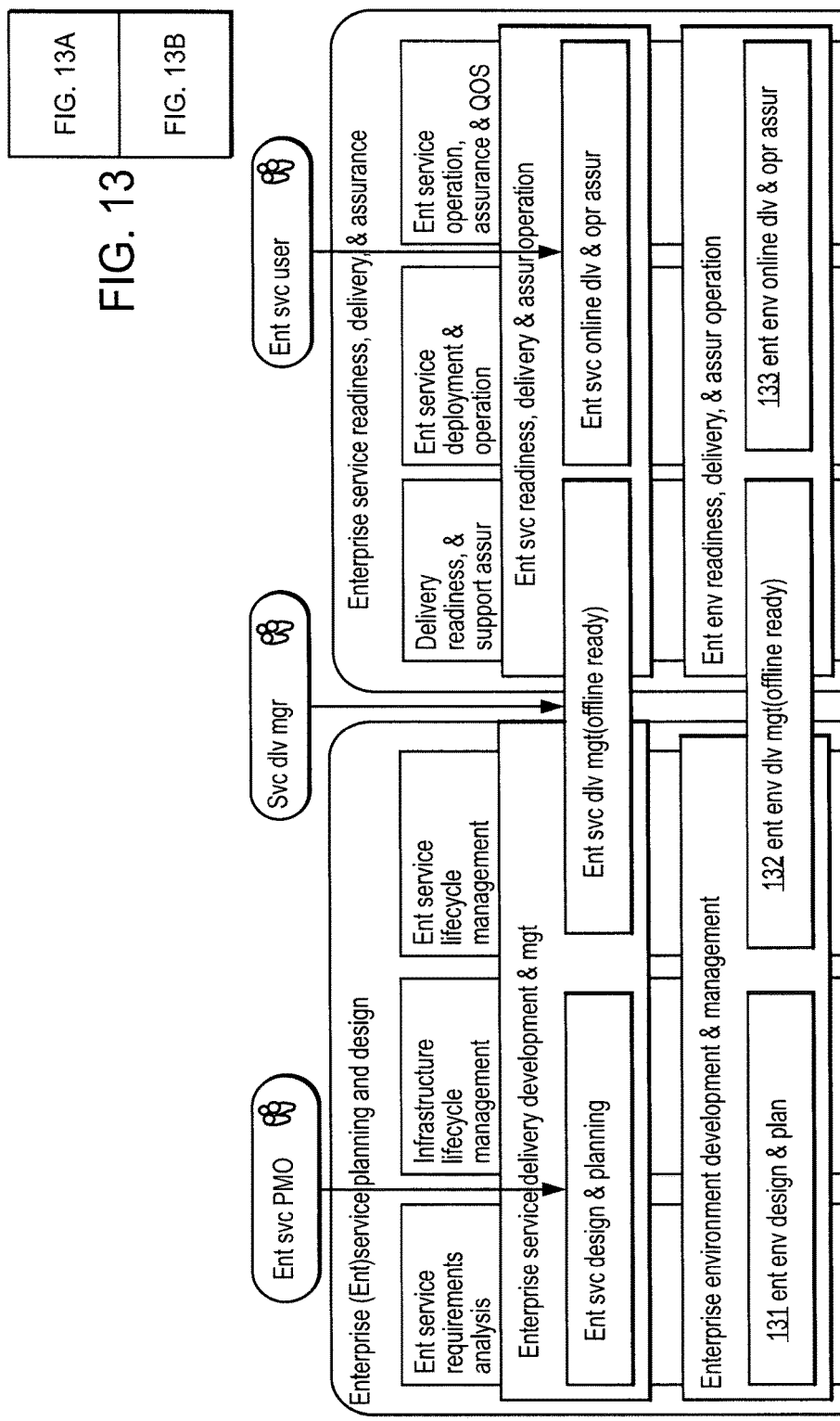
FIG. 13 is the architecture diagram of an enterprise virtual network with service delivery.
Figure 13B:
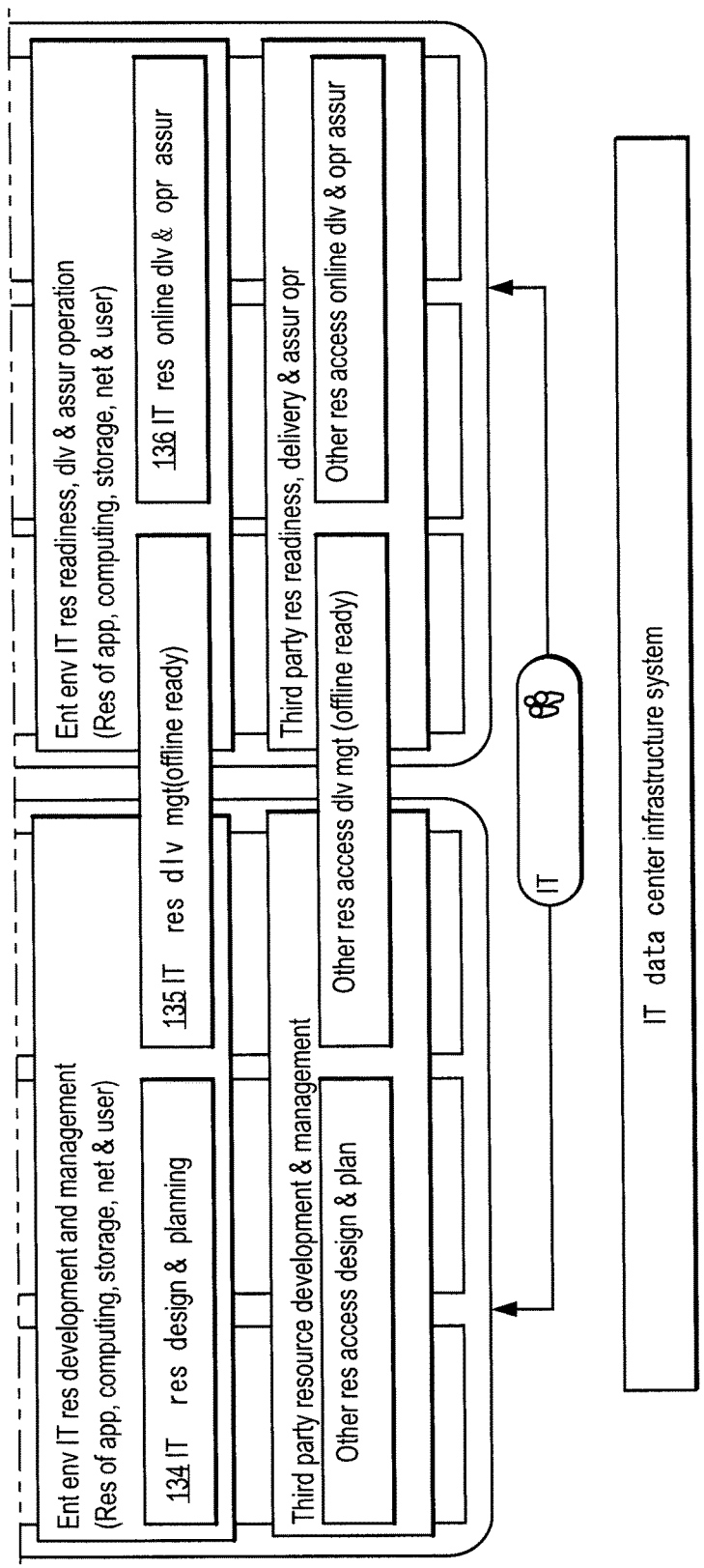

FIG. 13 shows a virtual network enterprise architecture with service delivery. In general, the telecommunication industry already has standards like TMN (Telecommunication Management Network), eTOM (Enhanced Telecom Operation Map), NGOSS (New Generation Operations Software and Support), TMF (Telecom Management Forum) and other proposed standards for telecommunications networks. The embodiment here uses eTOM standards. From the figure, it is obvious that eTOM's original concept has been substituted by "Service Delivery Platform (SDP)". Original concept such as Operations Support and Ready (OSR) becomes offline service delivery, while the original contract fulfillment concept becomes online service delivery. Service delivery is an existing telecommunication concept. However, the use in corporate networks, its "Automation", and the use of "life cycle management" are the inventive ideas of the disclosed patent. Automation means that the computing, network, storage resources of the system can be converged, and assigned to multiple business projects operating in parallel. Application lifecycle management is to control the registration, subscription, create, design, deployment, and de-installation of an application. Note: automation and autonomic management are different. The difference is that automation emphasizes the automatic (rather than manual) resource management in the data center, while autonomic management emphasizes autonomic intelligent methods.

Enterprise architecture is a complex system. Refer to "Enhanced Telecom Operations Map (eTOM)—The business process framework", ITU-T Recommendation M.3050.1, for the concept of eTOM mentioned in the present embodiment. The boxes of FIG. 13 are all related to virtual network. However, since the corporate enterprise project itself is often associated with the specialized business, plus there is no standard third-party resource, the boxes are not included in the scope of automation. So, here describes only the boxes below:

Box 131 is a corporate environmental design and planning. This box modifies the eTOM-related business strategy/Commit, and its infrastructure lifecycle management, focusing on business design services, interacting with Program Management Office (PMO), as well as business subscription service, interacting with the business users in a service environment.

Box 132 is the enterprise environment delivery management (or offline preparation). This box modifies the Product Lifecycle Management (PLM) of eTOM and Service Operation Support and Readiness (OS & R), focusing on the service for offline logic environment.

Box 133 is enterprise environment online delivery and operation assurance. This box modifies the eTOM Service Fulfillment and Service Assurance, focusing on the portion of online delivery environment of a service, and service management of application assurance system.

This box modifies the eTOM-related resources policy/commitment and infrastructure lifecycle management, focusing on design services for virtual and physical resources by PMO/system administrator.

Box 135 is the IT resources delivery management (or offline preparation). This box modifies the eTOM Product Lifecycle Management (PLM) and Resource Operation Support and Readiness (OS & R), focusing on the unallocated virtual and physical resources.

Box 136 is the online delivery of IT resources and operation assurance. This box modifies the eTOM Resource Fulfillment and Resource Assurance, focusing on the online delivery environment of virtual and physical resources already allocated, and the resource management of application assurance system.

Virtual Network System Overall Work Scene

Figure 14:
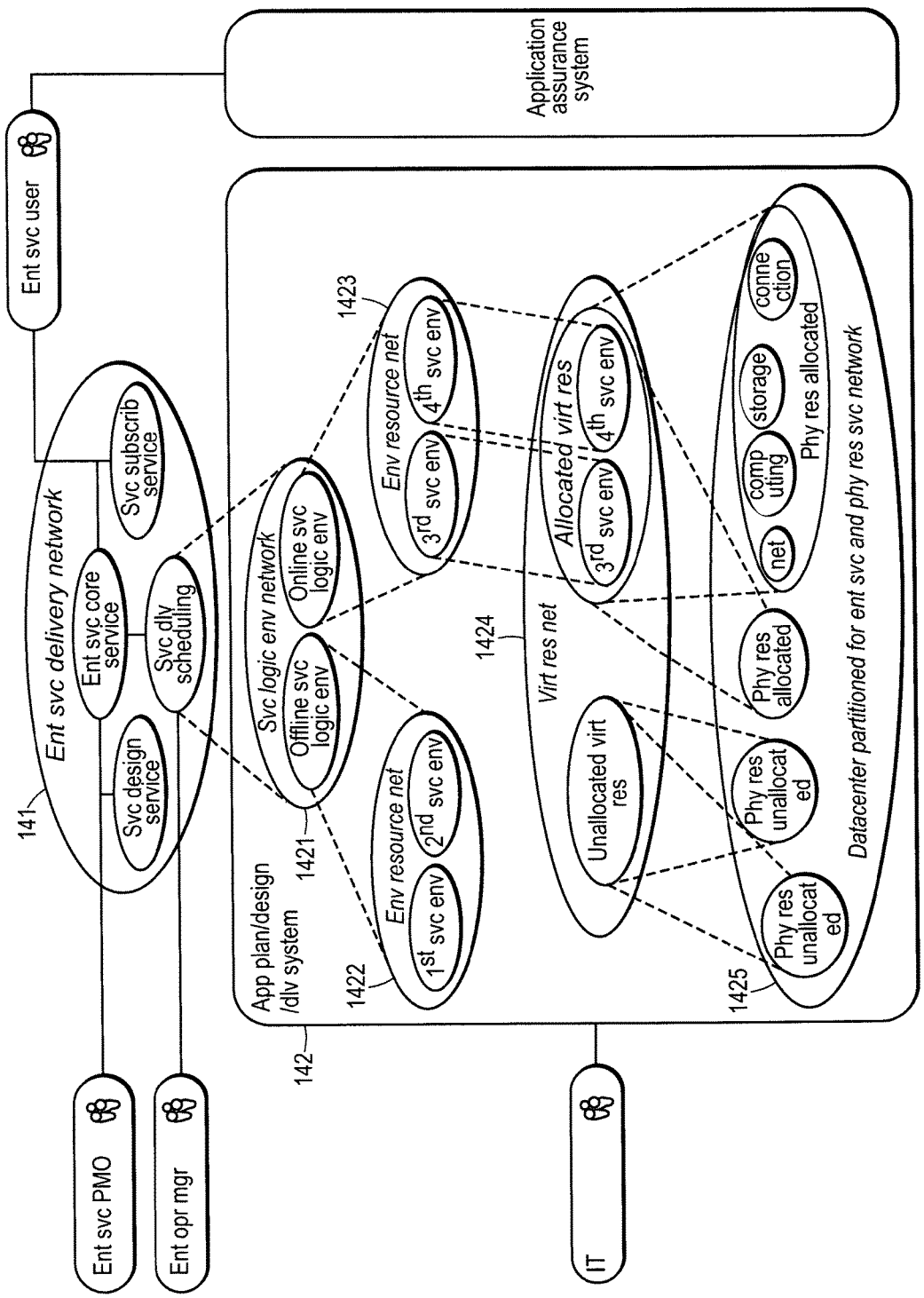
FIG. 14 is the architecture diagram of overall work scene of a virtual network system.

FIG. 14 shows the overall work scene of the virtual network system. The figure further elaborates the concept of FIG. 13, wherein round box 141 is part of an enterprise service plan, and square box 142 is the main concepts of virtual network. Described as follows:

Round box 141 indicates enterprise service delivery sites, including the core enterprise business services, enterprise design services, enterprise subscription services, and enterprise delivery scheduling service.

Square Box 142 virtual network main concepts, including:

(1) Round box 1421 is the environmental services network of business logic, wherein service delivery scheduling supports automatic or manual offline-online context switching, and therefore supports multiple-versions enterprise environment scheduling. This includes offline business logic environment, and on-line business logic environments.

(2) Round box 1422 is business logic storage network environment, containing an environment of several service instances.

(3) Round box 1423 is resources network of business logic environment, with exclusive resource subscription delivery, containing an environment of several service instances.

(4) Round box 1424 is virtual resource network, wherein virtual resources aggregate physical resources of different locations and configurations to achieve resource convergence regardless of their types and deployment of physical resources. Include unallocated virtual resources and allocated virtual resources. The allocated virtual resources have exclusive and shared virtual resources support.

(5) Round box 1425 is the data center of enterprise business partition and physical resources service network. It supports subscription delivery, and supports physical resources by space-sharing and time-sharing, including many unallocated and allocated physical resources, such as network, storage, and computing resources.

Virtual Network System Automation Method

Figure 15A:
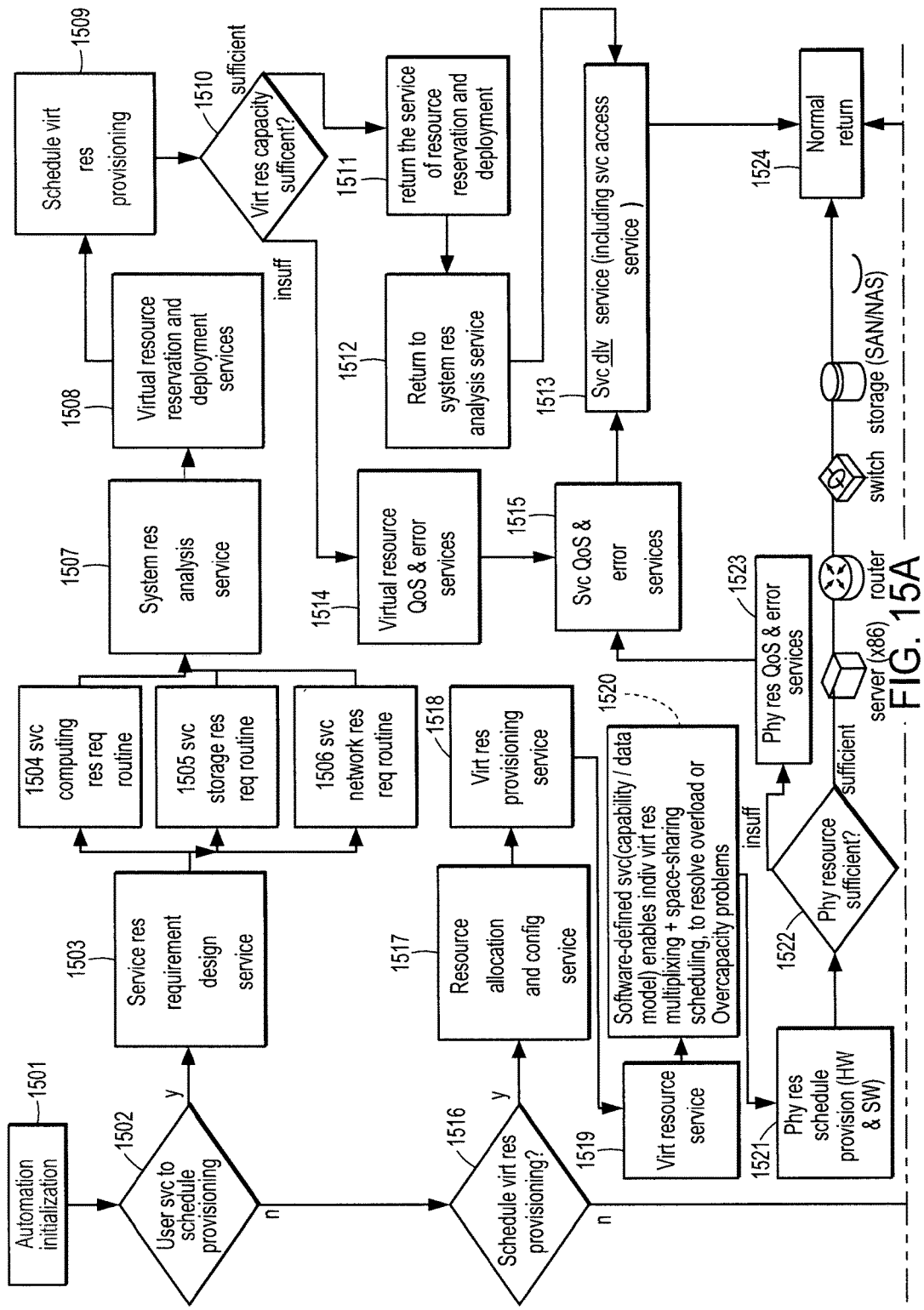
FIG. 15 is flowchart of a method of a virtual network system automation.
Figure 15B:
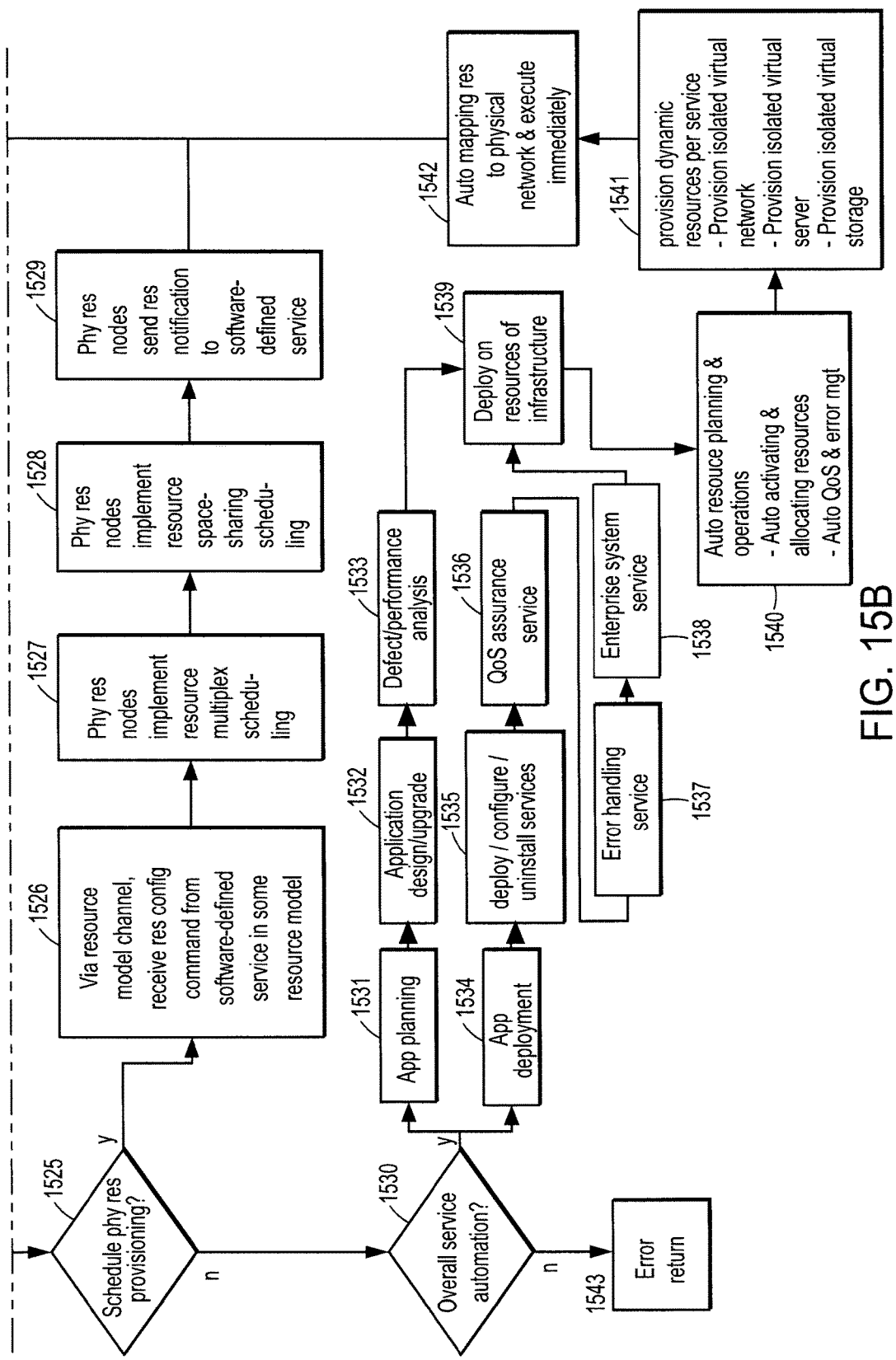
Figure 16:
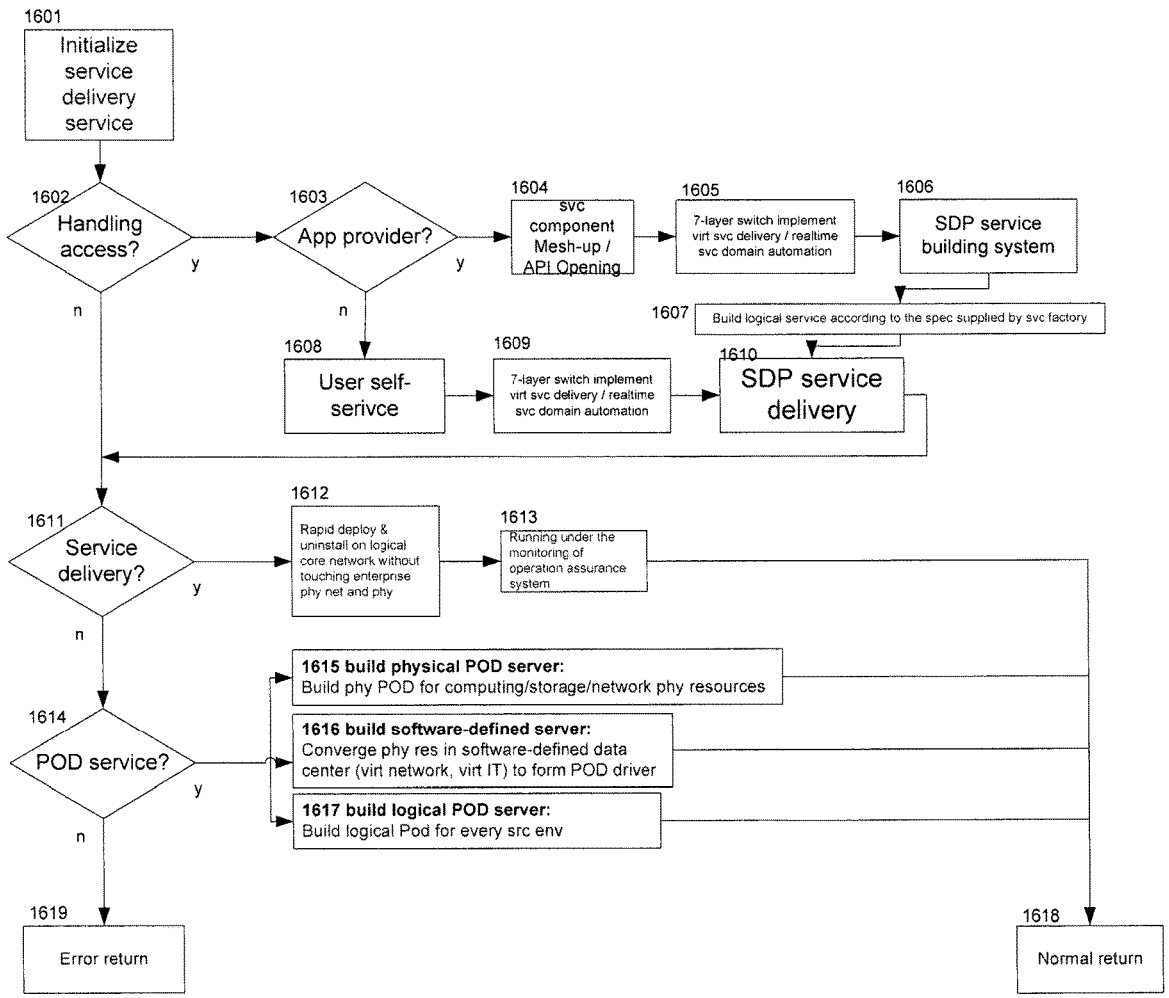
FIG. 16 shows the flowchart of a service method for the virtual network service delivery.

FIG. 15 shows the flowchart of automation method for virtual network system. Automation consists of three parts: the first is the user service scheduling provisioning (calls Virtual Resource Scheduling provisioning). Next is virtual resource scheduling provisioning (calls Virtual Resource Scheduling provisioning). The third is the physical resource scheduling provisioning (calls software-defined service system of FIG. 11). Here, the overall service automation is also described, including the application of the automatic activation and attachment management, automatic QoS management, and automatic mapping resources to the physical network and immediately executing. Proceed as follows:

Step 1501, perform automation initialization. Go to step 1502;

Step 1502, determine whether it is user service scheduling provisioning. If yes, proceed to step 1503; otherwise, proceed to step 1516;

Step 1503, the business resource requirements design services. Go to step 1504, 1505 or 1506;

Step 1504, execute the routine of business computing resource requirements. Go to step 1507;

Step 1505, execute the routine business of storage resource requirements. Go to step 1507;

Step 1506, execute the routine business network resource requirements. Go to step 1507;

Step 1507, perform system resource analysis services. Go to step 1508;

Step 1508, perform virtual resource reservation and deployment services. Go to step 1509;

Step 1509, perform virtual resource scheduling provisioning. Go to step 1510;

Step 1510, determine whether the virtual resource capacity is insufficient. If sufficient, go to step 1511; if insufficient, go to step 1514;

Step 1511, return the service of resource reservation and deployment. Go to step 1512;

Step 1512, return the service of system resource analysis. Go to step 1513;

Step 1513, the business delivery services (including business access service, with its flow shown in FIG. 16). Go to step 1524;

Step 1514, perform the virtual resource QoS service and error service. Go to step 1515;

Step 1515, perform the business QoS and error service. Step 1513;

Step 1516, determine whether it is virtual resource scheduling provisioning. If yes, proceed to step 1517; otherwise, proceed to step 1525;

Step 1517, perform resource allocation and configuration services. Go to step 1518;

Step 1518, perform the virtual resource provisioning service. Go to step 1519;

Step 1519, perform the business QoS and error service. Go to step 1520;

Step 1520, perform the software-defined services (capability/data model) with each virtual resource able to multiplexing and space-sharing scheduling, so as to resolve overloading or overcapacity problem. Go to step 1521;

Step 1521, perform the physical resource scheduling provisioning (hardware and software). Go to step 1522;

Step 1522, determine whether physical resource is sufficient. If sufficient, go to step 1524; otherwise, proceed to step 1523;

Step 1523, perform error & QoS services for physical resources. Go to step 1515;

Step 1524: normal return;

Step 1525, determine if it is physical resource scheduling provisioning. If yes, proceed to step 1526; otherwise, proceed to step 1530;

Step 1526, accept via resource model channel, the resource-configuration command sent from software-defined service of some resource model. Go to step 1514;

Step 1527, the physical resource node implements resource multiplexing scheduling. Go to step 1528;

Step 1528, the physical resource node implements space-sharing resource scheduling. Go to step 1529;

Step 1529, the physical resource node conveys the resource notification to the software-defined service. Go to step 1530;

Step 1530, determine whether it is an overall business automation. If yes, proceed to step 1531 or 1534; otherwise, proceed to step 1543;

Step 1531, plan applications. Go to step 1532;

Step 1532, design/update applications. Go to step 1533;

Step 1533, analyze defect/performance. Go to step 1539;

Step 1534, deploy applications. Go to step 1535;

Step 1535, design/update applications. Go to step 1536;

Step 1536, perform QoS assurance service. Go to step 1537;

Step 1537, perform error handling service. Go to step 1538;

Step 1538, perform the enterprise systems service. Go to step 1539;

Step 1539, deploy on top of infrastructure resources. Go to step 1540;

Step 1540, perform automatic resource planning and operations (1) Automatic activation and attachment of resources, (2) automatic QoS and error management. Go to step 1541;

Step 1541, provision dynamic resource by services (1) provision isolated virtual network; (2) provision isolated virtual servers; (3) provision isolated virtual storage. Step 1542;

Step 1542, map resources automatically to the physical network and immediately execute them. Go to step 1524;

Step 1543: Error return.

Virtual Network Systems Service-Delivery Method

Figure 24:
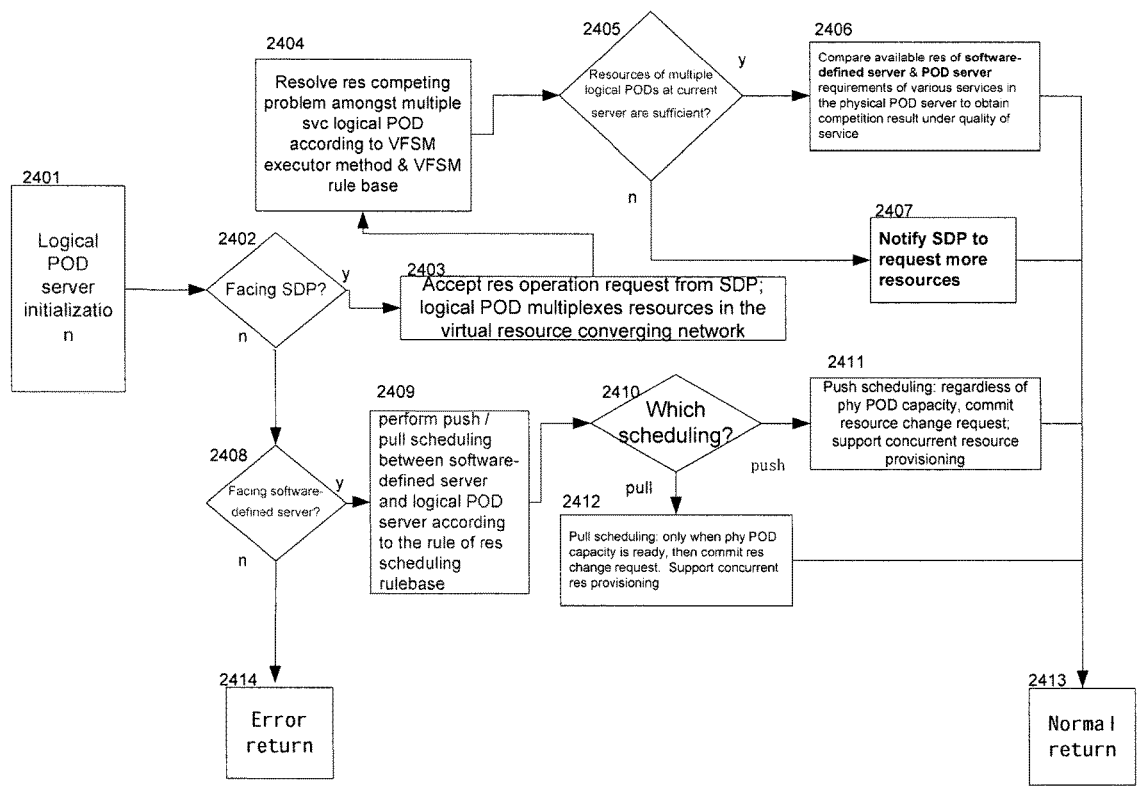
FIG. 24 is the flowchart of a logical POD server.
Figure 25:
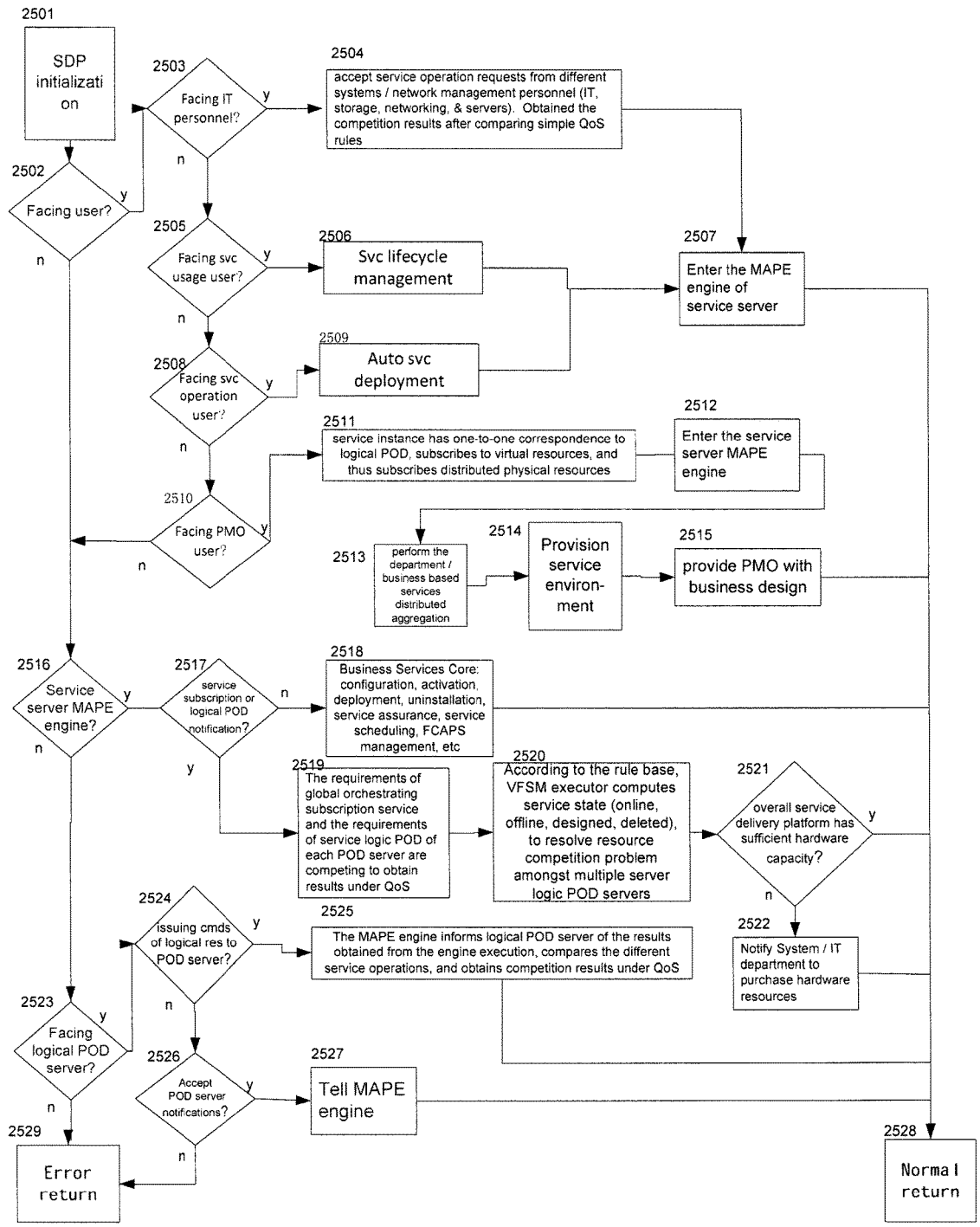
FIG. 25 shows the flowchart of the interaction between service delivery platform and user.

FIG. 16 shows the flowchart of a service-delivery method for virtual network. Service delivery includes service access and service delivery itself. Service delivery is to implement, on the logical network, deployment and uninstallation without having to touch any physical network and other physical resources. In addition, the services at the point of delivery (POD) include the building of physical POD, software-definedness (FIG. 11) and logical POD (FIG. 24). Proceed as follows:

Step 1601, service delivery initialized. Go to step 1602;

Step 1602, determine whether handle access. If yes, proceed to step 1603; otherwise, proceed to step 1611;

Step 1603, determine whether it is application vendor. If yes, go to step 1604; otherwise, step 1608;

Step 1604, open the service components Mesh-up/API. Go to step 1605;

Step 1605, implement the automation of virtual service delivery/real-time business domain, under layer-7 switching. Go to step 1606;

Step 1606, perform SDP service building system. Go to step 1607;

Step 1607, establish logical services according to SPEC provided by service factory. Go to step 1610;

Step 1608, perform user self-service. Go to step 1609;

Step 1609, implement the automation of virtual service delivery/real-time business domain under layer-7 switching. Step 1610;

Step 1610, perform SDP service delivery. Go to step 1611;

Step 1611, determine whether service delivery. If yes, proceed to step 1612; otherwise, proceed to step 1614;

Step 1612, rapid deploy and uninstall on logical core network without touching any enterprise physical network or the physical resources. Go to step 1613;

Step 1613, running under the monitoring process of operation assurance system. Go to step 1618;

Step 1614, determine whether it is the POD service. If yes, proceed to step 1615, 1616 or 1617; otherwise, proceed to step 1619;

Step 1615, establish physical POD Server: build physical POD for computing, storage, and network physical resources (for detailed description, see FIG. 12). Go to step 1618;

Step 1616, establish software-defined server: converge physical resources in the software-defined data center (i.e. virtual networks and virtual IT), and formulate POD drivers (for detailed description, see FIG. 12). Go to step 1618;

Step 1617, create a logical POD Server: create a logical POD for each business environment (for details see FIGS. 24 and 25). Go to step 1618;

Step 1618: normal return;

Step 1619: error return.

Application Assurance Systems

Figure 17A:
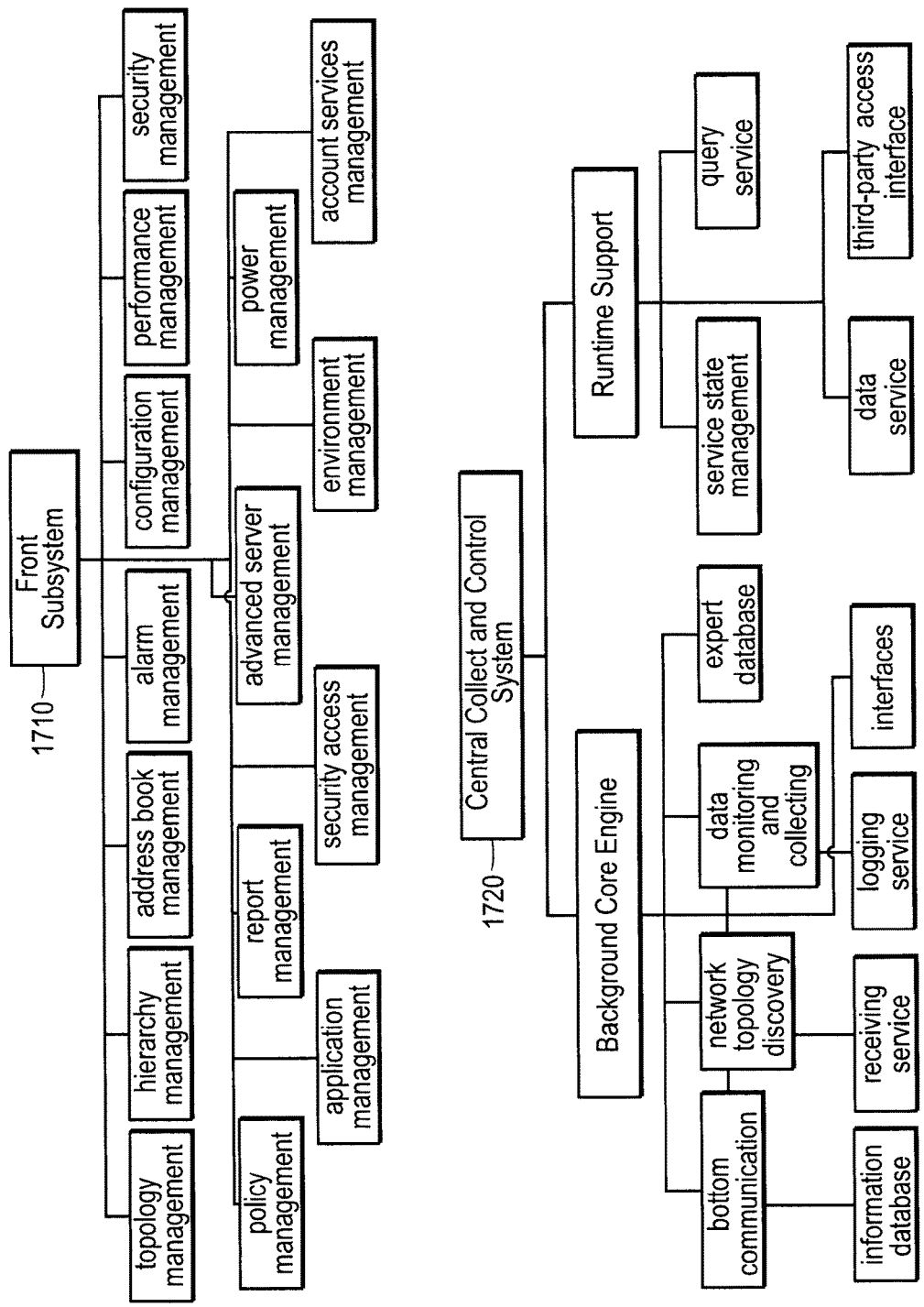
FIG. 17 is a hierarchical diagram for network application function support system and its subsystems.
Figure 17B:
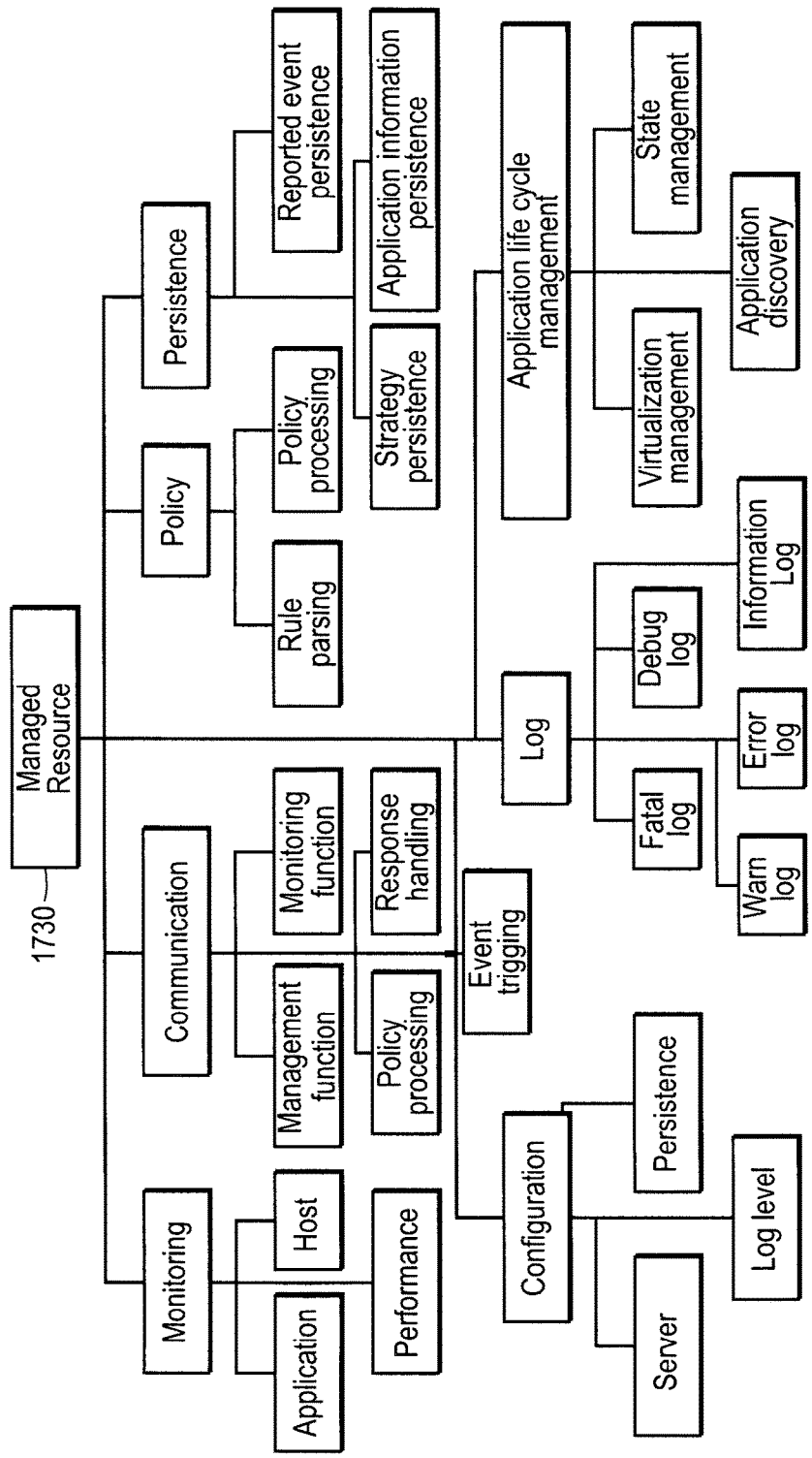

FIG. 17 shows an architecture diagram of using a virtual network with automation and lifecycle management system. Users can do oversubscription, but the system cannot overload or overcapacity. Such overload is monitored by a network application assurance system. The reason why the application assurance system is able to prevent an automated virtual network management device from "overload" is: the CPU-level preemptive privilege can be used in virtualized (FIG. 9) or non-virtualized (FIG. 18) cases. Of course, this subsystem also generates an alert, a report, and fault prevention. It is important to note that, in the future case of a complete virtual network, a variety of virtual and physical computing resources, network resources, storage resources and management systems form a very complex network. It is impractical to rely solely on automated management without intelligent autonomic management. Here, the application assurance system contains a rule engine only of simple rules. In reality, the aforementioned CEP or any intelligent method should also be included in the rule base.

Virtual network application assurance system consists of three parts: the central collection and control system (equivalent to resource manager at the middle layer of the ACRA autonomic system architecture), the managed-resource host and the agents on the host (equivalent to the sensor/effect set on the managed resources at the bottom layer), and the frontend subsystem (equivalent to an integrated console with certain functions of orchestrating manager at the top-layer).

Described below is an embodiment of the present invention.

Please see FIG. 17: the function hierarchy diagram of Application Assurance System. It reflects the dependencies among different functions of the embodiment, which consists of three parts: Front Subsystem 1710, Central Collect and Control System 1720, and Managed Resource 1730, which uses host machine as management unit.

The functions of Front Subsystem 1710 include: topology management, hierarchical management, address book management, alarm management, configuration management, performance management, security management, policy management, application management, report management, security access management, advanced server management, environment management, power management, and account services management. Among them, alarm management, configuration management, and performance management are closely related to the present invention.

Central Collect and Control System 1720 includes two function modules: Background Core Engine and Runtime Support. Background Core Engine includes the following features: bottom communication, network topology discovery, data monitoring and collecting, expert database, information database, receiving service, logging service, interfaces. Runtime support includes the following functions: service state management, query service, data service, and third-party access interface.

Managed Resource 1730 includes the following function modules and functions: monitoring (performance monitoring, application monitoring, host monitoring), configuration management (server information, log level, persistent information), communication (management function, monitoring function, policy processing, response handling, event triggering), log (fault log, debug log, warning log, error log, Information log), policy (rule parsing, policy processing), persistence (application information persistence, strategy persistence, reported event persistence), application life cycle management (virtualization management, state management, application discovery).

Figure 18:
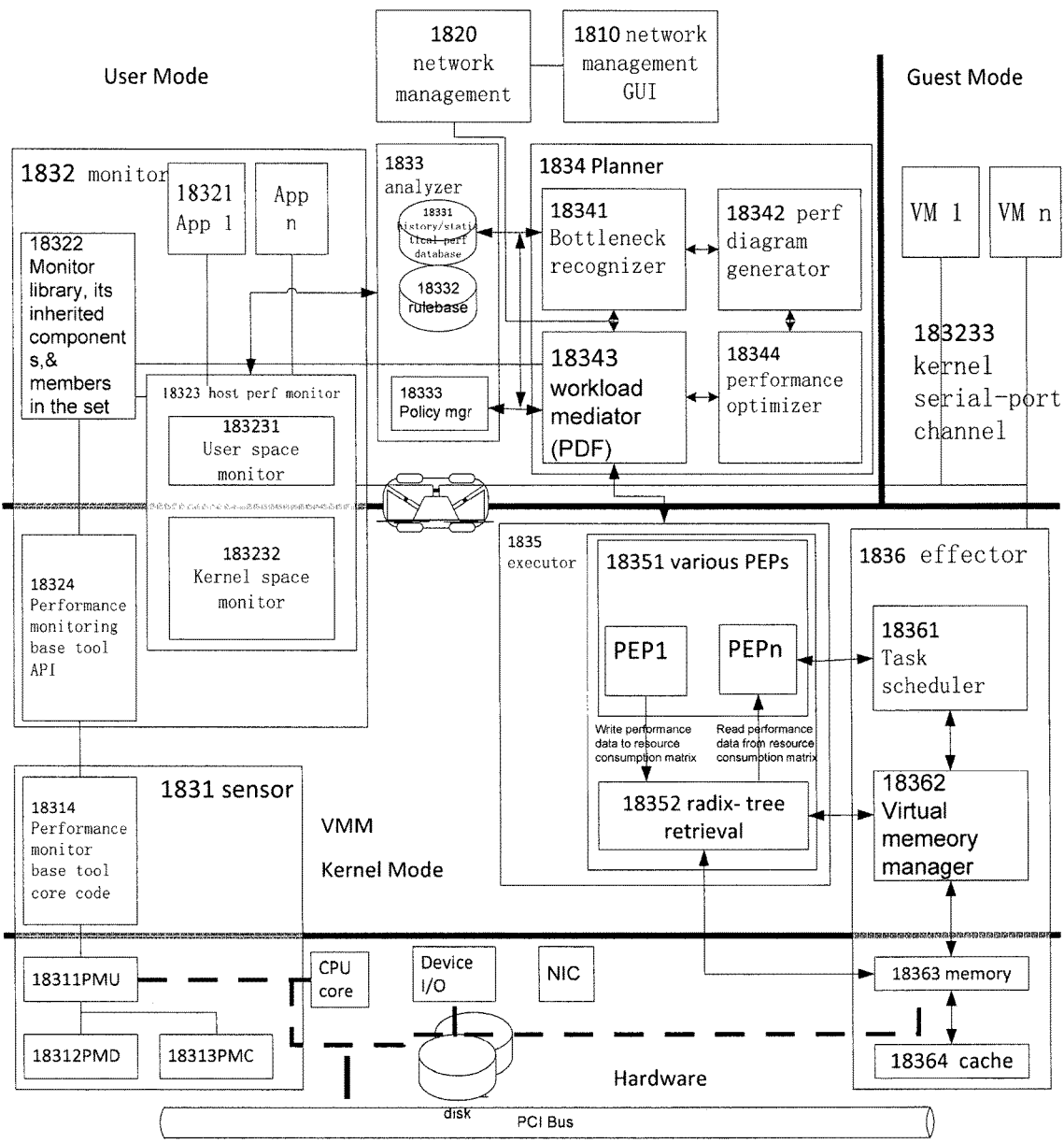
FIG. 18 is the combined architecture diagram of the performance services framework and the monitor for a virtual network.

Combined Architecture of Performance Service Framework and Performance Monitor for Virtual Network FIG. 18 is a combined architecture diagram of performance service framework and performance monitor for virtual network. This embodiment uses Linux virtualization architecture to implement the monitoring portion of an application assurance system in FIG. 17, e.g. it runs autonomic management MAPE components (monitor, analyze, plan, execute) in user space and kernel space, with the monitor connected with virtual machines of guest space via serial channel. The scope of patent protection is not limited to this method, such as MAPE components can also be run in a virtual machine (ie, guest space), and the OS virtualization environment is not limited to Linux platform.

From the autonomic management point of view, FIG. 9 shows sensors and effectors as touch point at the bottom layer; FIG. 18 shows the performance services, a contact point manager at the middle layer; and FIG. 17 shows the application assurance system, the orchestrating manager at the top layer.

In addition, FIG. 9 is a dwarfed host with no operating system virtualization, and FIG. 18 a host with VMM. Despite of the difference, from the viewpoint of PMU hardware monitoring CPU, the functions to monitor hardware and associated monitoring tools are similar.

Box 1810 corresponds to 1710 of FIG. 17 and is the user management of human-computer interaction.

Box 1820 corresponds to 1720 of FIG. 17, but stresses network management. The host running autonomic management MAPE is not limited to the cluster Slave (network leaf node). It can also be clustered Master (non-leaf node). Preemptive/mission-critical policies and the policies of general application may be transmitted through the Internet to any node.

Other boxes with prefix 183 comprise six components:

(1) Sensor of Box 1831. It is also the monitor hardware components, including box 18311's PMU, 18312's PMD, and the driver core code of 18313's PMC and 18314's PMU. This was described in FIG. 9.

(2) Performance Monitor of box 1832. Box 18321 is running applications 1 to application n in user space; Box 18322 contains a monitor library, its inherited components, and members within the collection; Box 18323 is the Host Performance Monitor, including box 183231 User space monitor running in user space, box 183232 kernel space monitor, and box 183233 virtual machine serial port channel, also as part of the Host Performance Monitor 18323; Box 18324 is the application interface (API) for performance monitoring base tool. Virtual machine serial port channel is the second channel to facilitate the rapid transmission of short messages other than Upcall/Hypercall channel. Both channels use agents running in virtual machines to collect performance information, and execute decisions (such as stopping application processes on the virtual machines).

For details of above (1) and (2) see Tang et al Chinese patent 201110141642.X "A framework and method to monitor the performance of virtualized system using hardware-based performance base tool".

(3) Analyzer of Box 1833. It comprises box 18331 History/statistical performance database, 18332 rule base, and 18333 Policy Manager. Rules can include hardware and application rules. The master host in a Cluster may also include network traffic mediating rules.

(4) Planner of Box 1834. It comprises box 18341 bottleneck recognizer, 18342 performance graphics generator, 18343 workload mediator (ie PDF, policy decision function), and 18,344 performance optimizer. Workload mediator mediates the cluster-intensive and transactional-intensive workload, orchestrates the global system analysis and local application analysis, and manages process life-cycle with the advantages of preemptive interrupts.

(5) Executor of Box 1835 actuators. It comprises various PEPs (box 18351, policy execution point), and box 18352, the radix-tree traverser. PEP exists in the virtual machines, VMM and KVM, with the aid of radix-tree traverse to execute commands issued from box 1834, the planner.

(6) Effector of Box 1836. It comprises box 18361, the OS task scheduler, box 18362 the memory manager, and box 18363 the memory hardware. This part has already been explained in FIG. 9.

For details of above (3) (4) (5) and (6), see the performance service framework system of Tang et al. patent US 2011/0296411 A1 "Kernel bus system to build virtual machine monitor and the performance service framework and method therefore".

Autonomic Management in a Network Application Assurance System

Figure 19:
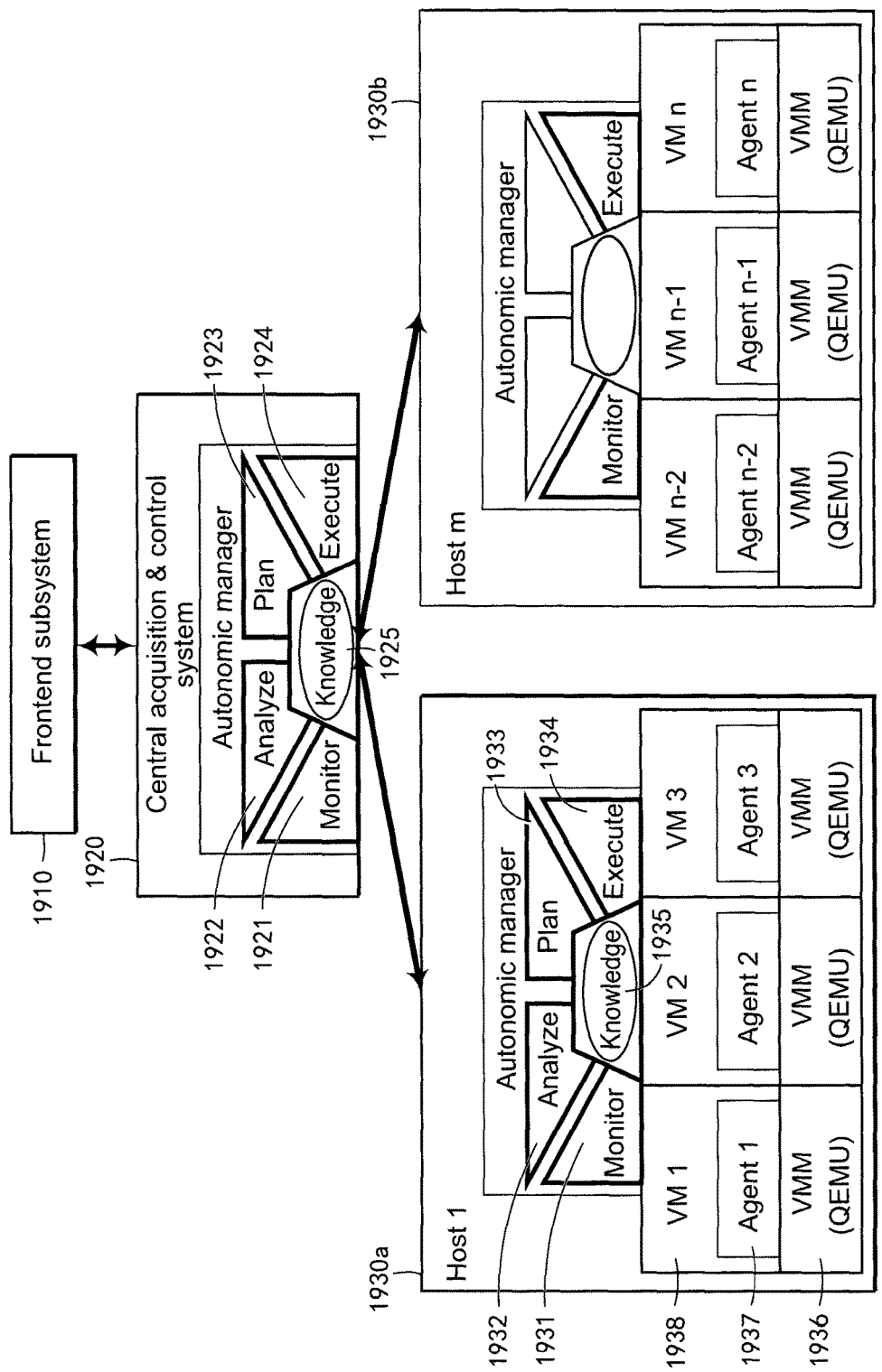
FIG. 19 is the block diagram of a network application assurance system.

Please see FIG. 19. Front Subsystem 1910 is equivalent to console manual managers plus certain orchestration managers in ACRA. The alarm management, configuration management, performance management of Front Subsystem 1910 realizes self-healing, self-configuring and self-optimizing in the middle layer autonomic elements. The reason that some of the top layer management functions are realized in Front Subsystem 1910 rather than in Central Collect and Control System 1920 of ACRA is because the autonomic management system still needs human interventions in the early stage of maturity. Only when the autonomic management system is fully mature, it would no longer need a lot human intervention. And those functions can be achieved by Central Collect and Control System 1920 instead.

Please see FIG. 19. Central Collect and Control System 1920 is equivalent to the middle layer of ACRA. Bottom Communication is responsible for communication between Central Collect and Control System 1920 and managed resource 1930*a* or 1930*b* and Front Subsystem 1910, mainly sending and receiving events. In the system initialization period, the network topology discovery function will automatically find all the network topology information of managed resources including hosts, network devices, applications, servers, databases, etc. This information will be stored in Knowledge Base 1925. Expert database includes data collection, analysis and calculation information of three types of autonomic elements (self-healing, self-configuring and self-optimizing), and correlation analysis of failures and faults. These features of expert database use artificial intelligence methods to achieve some orchestration manager functions in the top layer of ACRA (some features require manual intervention is implemented in Front Subsystem 1910). Information database includes network-wide resource information, topology information, configuration information and operating information. It is implemented by Knowledge Base 1925 of autonomic element. Receiving service achieves Monitor 1921 part of autonomic element. It is event-driven. Data monitoring and collection achieve the data collection function of the extra loop between Analyze 1922 and Plan 1923 parts. The part of finding needed information has some characteristics of polling (but the entire process of autonomic management is still event-driven). The interface function and the third party access interface are implemented by the sensor/effector set of autonomic element.

Service state management functionality is achieved by Analyze 1922 and Plan 1923 parts. Query service function provides services for Front Subsystem 1910, including system logging, business logging, operation logging. Log service functions are not implemented by autonomic elements. Data service function includes backup, migration and recovery. They are implemented by Execute 1924 part of autonomic element.

The monitoring functions of Managed Resource 1930*a* host 1 include performance monitoring, application monitoring; Host monitoring is achieved by Monitor 1931 part of autonomic element. Configuration management functions includes server information, log level, persistent information. They are all provided by Knowledge Base 1935 of autonomic element. Communication functions include management function, monitoring function, policy processing, response handling and event trigging; all achieved by Execute 1934 part of autonomic element. Log functions include fault log, debug logs, warning log, error log, information log; all are stored in the Knowledge Base 1935 of autonomic element, and shared with knowledge Base 1925. Policy functions include rule analysis, and policy processing, which achieved by Analyze 1932 and Plan 1933 parts of autonomic element. Persistence functions refer to some of the local (each VM on the host) strategies, such as application information persistence, strategy persistence, reported event persistence, etc., they are achieved by knowledge Base 1935 of autonomic element. Agent 1, 2, 3 1937 is the sensor/effector set of autonomic element.

It's noteworthy that the structures of managed resources 1930*a* Host 1 and 1930*b* Host m in FIG. 9 are simplified. In 1930*a* Host 1 there are three VM 1938 (i.e., VM1, VM2, VM3), but in reality there can be any amount of VMs (of course, within the limit of the system permitting). Application lifecycle management functions includes virtualization management, and state management; application discovery manages VM 1938 on 1930*a* host 1. Some of the functions are achieved through VMM 1936.

Figure 1:
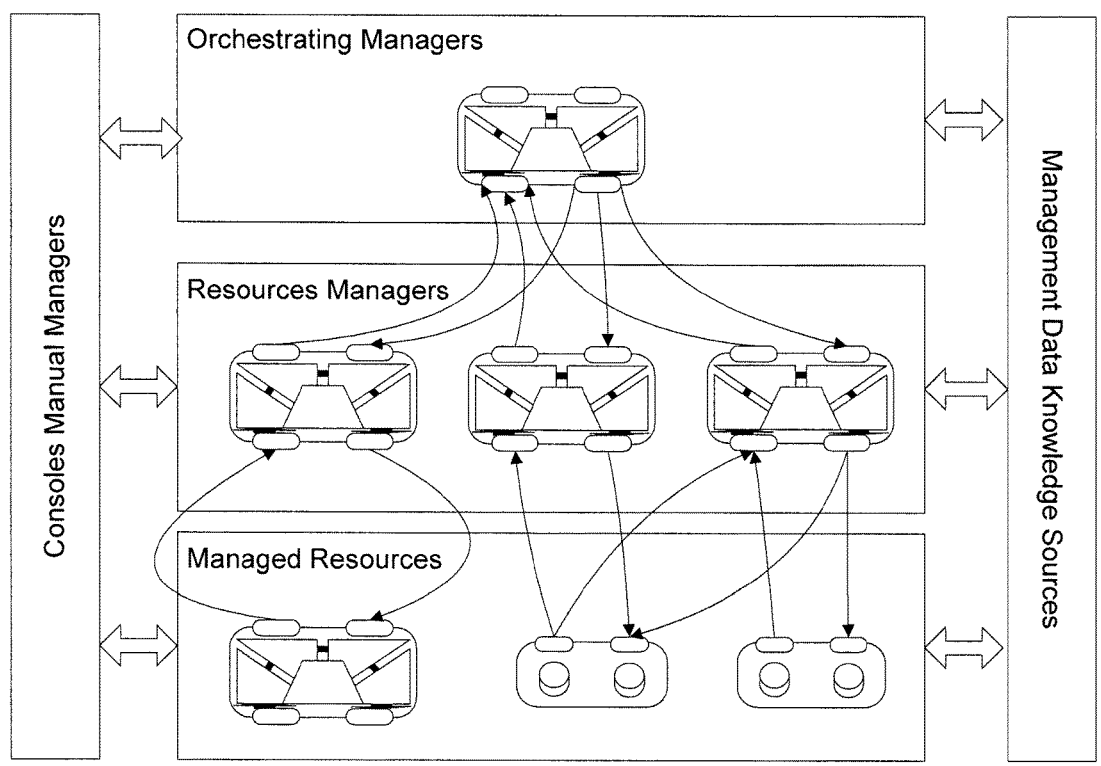
FIG. 1 is the block diagram for IBM's Autonomic Computing Reference Architecture (ACRA)

FIG. 19 managed resource 1930*a* host 1 has the complete version of local autonomic element. It enables the host 1 can achieve some degree of autonomic management according to the local policy when it is cut off (in the case of communication failure) from Central Collect and Control System 1920. Host 1 is equivalent to the autonomic element in ACRA at the bottom left of FIG. 1.

Managed resource 1930*b* host m in FIG. 19 is not depicted as complete version of autonomic element. It does not include Analyze part, Plan part, and knowledge base (i.e. no local policy exists), so host m can not achieve self-management. It only provides child-level monitor for the Monitor 1921 part, and child-level execute for Execute 1924 part of Central Collect And Control System 1920.

Please see FIG. 19. Knowledge 1935 defines the types of resources monitored by Monitor 1931, including: Host, Application, User, Switch, Router, Firewall, Domain Controller, Load Balancer, UPS, Printer, Virtual Device, etc. Among them Virtual Device is the one we concern most. It is the main objective that the present invention applied. The specific attributes monitored here (i.e. Monitor 1931 input event types) include: CPU_RATE, MEM_RATE, DISK_QUOTA, NETWORK_RX (network receive), NETWORK_TX (network transmit), CASHE_MISSED, CONTEXT_SWITCH, PAGE_FAULT, BRANCH_MISSES, CPU_MIGRATIONS, ALIGMENT_FAULTS, EMULATION_FAULTS, CPI (cycles per instruction), LDST (percentage of load and store instruction), RESST (percentage of resource stalls divided by unhalted core cycles), BRANCH (percentage of branch instructions), BRMISS (percentage of mispredicted branch divided by branch instructions), L2_CACHE_MISSES, BUS_RATE (bus utilization of any type of data transfer), BUS_DATA, BNR (Block Next Request), SIMD (percentage of SSE instruction), EFFECTIVE_INSTR, PIPELINEBLOCK, SYSTEM_CALL_NUM, etc.

Since the main purpose we introduce the embodiment of the present invention is to show its practicability, so it's unnecessary to describe all the details here for each managed resource types and the handling processes for each types of events being monitored. The embodiment is provided to persons of ordinary skill in the art to implement and utilize the present invention. Ordinary skill in the art may make various modification or variation to the embodiment without departing from the innovative idea of the present invention.

Figure 20:
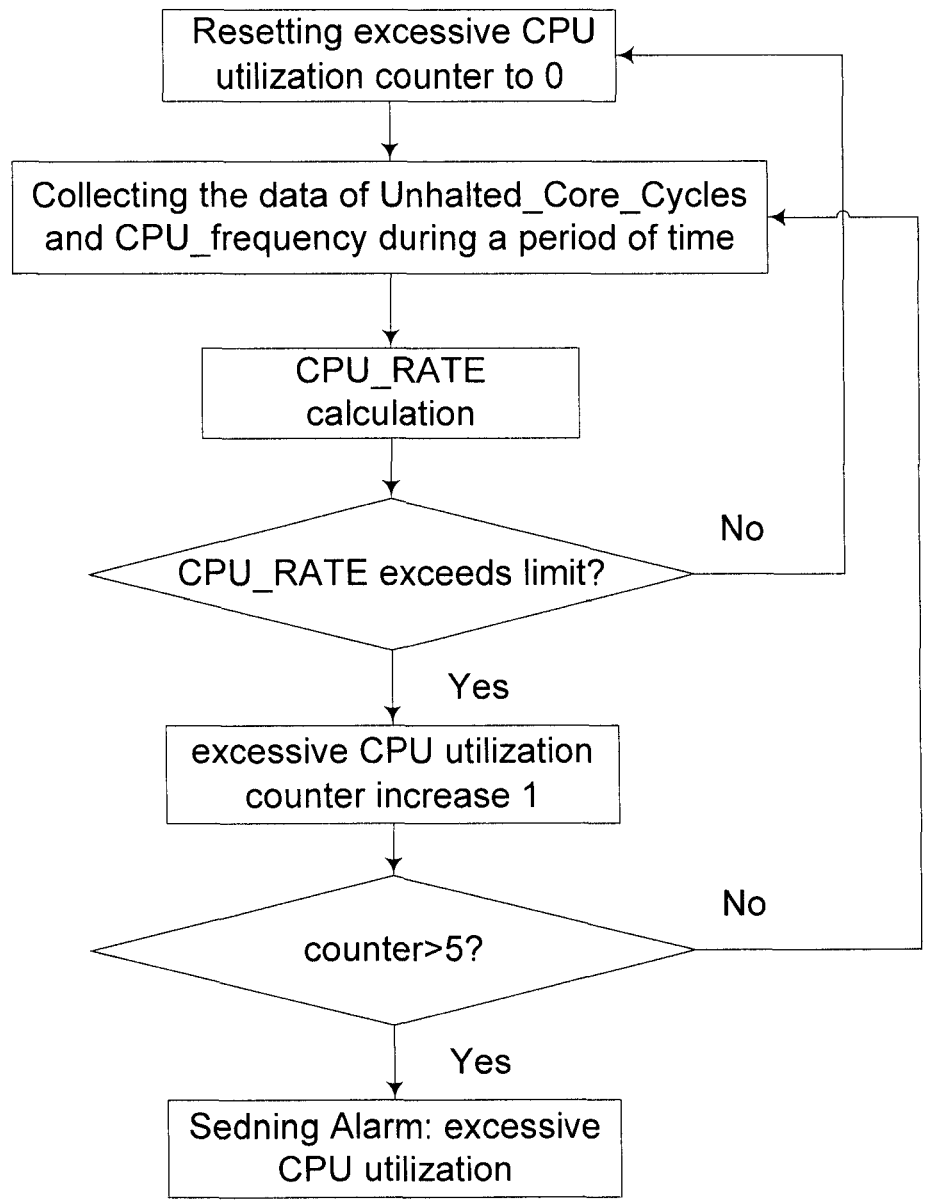
FIG. 20 is the flowchart of Child-level Monitor finding excessive CPU utilization and child-level Execution signaling alarm.

Child-Level Monitor Find Excessive CPU Utilization and Child-Level Execution Signal Alarm Please see FIG. 20. If we define that the CPU_RATE of VM n on Host m is: Unhalted_Core_Cycles/(CPU_frequency*Number_of_cores*3600) (seconds))*100, CPU_RATE calculation interval as 30 seconds, CPU_RATE greater than 90% is considered as excessive CPU utilization. Once the CPU_RATE exceeds 90% for five consecutive times, a warning alarm should be sent. For the determination process of excessive CPU utilization, please see FIG. 20. During the process, Unhalted_Core_Cycles, CPU_frequency and Number_of_cores values are obtained from the Agent n of VM n in FIG. 19, CPU utilization rate calculation, and the determination of excessive CPU utilization are done by the Monitor. Warning alarm is sent by Execute.

Flowchart for Handling Excessive CPU Utilization Alarm

Figure 21:
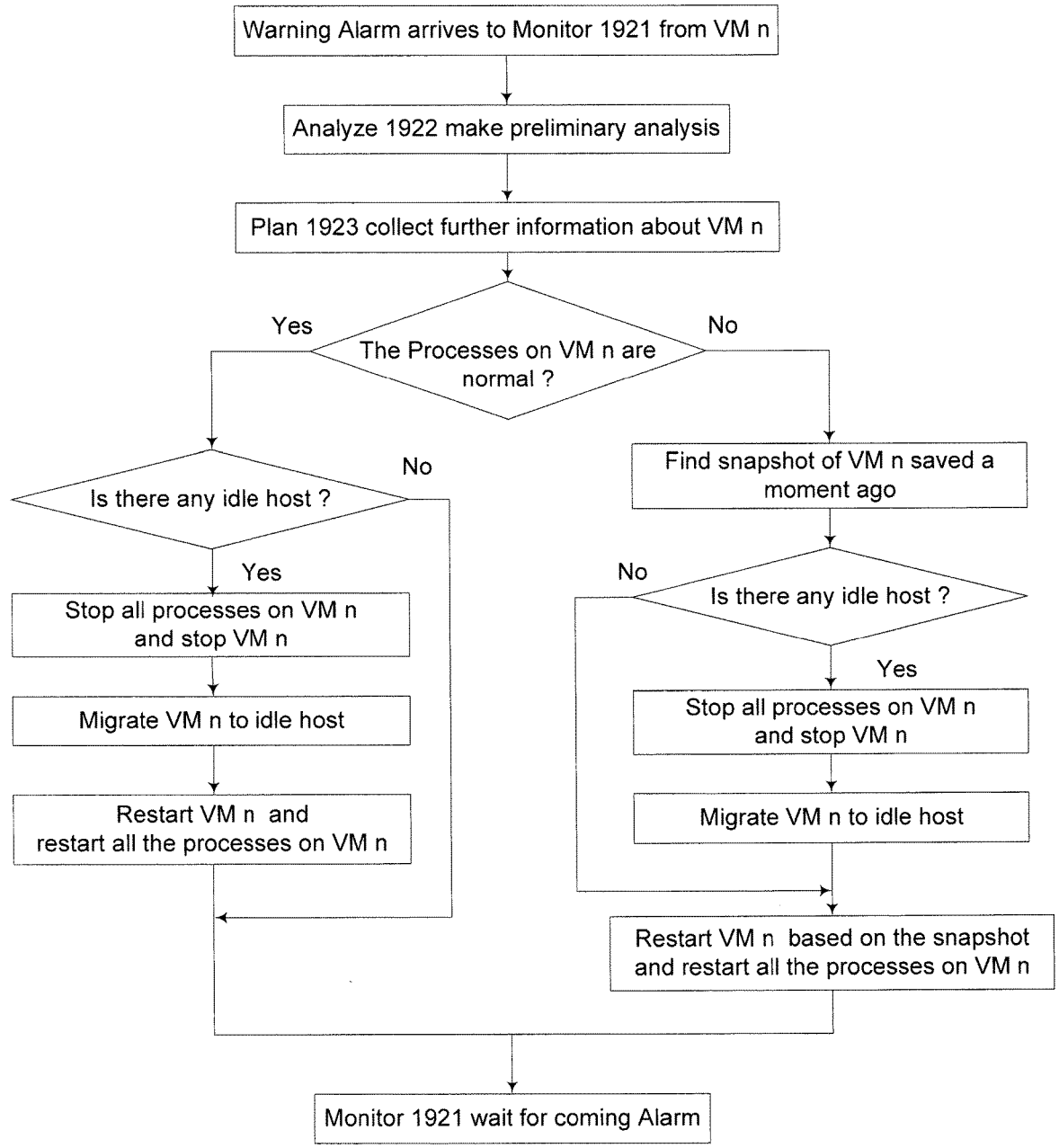
FIG. 21 is the flowchart of an autonomic manager processing excessive CPU utilization alarm receiving from managed resource VM n in central collection and control system.

FIG. 21 is the flowchart of an autonomic manager processing excessive CPU utilization alarm receiving from managed resource VM n in central collection and control system. Please also refer to FIG. 19, when the warning alarm arrives to Monitor 1921 of Central Collect and Control System's autonomic manager, Analyze 1922 will make preliminary analysis, Plan 1923 will collect further information about VM n. If information received from VM n indicates that the processes on VM n are normal, which means VM n consumes a lot CPU resource as it suppose to, we can consider (live) migrate it to another host. If information received from the VM n indicates that a process on the VM n is abnormal, then VM n can stop and restart it based on the snapshot saved a moment ago (e.g. 10 minutes), or migrate all the virtual machines to another host and restart them based on snapshot.

Autonomic Virtual Network System

Figure 22:
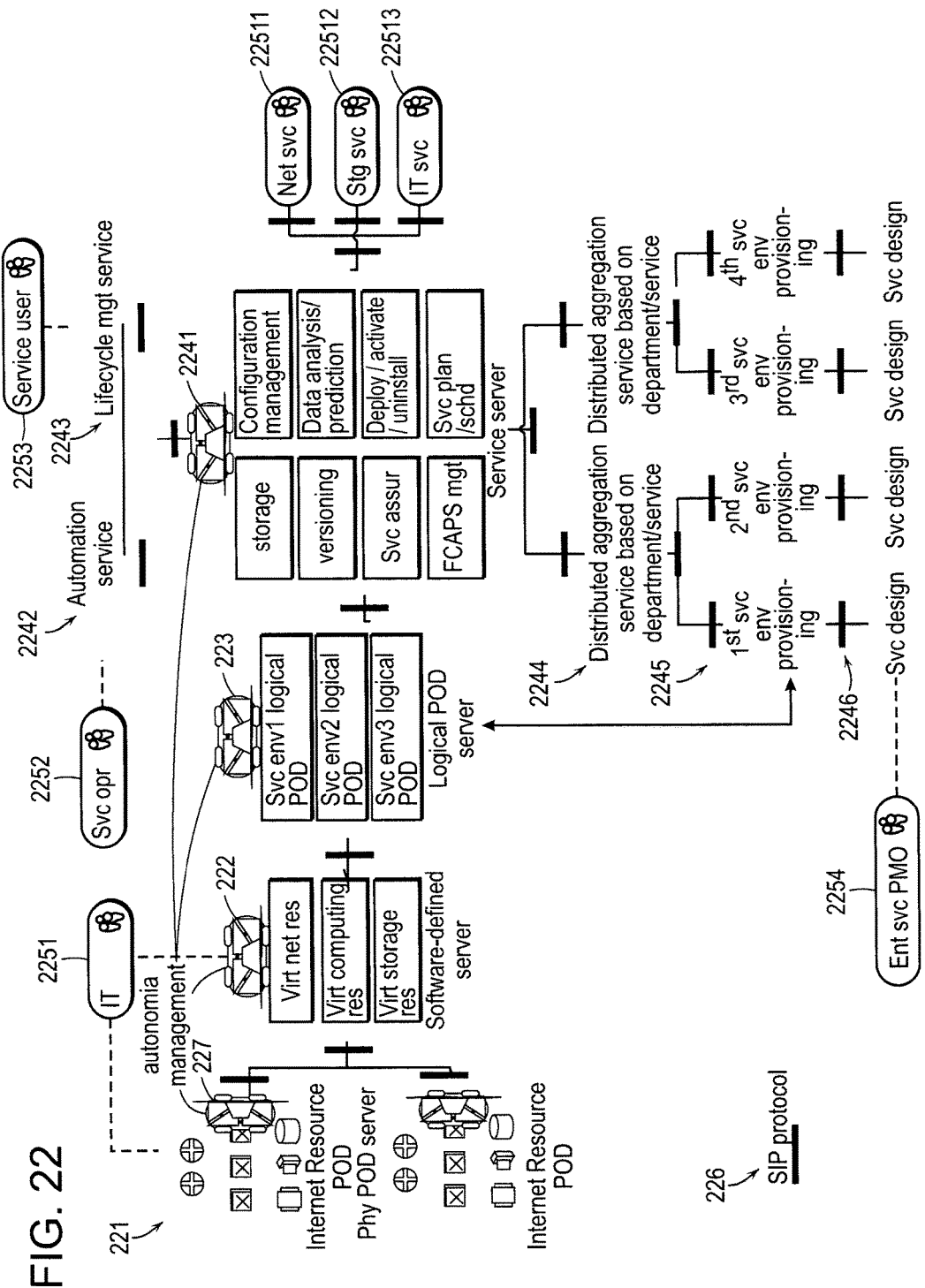
FIG. 22 is the architecture diagram of autonomic virtual network.

FIG. 22 is an architecture diagram of autonomic virtual network.

Autonomic virtual network system combines the aforementioned inventions:

Three basic inventions on virtualized autonomic management system: (1) autonomic management system (FIG. 3, FIG. 4A, and FIG. 4B), including the autonomic management system virtualization (FIG. 8); (2) preemptive contact points system (FIG. 9); (3) Software-defined Service System (FIG. 11); and One invention on virtual network system (FIG. 13 & FIG. 14), including the application assurance system (FIG. 17 & FIG. 18).

In addition, although the foregoing embodiment of application assurance system has been borrowed to illustrate the role autonomic management can play as a subsystem (FIG. 17 and FIG. 18), virtualized autonomic network also covers other independent basic components: Physical POD, software-defined services, logical POD, and other delivery services, as well as user agent, which can also be autonomically managed. This five-layer architecture extends the classic ACRA three-tier structure. Put it in a more abstract sense, ACRA three-tier structure may become n-layer, with relationship between upper and lower tiers as: they both have similar MAPE components, but the lower tier handles relatively local events, and the upper handles relatively global events. Described as follows:

(1) Physical POD server of Box 221. Detailed are in descriptions of FIGS. 11 and 12.

(2) Software-defined server of Box 222 of the server. Detailed are in descriptions of FIGS. 11 and 12.

(3) Logical POD server POD server of Box 223. Logical POD is multiplexing the resources of software-defined server, as detailed in FIG. 24 descriptions.

(4) Service delivery platform of box 224. It includes:

a) Service Server 2241, functions include the management of issues like storage, versioning, service assurance, FCAPS, configuration, data analysis and forecasting, deployment/activation/uninstallation, business planning/scheduling, etc. FCAPS is a computer network management system of the five sub-systems, including fault management, configuration management, accounting management, performance management, and security management.

b) Automated Deployment Services 2242, detailed in the descriptions of FIG. 15.

c) Service Life Cycle Management 2243, including life cycle management of service design, deployment, operation, and uninstallation.

d) Distributed service aggregation 2244.

e) Service Environment Provisioning 2245. Logical POD instance and service instance is a 1-1 correspondence, subscribing virtual resources, and thus subscribing distributed physical resources. This is shown by double-arrow solid lines.

f) Service design 2246.

(5) User 225. This includes system administrators 2251 (network resource manager 22511, storage resource manager 22512, & computing resources administrator 22513), service operations 2252, corporate service users 2253, and enterprise project management office 2254. These are so-called User Agent (UA), with intelligent autonomic management capabilities and graphical interface.

(6) Session protocol marking 226. It is shown as thick and short solid line. It supports distributed and aggregated real-time sessions, as detailed in FIG. 23 descriptions.

(7) Autonomic management marking 227. For details of how physical POD server and software-defined server utilize autonomic management, see descriptions of FIGS. 11 and 12. Logical POD server uses autonomic management to realize the resource scheduling of push and pull between itself and software-defined server. Service delivery platform uses autonomic management to achieve operation competition for resources amongst multiple logical POD servers, and also uses autonomic management to implement operation request competition for resources amongst multiple user agents.

SIP Protocol for the Autonomic Virtual Network

Figure 23:
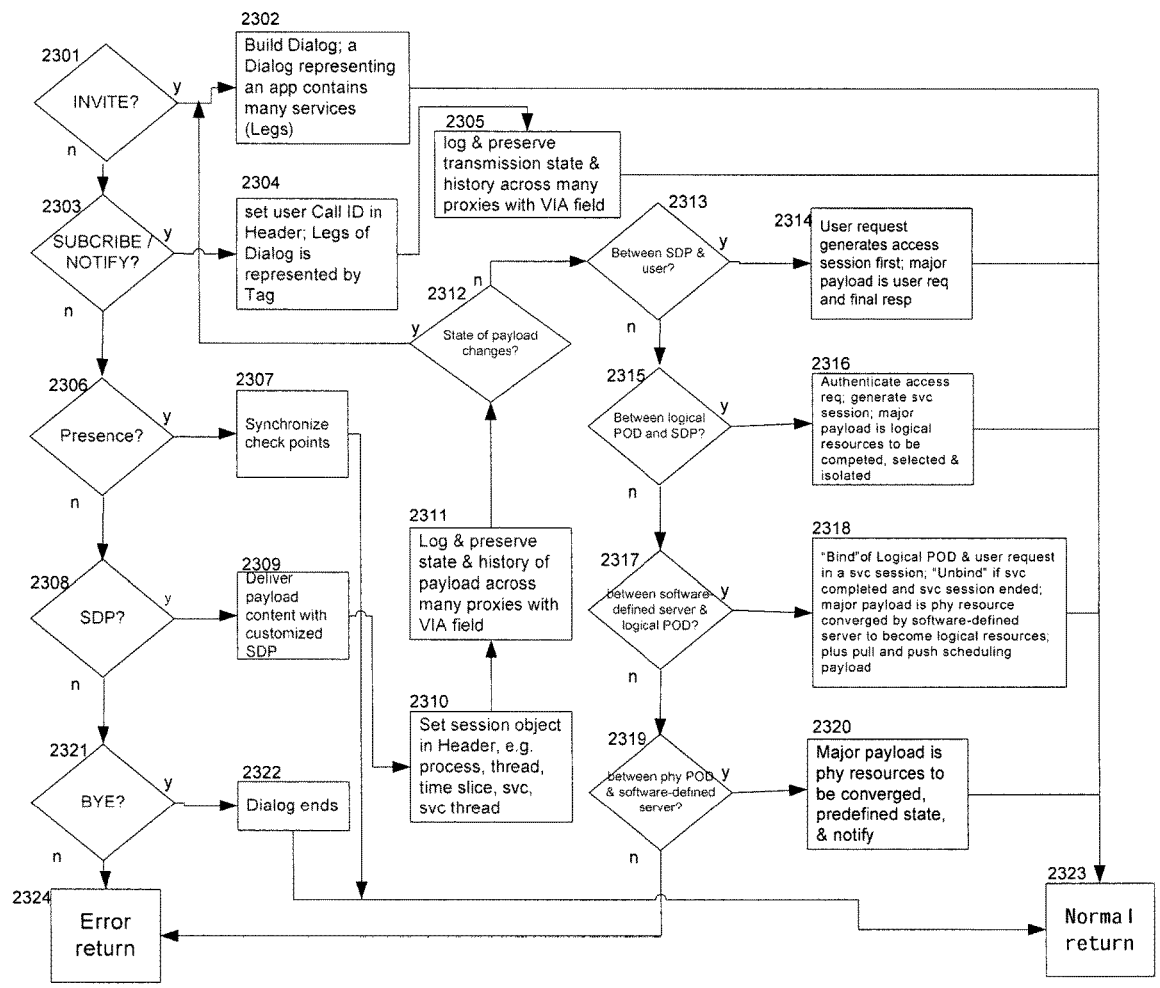
FIG. 23 is the flowchart of Session Initiation Protocol (SIP) used in an autonomic virtual network.

FIG. 23 is the flowchart of Session Initiation Protocol (SIP) used in an autonomic virtual network. Although the embodiment uses SIP for explanation purpose, the concept is also applicable to other similar or future communication protocols. Because of SIP, Virtual network is able to complete the integrity and QoS assurance of service planning/ design environmental. SIP is stateful. In point-to-point communication, SIP can handle recovery from failure, can take advantage of Proxy/Gateway across-virtual-network cluster, and can encapsulate/transmit traffic load of other virtual network protocols. Note that there are two kinds of states: (A) all protocols have the states of communications, (B), but here the state emphasized is within the traffic load, or the states of physical or logical resources, stored in the MIB of the VFSM. When the said resource state changes, SIP needs to resend Invite command. Therefore, step 2312 is a crucial step.

Step 2301: determine whether it is the SIP command Invite. If so, go to step 2302; otherwise step 2303;

Step 2302: create Dialog, wherein a Dialog represents an application, which can have multiple services (i.e. Dialog's "Legs"). Go to step 2322;

Step 2303: determine whether it is the SIP command Subscribe. If so, go to step 2304; otherwise go to step 2306;

Step 2304: set the user's Call ID in the Header. Dialog's Legs are expressed by Tag; go to step 2305;

Step 2305: log and save transmission states and history using VIA characters when crossing multiple Proxies; go to step 2322;

Step 2306: determine whether it is a SIP command Presence. f so, go to step 2307; otherwise go to step 2308;

Step 2307: synchronize check points; go to step 2321;

Step 2308: determine whether it is the command SDP. If so, go to step 2309; otherwise go to step 2319;

Step 2309: transmit payload content with customized SDP; go to step 2310;

Step 2310: set session objects in Header, such as processes, threads, time slices, services, service threads; go to step 2311;

Step 2311: log and save states and history in the payload using VIA characters when crossing multiple Proxies; go to step 2312;

Step 2312: determine whether the state in the payload changes. If so, go to step 2302; otherwise go to step 2313;

Step 2313: determine whether it is between service delivery platform and user. If so, go to step 2314; otherwise go to step 2315;

Step 2314: The user request first generates an access session, where the main payload is the user's request and the eventual response; go to step 2323;

Step 2315: determine whether it is between the logic resource POD and service delivery platform. If so, go to step 2316; otherwise go to step 2317;

Step 2316: generate service session after the access request is authenticated. Main payload is the logic resources competed for, selected, and isolated; go to step 2323;

Step 2317: determine whether it is between software-defined server and logical resources POD. If so, go to step 2318; otherwise go to step 2319;

Step 2318: In the Services session, logical POD binds with user-requested service. When the service is completed, it is no longer bound (unbind). So the service session is over. Has been the main payload is the physical resources converged by the software-defined server, integrated to become logical resources; and it becomes the payload of scheduling for push and pull loads. Go to step 2323;

Step 2319: determine whether it is between physical resource POD and the software-defined server. If so, go to step 2320; otherwise go to step 2324;

Step 2320: The main payloads are the converged physical resources, predefined state changes, and notify. Go to step 2323;

Step 2321: determine whether it is the SIP command Bye. If so, go to step 2322; otherwise go to step 2324;

Step 2322: Dialog ends. Go to step 2323;

Step 2323: normal return;

Step 2324: error return.

Logical POD Server

FIG. 24 is a flowchart of logical POD server.

Logical POD server contains multiple logical PODs. Each logical POD has three different provision options:

(1) In addition to space-sharing characteristics, time-sharing logical POD also supports "virtual server", and the virtual server can over-subscribe physical host servers. Moreover, each virtual server may have different hardware specifications with respect to other virtual servers, relative to each other. For example, physical host with an Intel VT-i may run two timesharing virtual servers at different times, wherein one virtual server has a hardware specification of VT-x and cache PCI-x, while the other has spec of VT-x only. Physical host server is not visible to its provisioning instances.

(2) In addition to the specifications of the virtual server can be on-demand provisioned, the virtual server's operating system can also be on-demand provisioned to run on each virtual machine.

(3) In addition to the virtual server's operating system can be provisioned on-demand the application server (AS) can also be provisioned on-demand to run on each oversubscribed operating system.

The flow proceeds as follows:

Step 2401: Logic POD server initialization. Go to step 2402;

Step 2402: determine whether it faces service delivery platform. If so, go to step 2403; otherwise go to step 2408;

Step 2403: accept resource operational request event coming from service delivery platform. The logic POD multiplexes resources in a network where virtual resources are converged. Go to step 2404;

Step 2404: resolve the problem of resource competition amongst multiple service logic PODs, according to the methods of VFSM executors, as well as VFSM rule base. Go to step 2405;

Step 2405: determine whether the multiple logical PODs in this current server have sufficient resources. If so, go to step 2406; otherwise, go to step 2407;

Step 2406: compare the available resources of the software-defined server, with the need of various service logical PODs in the POD server. Obtain competition results under QoS. Go to step 2413;

Step 2407: notify service delivery platform to request additional resources. Go to step 2413;

Step 2408: determine whether it faces software-defined server. If so, go to step 2409; otherwise go to step 2414;

Step 2409: execute the scheduling of pull/push between software-defined server and logical POD server, according to the rules in the rule base of resource scheduling. Go to step 2410;

Step 2410: determine which kind of scheduling. If push scheduling, go to step 2411; for pull scheduling, go to step 2412;

Step 2411: push scheduling commits the requirements for resource change regardless of physical POD capability. Support resource provisioning in parallel. Go to step 2420;

Step 2412: pull Scheduling commits the requirements for resource change only when POD physical capacity is ready. Support resource provisioning in parallel. Go to step 2420;

Step 2413: normal return;

Step 2414: error return.

The Interaction Between Service Delivery Platform and the User

FIG. 25 shows the flowchart of the interaction between service delivery platform and the user. Service delivery platform accepts requests from different users. If it is a request of hardware resources operation from various IT personnel, then obtain competition results according to simple QoS rules. If enterprise service personnel, then enter the service life cycle management. If service operation personnel (such as application developers), then enter deployment automation. If PMO, then enter the subscription service, and perform multi-department, multi-service aggregation by the MAPE engines of service server, to provision a service environment in which PMO can conduct service design. (MAPE engine is the aforementioned autonomic manager. It is the autonomic management software comprising four MAPE components) If communicating with logical POD server, then give command to logical POD server the in accordance with result of the calculation by MAPE engine. On the other hand, also receive notification of insufficient resources at logical POD server and forward it to MAPE engine.

The MAPE engine of service server is just like orchestrating manager of autonomic management. Its MAPE components are global (while the MAPE components of logical POD server only services locally). Therefore its rule base considers not only the competition for resources amongst logical POD servers, but also business needs from the users.

Flow steps are as follows:

Step 2501: service delivery platform initialization. Go to step 2502;

Step 2502: determine whether user-facing. If so, go to step 2503; otherwise go to step 2515;

Step 2503: determine whether the user is the system/network administrator. If so, go to step 2504; otherwise go to step 2505;

Step 2504: accept service operation requests from different systems/network management personnel (IT, storage, networking, & servers). Obtained the competition results after comparing simple QoS rules (whose request to process first, whose request to wait, etc.). Go to step 2507;

Step 2505: determine whether the user is enterprise service personnel (who use the service, such as operator of NOC, or the network operations center). If so, go to step 2506; otherwise go to step 2508;

Step 2506: Enter the service life-cycle management. Go to step 2507;

Step 2507: Enter the MAPE engine of service server. Go to step 2528;

Step 2508: determine whether the user is the service operations personnel (such as application developers, responsible for the installation and maintenance of the business application software). If so, go to step 2509; otherwise go to step 2510;

Step 2509: Enter the deployment automation services. Go to step 2507;

Step 2510: determine whether the user is service PMO (for example, the business project manager). If so, go to step 2511; otherwise go to step 2516;

Step 2511: service instance has one-to-one correspondence to logical POD, subscribes to virtual resources, and thus subscribes distributed physical resources. Go to step 2512;

Step 2512: Enter the service server MAPE engine. Go to step 2513;

Step 2513: perform the department/business based services distributed aggregation. Go to step 2514;

Step 2514: provision service environment. Go to step 2515;

Step 2515: provide PMO with business design. Go to step 2528;

Step 2516: determine whether it is the service server MAPE engine. If so, go to step 2517; otherwise go to step 2523;

Step 2517: determine whether it is the service subscription or logical POD notification. If so, go to step 2518; otherwise go to step 2519;

Step 2518: Business Services Core: configuration, activation, deployment, uninstallation, service assurance, service scheduling, FCAPS management, etc. Go to step 2528;

Step 2519: The requirements of global orchestrating subscription service and the requirements of service logic POD of each POD server are competing to obtain results under QoS. Go to step 2520;

Step 2520: According to the rule base, VFSM executor computes service state (online, offline, designed, deleted), to resolve resource competition problem amongst multiple server logic POD servers. Go to step 2521;

Step 2521: determine whether the overall service delivery platform has sufficient hardware capacity. If so, go to step 2528; otherwise go to step 2522;

Step 2522: Notify System/IT department to purchase hardware resources. Go to step 2528;

Step 2523: determine whether logical POD server-facing. If so, go to step 2524; otherwise go to step 2529;

Step 2524: to determine whether issuing commands of logical resources to POD server. If so, go to step 2525; otherwise go to step 2526;

Step 2525: The MAPE engine informs logical POD server of the results obtained from the engine execution, compares the different service operations, and obtains competition results under QoS. Go to step 2528;

Step 2526: determine whether to accept the POD server notifications. If so, go to step 2527; otherwise go to step 2529;

Step 2527: tell MAPE engine. Go to step 2528;

Step 2528: normal return;

Step 2529: error return.

The Formation of POD Under Cluster Environment

Figure 26:
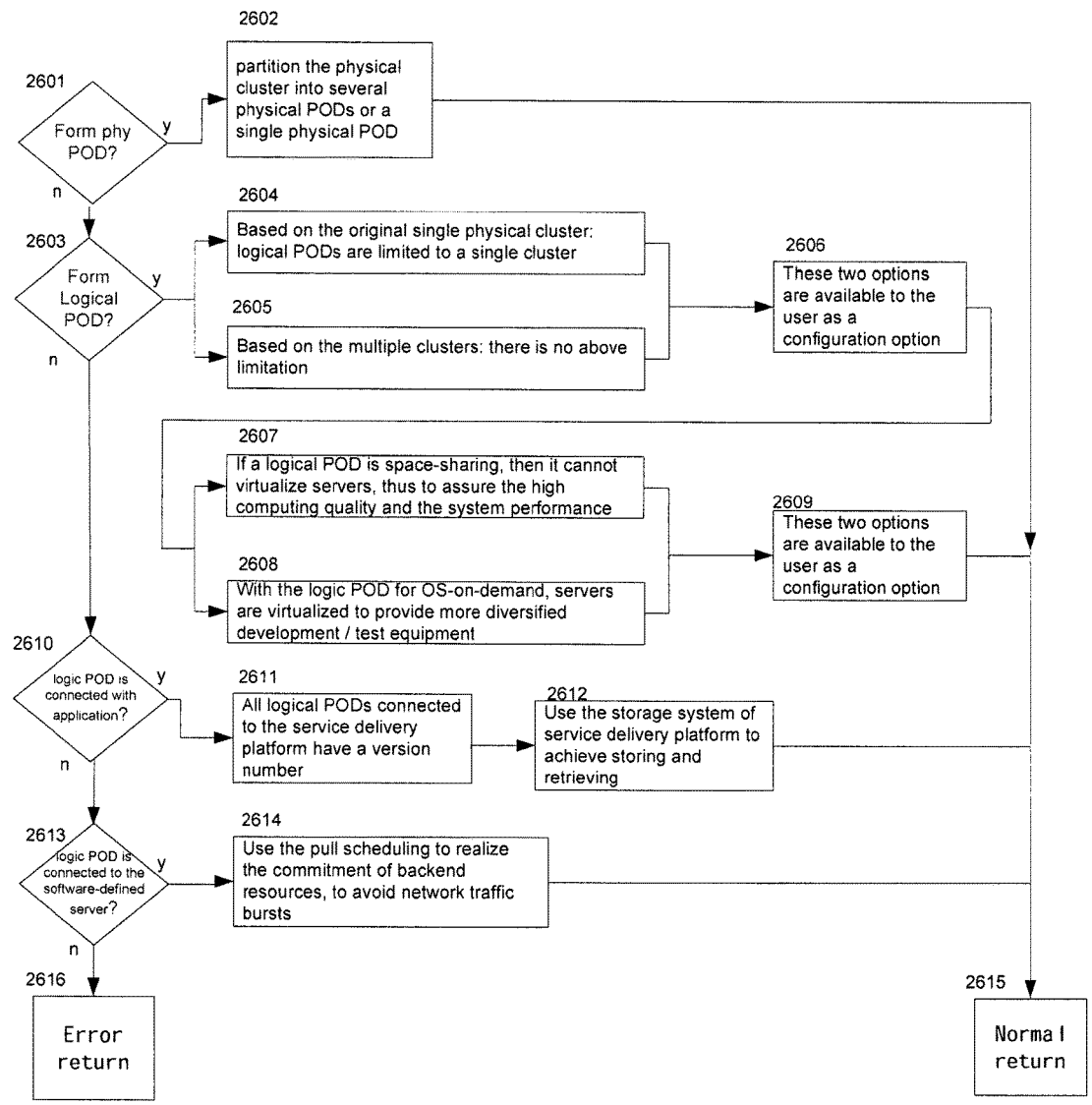
FIG. 26 is the flowchart of POD formation in a cluster environment.

FIG. 26 shows the flowchart of POD formation under cluster environment.

Virtual network can be (a) a simple "single-server and multi-clients", or (2) "multi-client n-tier topology", such as pre-Web servers, application servers, database servers, and back-end storage facility. The hardware structure can be heterogeneous. However, the network can also be a (3) "multi-client cluster topology", which hosts hundreds of thousands are attributed to different clusters. In a cluster topology with huge number of hosts, the slave node for a node cluster permits limited failure; In general, all master-slave groupings are homogeneous; clusters need to support load balancing; physical resources can first be divided into many physical PODs, with each physical POD has a plurality of clusters; and logic POD can have more than one sue to the design of the different users. Although some hosts may not have been virtualized, the logic POD provides OS-on-Demand service, which can rapidly deploy virtual machines on the host. Proceed as follows:

Step 2601: determine whether to form physical POD. If so, go to step 2602; otherwise go to step 2603;

Step 2602: partition the physical cluster into several physical PODs or a single physical POD. Go to step 2615;

Step 2603: determine whether to form a logical POD. If so, go to step 2604 or 2605; otherwise go to step 2610;

Step 2604: Based on the original single physical cluster: logical PODs are limited to a single cluster. Go to step 2606;

Step 2605: Based on the multiple clusters: there is no above limitation. Go to step 2606;

Step 2606: These two options are available to the user as a configuration option. Go to step 2607 or 2608;

Step 2607: If a logical POD is space-sharing, then it cannot virtualize servers, thus to assure the high computing quality and the system performance. Go to step 2609;

Step 2608: With the logic POD for OS-on-demand, servers are virtualized to provide more diversified development/test equipment. Go to step 2609;

Step 2609: These two options are available to the user as a configuration option. Go to step 2615;

Step 2610: determine whether the logic POD is connected with application. If so, go to step 2611; otherwise go to step 2613;

Step 2611: All logical PODs connected to the service delivery platform have a version number. Go to step 2612;

Step 2612: Use the storage system of service delivery platform to achieve storing and retrieving. Go to step 2615;

Step 2613: determine whether the logic POD is connected to the software-defined server. If so, go to step 2614; otherwise go to step 2616;

Step 2614: Use the pull scheduling to realize the commitment of backend resources, to avoid network traffic bursts. Go to step 2615;

Step 2615: normal return;

Step 2616: error return.

The above description explains the basic flow of the architecture and implementation methods of autonomic virtual network for the disclosed invention with reference to the drawings. Autonomic virtual network system is disclosed as only embodiments of the broader inventive ideas in certain situations. However these embodiments prove the practical utility of the disclosed invention. The concrete realization of the inventive ideas can also be applied to other non-virtual network management applications, such as enterprise ERP application systems, remote sensing Machine-to-Machine networking applications. Therefore, some details of autonomic management system used in autonomic virtual networks should not be construed limited to this invention, the present invention will now be defined in the appended claims the scope of the protection scope of the present invention.

What is claimed is:

1. A system executing on a computer for designing and constructing of multi-loop autonomic managers, including a design apparatus and a construction apparatus, wherein, said design apparatus adds at least one loop between an analysis part and a planning part, and forms a multi-loop autonomic manager as an extension to an autonomic manager of a classical autonomic element model; and said multi-loop autonomic manager uses a diagnostic flowchart to express fault-diagnosing work steps, said fault-diagnosing work steps form a process of repetitive "hypothesis-generating→investigating→discovering→concluding", and achieving a final fault-diagnosing conclusion, wherein said multi-loop autonomic managers, under an autonomic computing reference architecture, forms a hybrid autonomic computing reference architecture combining classical and non-classical autonomic elements.

2. A method for operating a multi-loop autonomic manager, the method comprising:

running each step of a diagnosis flowchart as an event, running each connections between various steps of the diagnostic flowchart as an activity, and accordingly transferring the diagnostic flowchart into an event-driven process block diagram; and mapping each event to an autonomic manager, such that an analysis part and a planning part of said autonomic manager can be represented by a set of rules, wherein said set of rules is realized by complex event processing (CEP) technology; said autonomic manager, under an autonomic computing reference architecture, form a hybrid autonomic computing reference architecture; each part of the autonomic manager includes a plurality of instances of a CEP engine; and each of said instances contains a plurality of rules.

3. The method as claim 2, further comprising:

realizing said multi-loop autonomic manager through an event-driven method;

defining an event processing agent (EPA) as a CEP engine instance of the plurality of instances of the CEP engines;

building said autonomic manager by connecting four EPAs; and adding, by said autonomic manager built by said EPA, at least one extra loop between the analysis part and the planning part, wherein said autonomic manager is an extension to the autonomic manager of a classic autonomic element model.

4. The method as claim 3, further comprising:

saving and searching, by said multi-loop autonomic managers, rules of a rulebase of said EPA, wherein past experience is preserved, and new rules are automatically learned;

forming, by a monitor EPA, an event sequence containing at least one rule, and saving said event sequence in the rulebase of EPA;

searching, by an analyzer EPA, an event sequence matching a current stimulus; if successful, matching to the most similar hypothesis by similarity score; otherwise returning to said monitor;

recognizing, by a planner EPA, an object and object parameters, and searching a hypothesis matching object and meta-state; if successful, saving failed experience into the rulebase and matching the most similar recovery plan by similarity score; otherwise returning to said analyzer; and searching, by an executor EPA, a recovery plan matching strategies; if successful, matching the best execution plan using fraction method; otherwise returning to the planner.

5. The system as claim 1, wherein said hybrid autonomic computing reference architecture includes bottom, middle and top layers, comprising:
 a bottom layer of said hybrid autonomic computing reference architecture including virtual and physical network devices; said virtual and physical network devices, as managed resources, exist in said hybrid autonomic computing reference architecture; some of said managed resources themselves contain the properties of autonomic management;
 a middle layer of said hybrid autonomic computing reference architecture including a large number of autonomic elements of autonomic managers built by EPA's; each of said autonomic element represents a management task originally performed by IT personnel manually; said autonomic elements, as resource managers, exist in said hybrid autonomic computing reference architecture; at least one of said autonomic elements implements one of the tasks of self-configuring, self-optimizing and self-healing; and
 a top layer of said hybrid autonomic computing reference architecture including an orchestrator orchestrating various middle-layers resource managers; said orchestrator controls the autonomic management of the global system.

6. A virtual autonomic management system executing on a computer, comprising:
 an image deployment module including autonomic managers themselves decomposed and recomposed by an application virtualization component, and then directly deployed on a physical or virtual operating system image, with the transmission using streaming technology during direct deployment; an autonomic management system component in the virtual image is synchronized at any time, via a differential technique, among the three tiers: the bottom, the middle, and the top layers of the autonomic computing reference architecture;
 a contact point module, including sensors and effectors of the autonomic managers, running inside of a virtualized host virtual machine monitor (VMM) and the hardware layer, possessing the host VMM secure ring-0 preemptive privilege, being able to provide pre-warning alert for the non-preemptive processes approaching failure and take preventive measures; and
 a hardware virtualization module, wherein the autonomic managers use hardware virtualization to manage physical and virtual resources; the hardware virtualization module uses a VFSM of the software-defined server to store and search current states of the physical and logical resources; a resource manager at the middle-layer of said autonomic computing reference architecture is composed of various types of autonomic managers; said the resource manager manages virtual and physical resources where said virtual resources include virtual servers, virtual switches, and virtual net cards, and said physical resources include physical switches,
 wherein said image deployment module, said contact point module, and said hardware virtualization module can be implemented for any autonomic management system, including multi-loop autonomic management system of claim 1.

7. A preemptive-privileged contact-point system, including sensors and effectors, running on a computer in an operating system or virtual machine kernel space, and having kernel ring-0 security, comprising:
 a sensor, when receiving a stimulus coming from hardware, determines possible faults; and
 an effector, when entering a kernel interrupt service routine, possesses the kernel ring-0 security and pre-emptive privilege, and controls a memory manager, a peripherals manager and a task scheduler of kernel-level rings 1-3 security, in order to terminate, restart, change time slice of, or live-migrate non-preemptive processes running on an operating system or virtual machine.

8. An intelligent ring-0 contact-point method, comprising:
 monitoring at the process-level by sensors, using multiplexing method so that the monitoring is able to continue even if the number of monitored events exceeds the number of counters of performance monitoring unit;
 monitoring at the system-level by sensors, comprising monitoring translation lookaside buffer miss, PCI bus latency and traffic, CPU stall cycles, memory access latency, device access latency, and cache instruction stall;
 controlling the following activities if effectors are running on an operating system: setting a gang algorithm as the method of scheduler so that after rapid determination with process-based rule, the effector activates interrupt of interrupt service routine, controls scheduler to stop, restart, and stop the allocation of time slices of the process until the peak time is passed; and
 live-migrating virtual machines if effectors are running on a virtual machine.

9. The method as claim 8, wherein the operating system platform-independent approach is implemented by porting the driver software of hardware performance monitor from Linux to other platforms.

10. A service method to define hardware resources as software, wherein an autonomic manager implements:
 intercepting a plurality of independent concurrent requests;
 mapping the requests to a virtual finite state machine (VFSM);
 calculating physical resource capacity with the VFSM;
 mapping the ability to a physical machine; and
 satisfying the requests by the physical machine.

11. The service method as claim 10, wherein the autonomic miming further implements:
 monitoring and detecting the events of hardware requirement changes at a physical point-of-delivery (POD);
 forwarding the event to software-defined server;
 receiving the event by software-defined server and triggering VFSM executor;
 looking up rules from rulebase of VFSM by VFSM executor;
 determining whether the system is capable of achieving the event of requests based on the current state of the resources;
 changing current state of the resource according to the result determine by VFSM executor, and then performing the actions;
 obtaining the current status by the software-defined server and knowing the capability;
 providing new data and service parameters by the software-defined server in order to provision the resources at the physical POD;
 getting current capability and setting the new state by the software-define server; the status update triggering VFSM executor;

inputting, by VFSM executor, current resource status, service data and service parameters; looking up new services and parameters from the rulebase of VFSM;

determining, by VFSM executor, that there is a new entry service at said physical POD, thus delivering, by service module, the service data and service parameters to the physical POD; and completing, by the service module of said physical POD, the new provisioning in response to the initial request intercepted.

12. A method for implementing a software-defined server, comprising:

forming, by a physical POD and as software-defined server of a client/server architecture according to an autonomic computing reference architecture of autonomic management, wherein global components of the software-defined server have a one-to-one correspondence to local components of a client-side physical POD, to realize a management information base (MIB) of finite state machine, an VFSM executor, a rulebase of VFSM and or a monitor of VFSM with attributes and states regarding resources;

calculating, by the software-defined server, the capacity of resources in local net and external network, based on VFSM, wherein the VFSM can be used for system design time or run time;

calculating capacity and executing events, by VFSM executor, according to the VFSM model method built by satisfied resource state, service quality, and a plurality of VFSM rules;

storing, adjusting, and searching rules of VFSM rulebase, by VFSM rule engine, in accordance with the intelligent multi-loop complex event processing method; and monitoring, by VFSM monitor, the capacity of VFSM with intelligent ring-0 sensors and effectors to prevent overload or over-capacity situations.

13. A service delivery virtual network system, wherein said virtual network system comprises six parts:

an apparatus for enterprise environmental design and planning, wherein a business design service interacts with a service process management office, and a business subscription service applications interact with business users, under a business environment, wherein the apparatus modifies and enhances a service-related strategy/commitment and infrastructure lifecycle management in a Telecom Operations Map;

an apparatus for enterprise environmental delivery management operated under a service offline logical environment, wherein the apparatus modifies and enhances a product lifecycle management, and service operations preparation and support (SOP&S) in the Telecom Operations Map;

an apparatus for enterprise environment online delivery and operation assurance, operated under a service online-delivery environment and business management part of an application assurance system, wherein the said apparatus modifies and enhances service contract fulfillment and service assurance in the Telecom Operations Map;

an apparatus for design and planning of IT resources, operated under a resources design services by system administrator, wherein the said apparatus modifies and enhances resource-related policy/commitment and infrastructure life cycle management in the Telecom Operations Map;

an apparatus for IT resource delivery management, operated under unallocated virtual and physical resources, wherein the said apparatus modifies and enhances product life cycle management and resources operations for preparation and support (ROP&S) in the Telecom Operations Map; and an apparatus for online delivery of IT resources and operations assurance, operated under online delivery environment with already-allocated virtual and physical resources and the resource management part of the application assurance system, wherein said apparatus modifies and enhances resources contract fulfillment and resource assurance in the Telecom Operations Map; virtual resources which have been allocated have the preemptive and sharing support of virtual resources; said virtual resources aggregate physical resources of different locations and configurations to achieve resource convergence, independent of physical resource types and deployment; said physical resources is realized in the data center of enterprise service partition and physical resources network, supporting subscription delivery, and supporting physical resources with space-sharing and time-sharing, including many unassigned and assigned network, storage, and computing physical resources.

14. The system as claim 13, wherein said virtual resources aggregate physical resources of different locations and configurations to achieve resource convergence, independent of physical resource types and deployment; implementation of the physical resources and business segments and physical resources data center network to support subscription delivery, and support by sharing, space and by time sharing physical resources, including many unassigned and assigned network, storage, compute physical resources; said physical resources is realized in the data center of enterprise service partition and physical resources network, supporting subscription delivery, and supporting physical resources with space-sharing and time-sharing, including many unassigned and assigned network, storage, and computing physical resources.

15. An automation method for service delivery virtual network system, comprising:

scheduling and provisioning user services: including requirements design services, system resource analysis services, virtual resource reservation and deployment services for computing, storage, and network resource; scheduling and provisioning virtual resource; if resource capacity is insufficient, processing quality-of-service and error service; and entering service-delivery service;

scheduling and provisioning virtual resources: including virtual resource allocation, configuration, provisioning services, and software-defined services; scheduling and provisioning physical resource; if the resource capacity is insufficient, processing quality-of-service and error service; and entering service-delivery service;

scheduling and provisioning physical resource: accepting commands to configure resources from software-defined service of a resource model via resource model channel; realizing resource multiplexing, resource space sharing, and conveying resource notification to software-defined service; and processing total automation services: including application planning and application deployment, automatic resource planning and operations, dynamic provisioning of resources by business, and automatically mapping resources to the physical network and executing immediately.

16. The automated method as claim 15, wherein the service-delivery service includes:
- a handling access procedure: if a user is an application provider, then meshing up service components, or opening application interface; implementing, by 7-layer switching, automation of a virtual service delivery and real-time service domain in accordance with the specifications provided by service factory to build logical services; if the user is an individual, using self-service and implementing, by 7-layer switching, the automation of virtual service delivery and real-time service domain;
- processing service delivery: performing fast deployment and uninstallation on the logical core network, without touching the enterprise physical network and physical resources; running services under the monitoring of assurance systems; and
- building POD processes: building a physical POD for computing, storage, network physical resources; building a software-defined servers; converging physical resources of the data center; forming POD drivers; and build a logical POD for each service environment.

17. A virtual network application assurance system of autonomic management, comprising:
- a central acquisition and control system, equivalent to the resource manager at the middle layer of hybrid autonomic computing reference architecture;
- a agent running on managed-resource hosts and hosts, equivalent to four performance MAPE service components: monitor, analyzer, planner, and executor, as well as two contact points: sensors and effectors at the bottom layer of managed resources; and a backend subsystem, equivalent to an integrated console with functions of top-layer orchestrating manager.

18. The system as claim 17, further comprising:
- performance MAPE service components running from a slave host of a cluster, including leaf nodes of a network, or a master host of the cluster, including non-leaf nodes, wherein the preemptive/mission-critical policies and policies of general applications are transmitted through the network to any node;
- rules of said analyzer include hardware rules and application rules, and the master host of the cluster may also include network flow control rules;
- said workload mediator in the planner mediates the cluster-level and transaction-level workload, orchestrates the analysis of global system, analysis of local application, and handles the process life cycle management by taking the advantage of preemptive interrupts; and
- policy execution points of executor exist in one or more virtual machines, virtual machine monitor, and kernel virtual machines, using radix-tree traverser to execute commands issued by planner.

19. The system as claim 18, further comprising
- if the host operating system is virtualized, a monitor running in a virtual machine and/or user space; an executor running in a virtual machine and/or user space; and virtual machine serial-port channels and Upcall/Hypercall forming two channels to facilitate the rapid transmission of short messages, wherein the two channels collecting performance information from the agent running on virtual machines, and performing decisions.

20. A method for implementing a network application assurance system with a part for autonomic management for virtual network devices, comprising:
- implementing, by a frontend subsystem, functions equivalent to management console plus orchestrator of said hybrid autonomic computing reference architecture; the alert management, configuration management, and performance management of said function realize the global management of three autonomic elements for middle-layer self-healing, self-configuring and self-optimization; the said hybrid autonomic computing reference architecture in the global top-level management subsystem is designed in the frontend subsystem; and
- implementing, by a central acquisition and control subsystem, functions equivalent to the middle-layer of said hybrid autonomic computing reference architecture; during system initialization, a discovery function of network topology automatically finds all the topology information of managed resources in the network, including host, network devices, applications, servers, and databases; said topology information is stored in the expert database; said expert database features data aggregation, analysis, calculations and fault correlation analysis for three kinds of autonomic elements: self-healing, self-configuring and self-optimizing; said functions use artificial intelligence methods to implement the functions of orchestrator at the top layer of hybrid autonomic computing reference architecture,
- wherein hosts of managed resources have full set of local autonomy elements, so that said local autonomic elements enable the hosts to self-manage according to local policies in case of disconnection with the central collection and control system;
- wherein some hosts of managed resources have incomplete autonomic elements which may omit an analyzer part, a planner part, or a knowledge base part such that the host corresponding to said incomplete autonomic elements can not self-manage, but can provide sub-level monitoring for the monitoring part of central acquisition and control system, and can provide sub-level execution for the execution part of the central acquisition and control system.

21. An autonomic virtual network system, comprising:
apparatus for autonomic hardware POD;
apparatus for autonomic software-defined service;
apparatus for autonomic logical POD, multiplexing, a plurality of resources of software-defined server, and utilizing autonomic management to achieve resource scheduling of push and pull between the logical POD and software-defined server;
apparatus of service delivery platform (SDP) for autonomic management, including deployment automation, application lifecycle management, business services, and subscription services; SDP apparatus utilizes autonomic management to achieve operation-related competition for resources between said SDP server and the server with multiple logical POD; SDP apparatus utilizes autonomic management to achieve operation-request-related competition for resources among multiple user agents; and
apparatus of autonomic management user agent, including system administrators, operations personnel, and enterprise service users, and enterprise project management office; said user agent possesses intelligent autonomic management capabilities and a graphical interface;

wherein the above apparatuses have layers of autonomic management, similar to the layers of classic autonomic computing reference architecture level, but expanded to n-tier from three layers.

22. A method for implementing an autonomic management virtual network system, comprising:
   implementing a multi-loop autonomic management method;
   implementing a virtual network method; and
   implementing an autonomic virtual network-specific method, comprising session protocol, logical POD service, SDP and cluster topology.

23. The method as claim 22 wherein said session protocol includes:
   completing, by a virtual network, business planning/design environment to ensure the integrity and quality of service, due to a session protocol wherein said session protocol is stateful, can handle failure recovery in point-to-point communications, can use Proxy/Gateway acrossing virtual network clusters, and can package/deliver workloads of other virtual network protocols,
   representing an enterprise application with a session, and representing multiple services in an application with a sub-session, wherein the session packet header containing the user's identity, the history log conveyed amongst various agents, and the synchronization checkpoint of the session commands,
   if there is a change of state resources, resending, by session protocol, the protocol commands to convey the fact that state of resources changes in said workloads of other virtual network protocols;
   if the session protocol is Session Initiation Protocol, resending the invitation instructions;
   the content of said workloads of other virtual network protocols comprises:
   if the protocol is between the user agent and delivery platforms, generating first, by user requests, access session, wherein the main workloads are the user's requests and the final responses;
   if the protocol is between the delivery platform the logical POD server, generating the service session after access request is verified, wherein the main workloads are the competed, selected, and isolated logic resources;
   if the protocol is between the logical POD server and the software-defined server, binding, in the service session, the logical POD and services requested by the user, wherein the binding continues until the service is completed, when the service session is also ended, and the main workloads are physical resources that have been converged by of software-defined server, to become logical resources; processing push and pull scheduling; and
   if the protocol is between the physical POD and the software-defined server, the main workloads are physical resources to be converged, predefined state changes and predefined state notifications.

24. The method as claim 22 wherein the logical POD server contains one or more logical PODs, each of said logical PODs has 3 provisioning activities comprising:
   supporting, by a space-sharing and time-sharing logical POD, a virtual server wherein said virtual server oversubscribes physical host servers; each virtual server, relative to other virtual servers, has different hardware specifications amongst them; and a physical host is transparent to the provisioned instances;
   provisioning an on-demand the virtual server's hardware specifications and the virtual server's operating system on top of each virtual server; and
   provisioning an on-demand the application server on top of each oversubscribed operating system, in addition to provisioning on-demand virtual server's operating system.

25. The method as claim 24 wherein an implementation of the logical POD comprises:
   a facing SDP, by the logical POD, the said logical POD in dealing with competition, multiplexing virtual resources to converge network resources, and resolving resource competition among multiple service logical PODs based on VFSM executor methods and a VFSM rulebase; if competition among operation requests, comparing different service operational requests and obtaining competition result wider quality of service; if competition among operations, comparing the available resources of software-defined server, and the logic POD requirements of various services in the physical POD server to obtain competition result under quality of service; and
   a facing server-defined software, by the logical POD, the said logical POD processing push or pull scheduling between the software-defined server and the logical POD servers; if push scheduling, committing demand for resource changes regardless of physical POD capability, and supporting concurrent resources provisioning; If the pull scheduling, committing demand of resource change only after the physical POD has its capacity ready, and supporting concurrent resources provisioning.

26. The method as claim 22 wherein the SDP platform receives requests from different users, comprising:
   if from system administrators, obtaining competition result in accordance with the simple rules of quality of service;
   if from enterprise service personnel, entering the service life-cycle management;
   if from service operations personnel, entering deployment automation; and
   if from a project manager, entering the subscription service, performing multi-department/multi-service aggregation via MAPE engines of the business server, and providing service environment to enable said project manager to perform service design; if interacting with logical POD server, issuing commands to said logical POD server in accordance with the results of MAPE engine calculation, receiving notification from the logical POD server regarding insufficient logic resources and forwarding said notification to MAPE engine,
   wherein said MAPE components of service server are global, while the MAPE components of logical POD server are local to said logical POD server; rulesbase of MAPE engine of service server considers not only the competition for resources among logical POD servers, but also the service requests from the users;
   wherein a service server, when facing project operations user, performs service life-cycle management, wherein business project server handles configuration, activation, deployment, uninstallation, service assurance, service scheduling and FCAPS management; and
   wherein service server, when facing logical POD, makes one-to-one correspondence between logic PODs and service projects, so as to use software program to manage office users for subscribing to virtual resources, and further subscribing to a distributed physical resources; service server provisions service environment and provides service design to the project manager.

27. The method as claim 22 wherein said virtual network forms a cluster topology and said cluster topology forms multiple physical PODs and logical PODs, comprising:
  partitioning, by said cluster topology, multiple hosts into a plurality of clusters, wherein cluster slave nodes allow limited failure; master and slave nodes in the same cluster are homogeneous; clusters need to support load balancing; physical resources can be first divided into a number of physical PODs, each POD owning multiple clusters; logical PODs can be multiple due to the design of different users; logical POD provides on-demand-OS (operating system) service, to rapidly deploy virtual machines on the host;
  partitioning, by said cluster topology, multiple physical cluster into a single physical POD or a plurality of physical PODs;
  limiting logical PODs to the same single cluster if based on original single physical cluster; ignoring said limitation if based on multiple physical cluster; wherein said two selections can be configured by the user;
  virtualizing physical servers, by on-demand-OS logic POD, in order to provide more diversified development/testing equipment; not virtualizing physical servers, by space-sharing-only logical POD, in order to ensure high-quality computing and system performance; wherein said two selections can be configured by the user;
  facing applications, by logical PODs, wherein each said logical POD connecting to SDP carries a version number, and uses the storage system of SDP to achieve storing and restoring; and
  facing software-defined server, by the logical PODs, wherein pull scheduling is used to achieve the backend resource commitment, in order to avoid network traffic bursts.

\* \* \* \* \*